United States Patent
Nishihara et al.

(10) Patent No.: US 8,133,566 B2
(45) Date of Patent: Mar. 13, 2012

(54) INFORMATION RECORDING MEDIUM, ITS MANUFACTURING METHOD, AND SPUTTERING TARGET

(75) Inventors: Takashi Nishihara, Osaka (JP); Rie Kojima, Osaka (JP); Noboru Yamada, Osaka (JP); Toshiyuki Matsunaga, Osaka (JP)

(73) Assignee: Panasonic Corporation, Osaka (JP)

( * ) Notice: Subject to any disclaimer, the term of this patent is extended or adjusted under 35 U.S.C. 154(b) by 328 days.

(21) Appl. No.: 12/376,507

(22) PCT Filed: Jun. 5, 2007

(86) PCT No.: PCT/JP2007/061346
§ 371 (c)(1),
(2), (4) Date: Feb. 5, 2009

(87) PCT Pub. No.: WO2008/018225
PCT Pub. Date: Feb. 14, 2008

(65) Prior Publication Data
US 2010/0047504 A1    Feb. 25, 2010

(30) Foreign Application Priority Data

Aug. 8, 2006 (JP) ............................... P 2006-215655
Dec. 18, 2006 (JP) ............................... P 2006-340106

(51) Int. Cl.
*B32B 3/02* (2006.01)
(52) U.S. Cl. ..................... 428/64.1; 428/64.4; 428/64.5; 430/270.13
(58) Field of Classification Search .................. 428/64.5
See application file for complete search history.

(56) References Cited

U.S. PATENT DOCUMENTS

| 5,278,011 | A  | 1/1994  | Yamada et al. |
| 6,153,063 | A  | 11/2000 | Yamada et al. |
| 6,268,107 | B1 | 7/2001  | Yamada et al. |
| 6,456,584 | B1 | 9/2002  | Nagata et al. |
| 6,503,690 | B1 | 1/2003  | Uno et al.    |

(Continued)

FOREIGN PATENT DOCUMENTS

JP    60-179954    9/1985

(Continued)

OTHER PUBLICATIONS

Supplemental European Search Report, issued Oct. 4, 2010 in EP Application 07 74 4702, which is a counterpart to the present application.

(Continued)

*Primary Examiner* — Elizabeth Mulvaney
(74) *Attorney, Agent, or Firm* — Wenderoth, Lind & Ponack, L.L.P.

(57) ABSTRACT

An information recording medium is provided that has high recording sensitivity and high erasability, even when a recording layer thereof is as thin as about 3 nm. An information recording medium 15 on which information can be recorded by applying light or electrical energy has at least a recording layer 104 that undergoes phase change, while the recording layer 104 contains at least one element selected from among Zn, Si and C, and Sb in total proportion of 85 atomic % or more and has a composition preferably represented by the formula $Sb_{100-a1}M1_{a1}$ (atomic %) (wherein M1 represents at least one element selected from among Zn, Si and C, and a1 is a proportion in terms of atomic % that satisfies a relationship of $0 < a1 \leq 50$).

14 Claims, 15 Drawing Sheets

U.S. PATENT DOCUMENTS

| | | |
|---|---|---|
| 6,821,707 B2 | 11/2004 | Uno et al. |
| 7,037,413 B1 | 5/2006 | Otoba et al. |
| 7,260,053 B2 | 8/2007 | Harigaya et al. |
| 2002/0114915 A1* | 8/2002 | Ohno et al. .................. 428/64.4 |
| 2004/0037203 A1 | 2/2004 | Harigaya et al. |
| 2004/0191683 A1 | 9/2004 | Nishihara et al. |
| 2005/0074694 A1* | 4/2005 | Nishihara et al. ........ 430/270.13 |
| 2005/0089799 A1 | 4/2005 | Otoba et al. |
| 2005/0105438 A1 | 5/2005 | Hibino et al. |
| 2006/0233095 A1 | 10/2006 | Iwasa et al. |
| 2006/0280896 A1 | 12/2006 | Kikukawa et al. |

FOREIGN PATENT DOCUMENTS

| | | |
|---|---|---|
| JP | 1-224940 | 9/1989 |
| JP | 2574325 | 1/1997 |
| JP | 2584741 | 2/1997 |
| JP | 10-275360 | 10/1998 |
| JP | 2000-036130 | 2/2000 |
| JP | 2002-337451 | 11/2002 |
| JP | 2004-050763 | 2/2004 |
| JP | 2005-063586 | 3/2005 |
| JP | 2005-071450 | 3/2005 |
| JP | 2005-153496 | 6/2005 |
| JP | 2006-256143 | 9/2006 |
| JP | 2007-098933 | 4/2007 |

OTHER PUBLICATIONS

International Search Report issued Sep. 11, 2007 in the International (PCT) Application of which the present application is the U.S. National Stage.

* cited by examiner

INFORMATION RECORDING MEDIUM, ITS MANUFACTURING METHOD, AND SPUTTERING TARGET

TECHNICAL FIELD

The present invention relates to an information recording medium used for optically or electrically recording, erasing, rewriting and/or reproducing information, a method for manufacturing the same, and a sputtering target that can be used in the manufacture of the information recording medium.

BACKGROUND ART

The information recording media of the prior art include a phase change (or phase transition) type information recording medium that utilizes a phenomenon of phase change taking place in a recording layer (phase change material layer). Among the phase change type information recording media, there is the information recording medium that optically records, erases, rewrites and reproduces information by using a laser beam (which may hereinafter be referred to simply as an optical information recording medium). Information is recorded on the optical information recording medium by irradiating a phase change material of a recording layer with the laser beam so that heat generated thereby causes, for example, change of state between crystal phase and amorphous phase. The recorded information is read by detecting the difference in reflectivity between the crystal phase and the amorphous phase.

The optical information recording media also include a rewritable information recording medium from and on which information can be erased and can be rewritten. In this medium, the initial state of the recording layer is crystal phase in general. To record information on this medium, it is irradiated with a laser beam of high power (recording power) so as to melt the recording layer and then cool it down quickly, thereby turning the portion of the recording layer that has been irradiated with the laser into amorphous phase. In contrast, to erase information from this medium, it is irradiated with a laser beam having a power (erasure power) lower than that of recording, so as to raise the temperature of the recording layer and then gradually cool it, so as to turn the portion of the recording layer that has been irradiated with the laser into crystal phase. Accordingly, it is made possible to record new information or rewrite information while erasing the information already recorded, by irradiating the recording layer of the rewritable information recording medium with a laser beam that is power-modulated between a high power level and a low power level. Turning the recording layer into crystal phase requires it to maintain the recording layer at a temperature at which it changes to crystal phase (crystallization temperature) for a certain period of time (crystallization time). A shorter crystallization time makes it possible to delete and rewrite information in a shorter period of time, namely enables high-speed erasure and rewriting.

The phase change type information recording media also include a write-once information recording medium on which information is recorded only once, and from and on which information cannot be erased or rewritten, wherein the initial state of the recording layer is amorphous phase in general. To record information on the write-once information recording medium, it is irradiated with a laser beam of high power (recording power) so as to raise the temperature of the recording layer and is then cooled down gradually, thereby turning the portion that has been irradiated with the laser into crystal phase.

There is also a type of phase change type information recording medium whereon information is recorded by applying electrical energy (for example, electric current) instead of irradiation of laser beam, so as to cause state change of a phase change material of the recording layer by the Joule heat generated thereby. Information is recorded on this information recording medium by causing change of the state between crystal phase (low resistance) and amorphous phase (high resistance) in the phase change material of the recording layer by the Joule heat generated by flowing the electric current. The recorded information is read by detecting the difference in electrical resistance between crystal phase and amorphous phase.

As an example of the phase change type information recording medium, there is a 4.7 GB/DVD-RAM. The 4.7 GB/DVD-RAM, as depicted as an information recording medium 12 in FIG. 15, has 7-layer constitution including a first dielectric material layer 2, a first interface layer 3, recording layer 4, a second interface layer 5, a second dielectric material layer 6, a light absorption compensating layer 7 and a reflective layer 8 which are provided in this order on a substrate 1 when viewed from the side where laser beam enters.

The recording layer 4 is formed from a fast-crystallizing material that contains (Ge—Sn)Te—$Sb_2Te_3$, which is prepared by substituting a part of Ge with Sn in a GeTe—$Sb_2Te_3$ quasi-binary phase change material, that is a mixture of compounds GeTe and $Sb_2Te_3$ (refer to, for example, Patent Document 1). It is made possible to rewrite information at a higher speed by using a GeTe—$Bi_2Te_3$ quasi-binary phase change material, that is a mixture of compounds GeTe and $Bi_2Te_3$ (refer to, for example, Patent Document 2). By using these materials, it is made possible to achieve not only high initial rewriting performance but also excellent archival characteristics (capability to reproduce recorded information after a long period of storage) and excellent overwrite archival characteristics (capability to erase or rewrite recorded information after a long period of storage).

The first dielectric material layer 2 and the second dielectric material layer 6 have optical functions to increase the efficiency of the recording layer 4 to absorb light by regulating the optical distance and increase the difference in the reflectivity between crystal phase and amorphous phase so as to increase the intensity of signals. These dielectric material layers 2 and 6 also have a thermal function to thermally insulate the substrate 1, a dummy substrate 10, etc. that are vulnerable to heat, from the recording layer 4 that is heated to a high temperature during recording. $(ZnS)_{80}(SiO_2)_{20}$ (mol %) that has been used in the prior art is an excellent dielectric material having transparency, high refractive index, low heat conductivity, high thermal insulation, good mechanical characteristics and high humidity resistance.

The reflective layer 8 has an optical function to increase the amount of light absorbed by the recording layer 4. The reflective layer 8 also has a thermal function to quickly dissipate the heat generated in the recording layer 4 and facilitate the phase change of the recording layer 4 into amorphous phase. The reflective layer 8 further has a function to protect the multi-layer film from the operating environment.

The first interface layer 3 and the second interface layer 5 have the function to prevent material transfer from occurring between the first dielectric material layer 2 and the recording layer 4 and between the second dielectric material layer 6 and the recording layer 4. The material transfer is the diffusion of S (sulfur) into the recording layer in the course of repetitive irradiation of the recording layer 4 with the laser beam during recording and rewriting cycles, in the case where the first dielectric material layer 2 and the second dielectric material layer 6 are formed from $(ZnS)_{80}(SiO_2)_{20}$ (the subscript represents the proportion of the respective component in mol %). Diffusion of S into the recording layer causes deterioration of overwrite cycle-ability. In order to prevent overwrite cycleability from deteriorating, it is preferable to use a nitride that contains Ge to form the first interface layer 3 and the second interface layer 5 (refer, for example, to Patent Document 3).

The 4.7 GB/DVD-RAM was successfully commercialized as high overwrite cycle-ability and high reliability were achieved by making use of the technologies described above.

In the meantime, various technologies have been introduced for the purpose of further increasing the recording capacity of the information recording medium. With regards to the optical information recording medium, for example, such a technology has been developed that employs a blue-violet laser that has a shorter wavelength than the red laser and an objective lens having a higher numerical aperture (NA) with a decreased thickness of the substrate on the side whereon the laser beam is incident, thereby to apply a laser beam having a smaller spot so as to record information with a higher density.

Such a technology has also been introduced that increases the recording capacity two-fold by using an optical information recording medium that has two information layers, and information is recorded on and reproduced on and from the two information layers by means of a laser beam that is incident on only one side of the medium (refer, for example, to Patent Document 4). In the two-layer information recording medium, information is recorded on and reproduced from the information layer located farther from the surface whereon the laser beam enters (hereafter referred to as the second information layer) by means of a laser beam that has transmitted through the information layer located nearer to the surface whereon the laser beam enters (hereafter referred to as the first information layer). Therefore, it is necessary to make the recording layer and the reflective layer of the first information layer extremely thin, so as to increase the light transmittance.

Patent Document 1: Japanese Patent Publication No. 2584741 (pp. 1-5, FIG. 1)
Patent Document 2: Japanese Patent Publication No. 2574325 (pp. 1-5, FIG. 1)
Patent Document 3: Japanese Unexamined Patent Publication (Kokai) No. H10-275360 (pp. 2-6, FIG. 2)
Patent Document 4: Japanese Unexamined Patent Publication (Kokai) No. 2000-36130 (pp. 2-11, FIG. 2)

However, there has been such a problem that making the recording layer (for example, GeTe—$Bi_2Te_3$) thinner results in lower capability of the recording layer to crystallize, leading to lower erasability. When the recording layer and the reflective layer are made extremely thin so as to increase the light transmittance, absorption of light by the recording layer decreases and higher energy (laser power) is required to record information, which means lower recording sensitivity.

SUMMARY OF THE INVENTION

The present invention has been contrived to solve the problems described above, and the object of the present invention is to provide a phase change type information recording medium with both recording power and erasability improved at the same time.

In order to achieve the object described above, the present invention provides an information recording medium whereon information can be recorded by irradiation of light or applying electrical energy, that comprises at least a recording layer which can undergo phase change, wherein the recording layer contains at least one element selected from among Zn, Si and C, and Sb in total proportion of 85 atomic % or more. This constitution improves the recording power and the erasability of the phase change type information recording medium.

In the information recording medium of the present invention, the recording layer may contain a material represented by the formula (1):

$$Sb_{100-a1}M1_{a1}(\text{atomic \%}) \quad (1)$$

wherein M1 represents at least one element selected from among Zn, Si and C, and a1 is a proportion in terms of atomic % and satisfies a relationship of $0 < a1 \leq 50$. When the recording layer contains such a material, the recording power and erasability of the phase change type information recording medium can be improved.

The adjunct "atomic %" in the formula (1) indicates that the composition is given in terms of the number of atoms of each element in proportion to the total number of Sb and M1 atoms (100%). The adjunct "atomic %" will be used in this sense in the formulas that follow. Formula (1) shows only the numbers of Sb atoms and M1 atoms contained in the recording layer. Accordingly, the recording layer may contain components other than the elements described above (for example, other metal element, oxygen, hydrogen, argon, nitrogen, etc.) in a proportion of up to 15 atomic % of the total.

In the information recording medium of the present invention, the recording layer may contain a material represented by the formula (2):

$$Sb_{100-a2}Zn_{a2}(\text{atomic \%}) \quad (2)$$

wherein a2 represents a proportion in terms of atomic %, and satisfies a relationship of $0 < a2 \leq 30$. When the recording layer contains such a material, the recording power and erasability of the phase change type information recording medium can be improved.

In the information recording medium of the present invention, the recording layer may contain a material represented by the formula (3):

$$Sb_{100-a3}Si_{a3}(\text{atomic \%}) \quad (3)$$

wherein a3 represents a proportion in terms of atomic %, and satisfies a relationship of $0 < a3 \leq 30$. When the recording layer contains such a material, the recording power and erasability of the phase change type information recording medium can be improved.

In the information recording medium of the present invention, the recording layer may contain a material represented by the formula (4):

$$Sb_{100-a4}C_{a4}(\text{atomic \%}) \quad (4)$$

wherein a4 represents a proportion in terms of atomic %, and satisfies a relationship of $0 < a4 \leq 50$. When the recording layer contains such a material, the recording power and erasability of the phase change type information recording medium can be improved.

In the information recording medium of the present invention, the recording layer may contain a material represented by the formula (5):

$$Sb_{100-a5}(SiC)_{a5}(\text{mol \%}) \quad (5)$$

wherein a5 represents a proportion in terms of atomic %, and satisfies a relationship of $0 < a5 \leq 30$. When the recording layer contains such a material, the recording power and erasability of the phase change type information recording medium can be improved.

In the information recording medium of the present invention, the recording layer may further contain at least one element selected from among Ga, Ge, Ag, In, Sn, Te and Bi. When the recording layer contains such element, recording power of the phase change type information recording medium can be improved further.

In the information recording medium of the present invention, the recording layer may contain a material represented by the formula (6):

$$Sb_{100-a6-b6}M1_{a6}M2_{b6}(\text{atomic \%}) \qquad (6)$$

wherein M1 represents at least one element selected from among Zn, Si and C, M2 represents at least one element selected from among Ga, Ge, Ag, In, Sn, Te and Bi, and a6 and b6 represent proportions in terms of atomic %, and satisfy relationships of $0<a6\leqq50$ and $0<b6\leqq15$. When the recording layer contains such a material, the recording power of the phase change type information recording medium can be improved further.

In the information recording medium of the present invention, the recording layer may further contain at least one element selected from among B, Mg, Al, S, Ca, Sc, Ti, V, Cr, Mn, Fe, Co, Ni, Cu, Sr, Y, Zr, Nb, Mo, Ru, Rh, Pd, Hf, Ta, W, Ir, Pt, Au, La, Ce, Pr, Nd, Sm, Eu, Gd, Tb, Dy, Ho, Er, Tm, Yb and Lu.

In the information recording medium of the present invention, the thickness of the recording layer may be 15 nm or less. This enables it to improve the recording power of the phase change type information recording medium. Also in the information recording medium of the present invention, the thickness of the recording layer may be 3 nm or less. When the recording layer has such a thickness, transmittance of an information layer located near the surface whereon the laser bean is incident can be improved, in the multi-layer phase change type information recording medium.

The information recording medium of the present invention may also include N1 information layers (N1 is 2 or greater integer), that is, N1 recording layers (N1 is 2 or greater integer). This enables it to enhance the recording capacity of the phase change type information recording medium. N1 may be 2. N1 may also be 3 or 4. In the information recording medium that contains N1 information layers, at least one recording layer contains the material described above (a combination of Sb and M1).

The present invention also provides an information recording medium whereon information can be recorded by irradiation of light or application of electrical energy, which has a recording section constituted by stacking two or more layers selected from among a layer containing Sb, a layer containing M1 (M1 represents at least one element Selected from among Zn, Si and C), a layer containing M2 (M2 represents at least one element selected from among Ga, Ge, Ag, In, Sn, Te and Bi), a layer containing Sb-M1, a layer containing Sb-M2, a layer containing M1-M2 and a layer containing Sb-M1-M2. By forming the recording section from two or more layers, the recording power and erasability of the phase change type information recording medium can be improved. The term "recording section" is used herein to distinguish the recording layer of stacked structure constituted from two or more layers, from a recording layer of single-layer structure. Functions of the recording layer and the recording section are the same in the information recording medium.

In the information recording medium of the present invention that has the recording section, the recording section may have at least a stacked structure of a layer containing Sb-M1 and a layer containing Sb-M2. In the stacked structure that constitutes the recording section, the layer containing Sb-M1 may contain C in a proportion of 50 atomic % or less, and the layer containing Sb-M2 may contain at least one element selected from among Ge and Te in a proportion of 30 atomic % or less. By forming the recording section in such a constitution, the recording power and erasability of the phase change type information recording medium can be controlled.

The information recording medium of the present invention that has the recording section may have at least a stacked structure including a layer containing Sb-M1 and a layer containing M2. In this stacked structure, the layer containing Sb-M1 may contain C in a proportion of 50 atomic % or less, and the layer containing M2 may contain Te in a proportion of 40 atomic % or more. By forming the recording section in such a constitution, the recording power and erasability of the phase change type information recording medium can be controlled.

In the information recording medium of the present invention that has the recording section, one or more layers included in the recording section may further contain at least one element selected from among B, Mg, Al, S, Ca, Sc, Ti, V, Cr, Mn, Fe, Co, Ni, Cu, Sr, Y, Zr, Nb, Mo, Ru, Rh, Pd, Hf, Ta, W, Ir, Pt, Au, La, Ce, Pr, Nd, Sm, Eu, Gd, Tb, Dy, Ho, Er, Tm, Yb and Lu.

In the information recording medium of the present invention that has the recording section, the thickness of the recording section may be 15 nm or less. This enables it to improve the recording power of the phase change type information recording medium. Also in the information recording medium of the present invention that has the recording section, the thickness of the recording section may be 3 nm or less. When the recording section has such a thickness, transmittance of an information layer located near the surface whereon the Laser beam is incident can be improved, in the multi-layer phase change type information recording medium.

The information recording medium of the present invention that has the recording section may also include N2 information layers, that is, N2 recording sections (N2 is 2 or greater integer). This enables it to improve the recording capacity of the information recording medium. N2 may be 2. N2 may also be 3 or 4. In the information recording medium that includes N2 information layers, at least one recording section is constituted from a plurality of layers selected from the layers that contain the predetermined elements described above.

The information recording medium of the present invention may further have an interface layer disposed in contact with at least one surface of the recording layer, or with at least one surface of the recording section. Providing the interface layer improves the overwrite cycle-ability of the phase change type information recording medium.

In the information recording medium of the present invention, the interface layer may contain at least one compound selected from an oxide, a nitride, a carbide, sulfide and a fluoride. This constitution improves the overwrite cycle-ability of the phase change type information recording medium.

Also in the information recording medium of the present invention, the interface layer may contain at least one element selected from among Zr, Hf, Y and Si, at least one element selected from among Ga, In and Cr, and O. This constitution improves the overwrite cycle-ability of the phase change type information recording medium.

The information recording medium of the present invention may also have a reflective layer. The reflective layer improves the recording power and signal intensity of the phase change type information recording medium.

Also in the information recording medium of the present invention, the reflective layer may contain mainly Ag. This constitution improves the recording power and the signal intensity of the phase change type information recording medium. The word "mainly" means that Ag is contained in proportion of 90 atomic % or more.

In the information recording medium of the present invention, the thickness of the reflective layer may be 20 nm or less. The reflective layer having a thickness of 20 nm or less enables it to improve the transmittance of the information layer located on the side where the laser beam enters, in the multi-layer phase change type information recording medium. Also in the information recording medium of the present invention, the thickness of the reflective layer may be 5 nm or less. Such a thin reflective layer further improves the transmittance of the information layer located near the surface whereon the laser beam is incident, in the multi-layer phase change type information recording medium.

The present invention also provides a method for manufacturing the information recording medium of the present invention. This method is a method for manufacturing the information recording medium including at least a process of forming the recording layer that contains at least one element selected from among Zn, Si and C, and Sb in total proportion of 85 atomic % or more, wherein the process of forming the recording layer includes sputtering with the use of a sputtering target that contains at least one element selected from among Zn, Si and C, and Sb. Such a manufacturing method produces the phase change type information recording medium having recording power and erasability that are improved.

The present invention also provides a method for manufacturing the information recording medium comprising at least a process of forming the recording layer that contains at least one element selected from among Zn, Si and C, and Sb in total proportion of 85 atomic % or more, wherein the process of forming the recording layer includes sputtering with the use of two or more sputtering targets selected from sputtering targets represented by Sb, M1 (wherein M1 represents at least one element selected from among Zn, Si and C), M2 (wherein M2 represents at least one element selected from among Ga, Ge, Ag, In, Sn, Te and Bi), Sb-M1, Sb-M2, M1-M2 and Sb-M1-M2. This manufacturing method is capable of producing the phase change type information recording medium having improved recording power and erasability.

The present invention also provides a method for manufacturing the information recording medium comprising at least a process of forming the recording section formed by stacking two or more layers. This method is a method for manufacturing the information recording medium, wherein the process of forming the recording section includes sputtering with the use of two or more sputtering targets selected from sputtering targets represented by Sb, M1 (wherein M1 represents at least one element selected from among Zn, Si and C), M2 (wherein M2 represents at least one element selected from among Ga, Ge, Ag, In, Sn, Te and Bi), Sb-M1, Sb-M2, M1-M2 and Sb-M1-M2. This manufacturing method is capable of producing the phase change type information recording medium having improved recording power and erasability.

The present invention also provides a sputtering target that is used in manufacturing the information recording medium of the present invention, and contains at least one element selected from among Zn, Si and C, and Sb in total proportion of 85 atomic % or more. Forming the recording layer by using such a sputtering target makes it possible to manufacture the phase change type information recording medium having improved recording power and erasability.

The sputtering target used in manufacturing the information recording medium of the present invention may contain a material represented by the formula (10):

$$Sb_{100-A1}M1_{A1}(\text{atomic \%}) \quad (10)$$

wherein M1 represents at least one element selected from among Zn, Si and C, and A1 is a proportion in terms of atomic % and satisfies a relationship of a1<A1≦(a1+3), when a film to be formed contains a material represented by the formula (1):

$$Sb_{100-a1}M1_{a1}(\text{atomic \%}) \quad (1)$$

wherein M1 represents at least one element selected from among Zn, Si and C, and a1 is a proportion in terms of atomic % and satisfies a relationship of 0<a1≦50. Forming the recording layer by using such a sputtering target makes it possible to manufacture the phase change type information recording medium having improved recording power and erasability.

According to the present invention, a phase change type information recording medium having improved recording power and erasability is provided. The method for manufacturing the phase change type information recording medium of the present invention and/or the sputtering target of the present invention makes it possible to easily manufacture the phase change type information recording medium of the present invention.

DETAILED DESCRIPTION OF THE INVENTION

Figure 1:
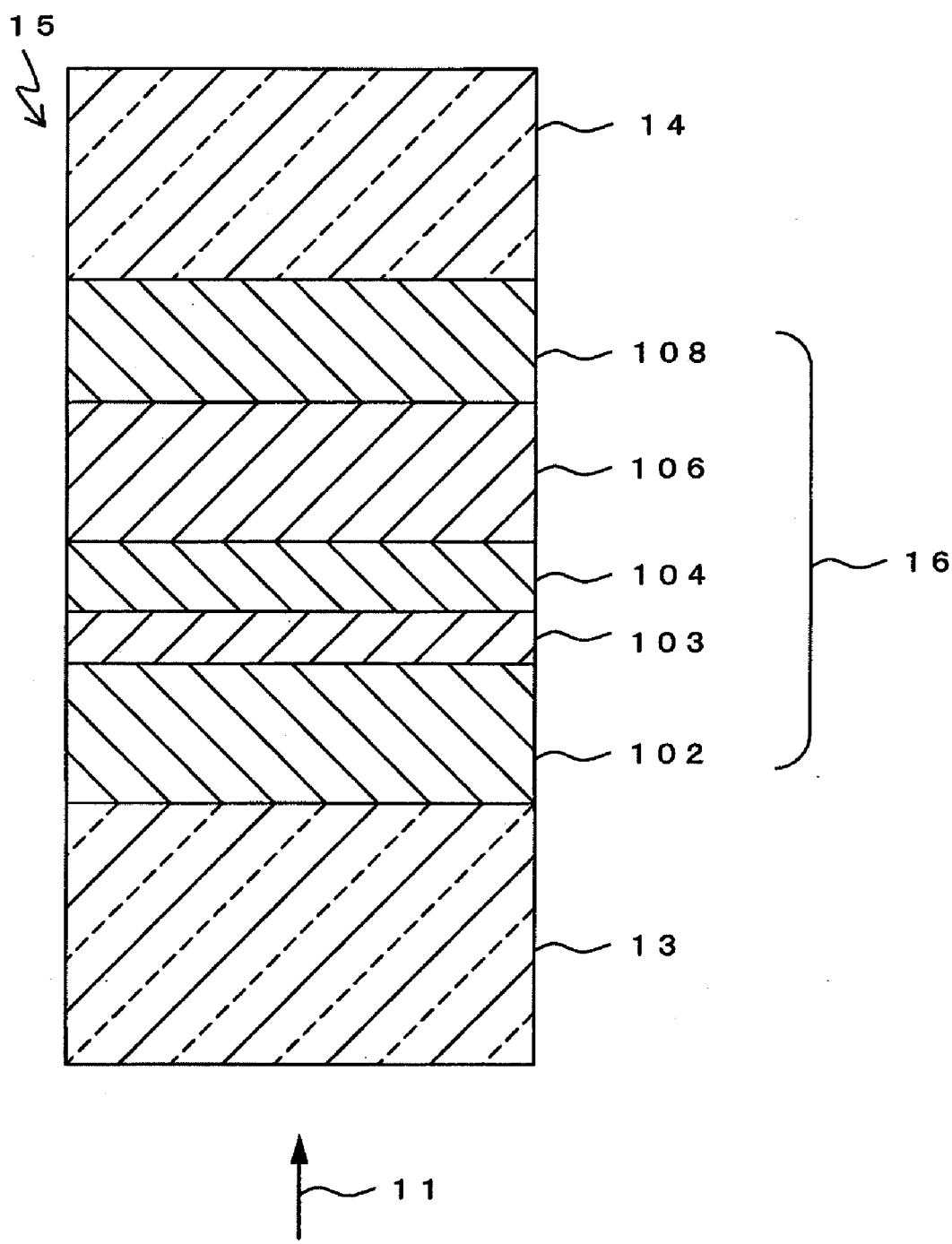
FIG. 1 is a partial sectional view schematically showing an example of layer constitution of an information recording medium having one information layer of the present invention.

Embodiments of the present invention will now be described with reference to the accompanying drawings. It should be understood that the embodiments are provided as mere examples that do not restrict the present invention. In the embodiments described below, identical components may be denoted with identical reference numerals, and duplicate description may be omitted.

First Embodiment

A first embodiment, that is an example of an information recording medium of the present invention, will be described below. The information recording medium 15 of the first embodiment is shown in partial sectional view of FIG. 1. The information recording medium 15 is an optical information recording medium on and from which information can be recorded and reproduced by irradiation of a laser beam 11.

The information recording medium 15 comprises an information layer 16 formed on a substrate 14 and a transparent layer 13. The transparent layer 13 is formed from a resin such as a photo-curable resin (particularly an ultraviolet-curable resin) or a delayed-action resin, or a dielectric material. The material of the transparent layer 13 preferably has a low light absorbance to the laser beam 11 that is used, and has a low birefringence coefficient in a short wavelength range. The transparent layer 13 may also be a transparent sheet or plate having disk shape formed from a resin such as polycarbonate, amorphous polyolefin or PMMA, or glass. In this case, the transparent layer 13 may be adhered onto the first dielectric material layer 102 by means of a resin such as the photo-curable resin (particularly the ultraviolet-curable resin) or the delayed-action resin, or an adhesive sheet.

Wavelength λ of the laser beam 11 is preferably not longer than 450 nm when used in high-density recording, because the size of the beam spot formed by the focused laser beam 11 is determined by the wavelength λ (the shorter the wavelength λ, the smaller the spot size becomes that can be formed). When the wavelength λ is shorter than 350 nm, light is absorbed more significantly by the transparent layer 13 and other. Accordingly, the wavelength λ is preferably in a range of from 350 nm to 450 nm.

The substrate 14 is a transparent substrate of disk shape. The substrate 14 may be formed from a resin such as polycarbonate, amorphous polyolefin or PMMA, or glass. The substrate 14 is preferably formed from polycarbonate for reasons of good transfer property, ease of mass production and low cost.

A guide groove for guiding the laser beam may optionally be formed on the surface of the substrate 14 where the information layer 16 is to be formed. The surface of the substrate 14 opposite to the surface where the information layer 16 is to be formed is preferably smooth. The substrate 14 has a thickness preferably in a range of from 0.5 mm to 1.2 mm, so as to ensure sufficient strength and enable the information recording medium 15 to have a thickness of about 1.2 mm. When the transparent layer 13 has a thickness of about 0.6 mm (a thickness that allows satisfactory recording and reproduction with NA=0.6), the thickness of the substrate 14 is preferably within a range from 0.55 mm to 0.65 mm. When the transparent layer 13 has the thickness of about 0.1 mm (a thickness that allows satisfactory recording and reproduction with NA=0.85), the thickness of the substrate 14 is preferably within a range of from 1.05 mm to 1.15 mm.

Now the constitution of the information layer 16 will be described in detail.

The information layer 16 includes a first dielectric material layer 102, a recording layer 104, a second dielectric material layer 106 and a reflective layer 108 which are provided in this order from the side where laser beam 11 enters. A first interface layer 103 may optionally be provided between the first dielectric material layer 102 and the recording layer 104, as illustrated.

The first dielectric material layer 102 is formed from a dielectric material. The first dielectric material layer 102 serves to suppress oxidation, corrosion and deformation of the recording layer 104, to adjust the optical distance so as to improve the light absorbance of the recording layer 104, and to increase the signal intensity by increasing the difference in the intensity of reflected light before and after recording.

The first dielectric material layer 102 may be formed from an oxide such as $TiO_2$, $ZrO_2$, $HfO_2$, ZnO, $Nb_2O_5$, $Ta_2O_5$, $SiO_2$, $SnO_2$, $Al_2O_3$, $Bi_2O_3$, $Cr_2O_3$, $Ca_2O_3$, $In_2O_3$, $Sc_2O_3$, $Y_2O_3$, $La_2O_3$, $Gd_2O_3$, $Dy_2O_3$, $Yb_2O_3$, CaO, MgO, $CeO_2$ and $TeO_2$. The layer may also be formed from a nitride such as C—N, Ti—N, Zr—N, Nb—N, Ta—N, Si—N, Ge—N, Cr—N, Al—N, Ge—Si—N and Ge—Cr—N. Sulfides such as ZnS, carbides such as SIC, fluorides such as $LaF_3$ or $CeF_3$ and C may also be used to form the first dielectric material layer 102. The first dielectric material layer 102 may also be formed from a mixture of one or more materials selected from among the compounds listed above and carbon. For example, ZnS—$SiO_2$ that is a mixture of ZnS and $SiO_2$, is particularly favorable as the material to form the first dielectric material layer 102, because ZnS—$SiO_2$ is an amorphous material that has high refractive index, fast film formation rate, good mechanical properties and high humidity resistance.

The thickness of the first dielectric material layer 102 can be exactly determined by calculation based on a matrix method, so as to satisfy the conditions for achieving greater change in the intensity of reflected light between a case where the recording layer 104 is in crystal phase and a case where it is in amorphous phase.

The first interface layer 103, that is provided if required, has a function to prevent material transfer from being caused by repetitive overwriting operations between the first dielectric material layer 102 and the recording layer 104. The first interface layer 103 also has a function to accelerate or suppress the crystallization of the recording layer 104, namely to adjust the capability to crystallize. The first interface layer 103 is preferably formed from a material that presents less optical absorptive ability and has a high melting point so as not to absorb a significant amount of light and melt during recording, and has favorable adhesion with the recording layer 104. The high melting point which ensures the unmelted state during recording is a characteristic required for preventing the first interface layer 103 from melting and mixing into the recording layer 104 when irradiated with the laser bean 11 of high power. Mixing of the material of the first interface layer 103 alters the composition of the recording layer 104, thereby to significantly deteriorate the overwrite characteristics. Favorable adhesion with the recording layer 104 is a characteristic required for ensuring high reliability.

The first interface layer 103 may be formed from a material that contains at least one compound selected from among an oxide, a nitride, a carbide, a sulfide and a fluoride, similarly to the first dielectric material 102. A material that contains Cr and O is particularly preferably used because it accelerates the crystallization of the recording layer 104 more effectively. $Cr_2O_3$, that is an oxide consisting of Cr and O, is more preferably used, because it has excellent adhesiveness to the recording layer 104.

A material that particularly contains In and O may also be used to form the first interface layer 103. $In_2O_3$, that is an oxide consisting of In and O, is preferably used, because it has excellent adhesiveness to the recording layer 104.

A material that particularly contains Ga and O may also be used to form the first interface layer 103. $Ga_2O_3$, that is an oxide consisting of Ga and O, is preferably used, because it has excellent adhesiveness to the recording layer 104.

The first interface layer 103 may include, besides Cr and O, Ga and O or In and O, at least one element selected from among Zr, Hf and Y, and the at least one element is preferably contained in the form of oxide. This is because $ZrO_2$ and $HfO_2$ are transparent, have a high melting point of about 2,700 to 2,800° C., and have ones of lower heat conductivities among oxides, whereby the overwrite characteristics of the information recording medium is improved. $Y_2O_3$ is a transparent material and has a function of stabilizing $ZrO_2$ and $HfO_2$. By mixing one or more of the three oxides, it is made possible to realize the information recording medium 15 having excellent overwrite characteristics and high reliability, even when the first interface layer 103 is formed partially or entirely in contact with the recording layer 104.

The content of $Cr_2O_3$, $Ga_2O_3$, or $In_2O_3$ in the first interface layer 103 is preferably 10 mol % or higher in order to ensure bonding with the recording layer 104. The content of $Cr_2O_3$ in the first interface layer 103 is preferably not higher than 70 mol % in order to keep the light absorption by the first interface layer 103 low. Higher content of $Cr_2O_3$ tends to increase the absorption of light.

The first interface layer 103 may be formed from a material that contains Si in addition to Cr, Ga, In, Zr, Hf, Y and O. When Si is contained in the form of $SiO_2$ in the first interface layer 103, for example, transparency is enhanced and the first information layer 16 having high recording performance can be made. The content of $SiO_2$ in the first interface layer 103 is preferably 5 mol % or higher, and is preferably 50 mol % or lower in order to ensure bonding with the recording layer 104, and is more preferably in a range of from 10 mol % to 40 mol %.

The thickness of the first interface layer 103 is preferably within a range of from 0.5 nm to 15 nm so that the change in the intensity of reflected light before and after recording of the information layer 16 would not decrease due to the optical absorption by the first interface layer 103, and is more preferably within a range of from 1 nm to 10 nm.

The second dielectric material layer 106 may be formed from a material similar to that of the first dielectric material layer 102. The thickness of the second dielectric material layer 106 is preferably within a range of from 2 nm to 75 nm, and more preferably from 2 nm to 40 nm. When the thickness of the second dielectric material layer 106 is within this range, the layer can effectively dissipate the heat generated in the recording layer 104 toward the reflective layer 108.

The recording layer 104 is formed from a material that undergoes phase change between crystal phase and amorphous phase when irradiated with the laser beam 11 the information recording medium of the present invention, the recording layer 104 is formed from a material that contains Sb and at least one element selected from among Zn, Si and C in total proportion of 85 atomic % or more, and can undergo reversible phase change. Specifically, the recording layer 104 may be formed to contain the material represented by the formula (1), or formed solely from this material (so that the recording layer 104 has the composition represented by the formula (1)):

$$Sb_{100-a1}M1_{a1}(\text{atomic \%}) \qquad (1)$$

wherein M1 represents at least one element selected from among Zn, Si and C.

It is made possible to raise the crystallization temperature to around 200° C. and improve the stability of the amorphous phase by combining Sb and M1. Higher proportion of Sb in the combination of Sb and M1 improves the crystallization rate and leads to more favorable erasability. Lower proportion of Sb stabilizes the amorphous phase and improves the recording power. Accordingly, a1 that represents the proportion in atomic % in the formula (1) preferably satisfies a relationship of 0<a1≦50, and more preferably 2≦a1≦20.

The recording layer 104 may also be formed to contain the material represented by the formula (2) that undergoes reversible phase change, or formed solely from this material (so that the recording layer 104 has the composition represented by the formula (2)):

$$Sb_{100-a2}Zn_{a2}(\text{atomic \%}) \qquad (2)$$

The subfix a2 that represents the proportion in atomic % in the formula (2) preferably satisfies a relationship of 0<a2≦30, and more preferably 2≦a2≦15, for reasons similar to those described above.

The recording layer 104 may also be formed to contain the material represented by the formula (3) that undergoes reversible phase change, or formed solely from this material (so that the recording layer 104 has the composition represented by the formula (3)):

$$Sb_{100-a3}Si_{a3}(\text{atomic \%}) \qquad (3)$$

The subfix a3 that represents the proportion in atomic % in the formula (3) preferably satisfies a relationship of 0<a3≦30, and more preferably 2≦a3≦15, for reasons similar to those described above.

The recording layer 104 may also be formed to contain the material represented by the formula (4) that undergoes reversible phase change, or formed solely from this material (so that the recording layer 104 has the composition represented by the formula (4)):

$$Sb_{100-a4}C_{a4}(\text{atomic \%}) \qquad (4)$$

The subfix a4 that represents the proportion in atomic % in the formula (4) preferably satisfies a relationship of 0<a4≦50, and more preferably 2≦a4≦30, for reasons similar to those described above.

The recording layer 104 may also be formed to contain the material represented by the formula (5) that undergoes reversible phase change, or formed solely from this material (so that the recording layer 104 has the composition represented by the formula (5)):

$$Sb_{100-a5}(SiC)_{a5} \text{(atomic \%)} \quad (5)$$

The subfix a5 that represents the proportion in atomic % in formula (5) preferably satisfies a relationship of $0<a5\leq30$, and more preferably $2\leq a5\leq20$, for reasons similar to those described above.

In addition to the materials represented by the formulas (1) through (5), the recording layer 104 may also be formed from a material that contains at least one element selected from among Ga, Ge, Ag, In, Sn, Te and Bi Specifically, the recording layer 104 may be formed to contain the material represented by the formula (6) or formed solely from this material (so that the recording layer 104 has the composition represented by the formula (6)):

$$Sb_{100-a6-b6}M1_{a6}M2_{b6} \text{(atomic \%)} \quad (6)$$

wherein M1 represents at least one element selected from among Zn, Si and C, M2 represents at least one element selected from among Ga, Ge, Ag, In, Sn, Te and Bi.

In the material represented by the formula (1), too, high proportion of Sb increases the crystallization rate (or the crystallization speed) and improves the erasability. Lower proportion of Sb stabilizes the amorphous phase and improves the recording power. Accordingly, a6 and b6 that represent proportions in atomic % satisfy relationships of $0<a6\leq50$ and $0<b6\leq15$, and more preferably $2\leq a6\leq30$ and $1\leq b6\leq10$. When this material is used, the added component M2 stabilizes the amorphous phase and improves the recording power further.

In the case where the recording layer 104 contains a material other than the materials represented by the formulas (1) through (6), proportion of the other material is set so that total proportion of Sb and M1 is not less than 85 atomic % of the entire materials that constitute the recording layer 104. In the case where the thickness of the recording layer 104 is less than 6 nm, it is preferable that total proportion of Sb and M1 is not less than 95 atomic %, in order to prevent the crystallization rate from lowering.

The recording layer 104 may also be formed from a material that, in addition to the materials represented by the formulas (1) through (6), contains at least one element selected from among B, Mg, Al, S, Ca, Sc, Ti, V, Cr, Mn, Fe, Co, Ni, Cu, Sr, Y, Zr, Nb, Mo, Ru, Rh, Pd, Hf, Ta, W, Ir, Pt, Au, La, Ce, Pr, Nd, Sm, Eu, Gd, Tb, Ly, Ho, Er, Tm, Yb and Lu. In this case, the added element can stabilize the amorphous phase and improves the recording power. Or, these elements may be contained inevitably in the recording layer 104. These elements are preferably contained in the recording layer 104 in a proportion of from 1 atomic % to 5 atomic %.

The thickness of the recording layer 104 is preferably in a range of from 6 nm to 15 nm, so as to increase the recording sensitivity of the information layer 16. When the recording layer 104 is thick, even within this range, diffusion of heat in the plane direction has significant thermal influence on the adjacent regions. When the recording layer 104 is thin, a reflectance of the information layer 16 decreases. Accordingly, the thickness of the recording layer 104 is more preferably in a range from 8 nm to 13 nm. In the case where the recording layer is formed with a thickness less than 6 nm, it is preferable that total proportion of Sb and M1 is set to 95 atomic % or higher, in order to prevent the crystallization rate from lowering, as described above. This also applies to the case of the multi-layer optical information recording medium that has a plurality of information layers.

The recording layer 104 may also be formed as a recording section constituted by stacking two or more layers selected from among a layer containing Sb, a layer containing M1 (wherein M1 represents at least one element selected from among Zn, Si and C), a layer containing M2 (wherein M2 represents at least one element selected from among Ga, Ge, Ag, In, Sn, Te and Bi), a layer containing Sb-M1, a layer containing Sb-M2, a layer containing M1-M2 and a layer containing Sb-M1-M2. In this specification, the symbol "-" is used to indicate a mixture or an alloy.

The layer containing Sb means a layer that contains Sb in a proportion of 60 atomic % or more (without containing M1 or M2). The layer containing M1 means a layer containing M1 in a proportion of 60 atomic % or more (without containing M2). The layer containing M2 means a layer containing M2 in a proportion of 60 atomic % or more (without containing M1). The layer containing Sb-M1 means a layer containing Sb and M1 (without containing M2) with Sb content of 50 atomic % or more. The layer containing Sb-M2 means a layer containing Sb in a proportion of 60 atomic % or more. The layer containing M1-M2 means a layer containing M1 and M2 in a total proportion of 60 atomic % or more. The layer containing Sb-M1-M2 means a layer containing Sb, M1 and M2 with Sb content of 50 atomic or more.

It is particularly preferable that the recording section has at least a stacked structure of the layer containing Sb-M1 and the layer containing Sb-M2. In this case, the layer containing Sb-M1 may contain C in a proportion of 50 atomic % or less, and the layer containing Sb-M2 may contain at least one element selected from among Ge and Te in a proportion of 30 atomic % or less. The layer containing Sb-M1 has a relatively high crystallization rate. The amorphous phase of the layer containing Sb-M2 is relatively stable. Accordingly, the recording power and erasability of the phase change type information recording medium can be easily adjusted by employing a structure in which these layers are stacked. The layer containing Sb-M2 may contain, for example, any one of Sb—Ga, (Sb—Te)—Ga, Sb—Ge, (Sb—Te)—Ge, Sb—In, (Sb—Te)—In and (Sb—Te)—Ag—In.

The recording section may also have a stacked structure that includes the layer containing Sb-M1 and the layer containing M2. In this case, the layer containing Sb-M1 may contain C in a proportion of 50 atomic % or less, and the layer containing M2 may contain Te in a proportion of 40 atomic % or more. The layer containing Sb-M1 has a relatively high crystallization rate. The amorphous phase of the layer containing M2 is relatively stable. Accordingly, the recording power and erasability of the phase change type information recording medium can be easily adjusted by employing a structure in which these layers are stacked. The layer containing M2 may contain, for example, any of GeTe, (Ge—Sn)Te, GeTe—Sb$_2$Te$_3$, (Ge—Sn)Te—Sb$_2$Te$_3$, GeTe—Bi$_2$Te$_3$, (Ge—Sn)Te—Bi$_2$Te$_3$, GeTe—(Sb—Bi)$_2$Te$_3$, (Ge—Sn)Te—(Sb—Bi)$_2$Te$_3$, GeTe—(Bi—In)$_2$Te$_3$ and (Ge—Sn)Te—(Bi—In)$_2$Te$_3$.

The stacked structure may be exemplified by the following:
Sb—C (1 nm)/(Sb—Te)—Ge (9 nm),
Sb—C (1 nm)/(GeTe)-(Sb—Ge) (9 nm),
Sb—C (1 nm)/(Sb—Ge)—Te (9 nm),
Sb—Si (2 nm)/(Sb—Te)—Ge (8 nm),
Sb—Zn (3 nm)/Sb—Ge (7 nm),
Sb—SiC (2 nm)/Sb—Ge (8 nm),
Sb—C (0.5 nm)/(Sb—Te)—Ge (9 nm)/Sb—C (0.5 nm),
Sb—Si (1 nm)/(Sb—Te)—Ge (8 nm)/Sb—Si (1 nm),
Sb—Zn (1.5 nm)/Sb—Ge (7 nm)/Sb—Zn (1.5 nm),
Sb—SiC (1 nm)/Sb—Ge (8 nm)/Sb—SiC (1 nm).

Other examples are as follows:

Sb—C (5 nm)/GeTe (1 nm),
Sb—Si (4 nm)/GeTe—Sb$_2$Te$_3$ (2 nm),
Sb—Zn (3 nm)/GeTe—Bi$_2$Te$_3$ (3 nm),
Sb—SiC (4 nm)/(Ge—Sn)Te—Bi$_2$Te$_3$ (2 nm),
Sb—C (2.5 nm)/GeTe (1 nm)/Sb—C (2.5 nm),
Sb—Si (2 nm)/GeTe—Sb$_2$Te$_3$ (2 nm)/Sb—Si (2 nm),
Sb—Zn (1.5 nm)/GeTe—Bi$_2$Te$_3$ (2 nm)/Sb—Zn (1.5 nm),
Sb—SiC (2 nm)/(Ge—Sn)Te—Bi$_2$Te$_3$ (2 nm)/Sb—SiC (2 nm).

Layers that contain materials other than those listed above may of course be used. Such a structure having the layers of thicknesses other than exemplified above, or a structure having the layers stacked in a different order may also be employed. For example, the proportions of the respective films in each film structure exemplified above may be regarded as a preferable thickness ratio, and the thicknesses exemplified above may be multiplied by 2 to 4 while keeping the thickness ratio, in accordance to the desired thickness of the recording section.

The recording section may also be constituted in such a structure in which a larger number of thin layers are stacked orderly like the super-lattice structure employed for laser diode, which makes it possible to improve the recording power and the erasability further. Examples of the recording section that has such a stacked structure are as follows.

Sb (1 nm)/C (0.5 nm)/Sb (1 nm)/C (0.5 nm)/Sb (1 nm),
C (0.5 nm)/Sb (1 nm)/C (0.5 nm)/Sb (1 nm)/C (0.5 nm),
Sb (1 nm)/Si (0.5 nm)/Sb (1 nm)/Si (0.5 nm)/Sb (1 nm),
Si (0.5 nm)/Sb (1 nm)/Si (0.5 nm)/Sb (1 nm)/Si (0.5 nm),
Sb (1 nm)/Zn (0.5 nm)/Sb (1 nm)/Zn (0.5 nm)/Sb (1 nm),
Zn (0.5 nm)/Sb (1 nm)/Zn (0.5 nm)/Sb (1 nm)/Zn (0.5 nm),
Sb (1 nm)/SiC (0.5 nm)/Sb (1 nm)/C (0.5 nm)/Sb (1 nm)/SiC (0.5 nm)/Sb (1 nm),
SiC (0.5 nm)/Sb (1 nm)/C (0.5 nm)/Sb (1 nm)/C (0.5 nm)/Sb (1 nm)/SiC (0.5 nm),
Sb (1 nm)/Sb—C (0.5 nm)/Sb (1 nm)/Sb—C (0.5 nm)/Sb (1 nm),
Sb—C (0.5 nm)/Sb (1 nm)/Sb—C (0.5 nm)/Sb (1 nm)/Sb—C (0.5 nm)

Layers that contain materials other than those listed above may of course be used. Such a structure having the layers of thicknesses other than exemplified above, or a structure having the layers stacked in a different order may also be employed. For example, the proportions of the respective films in each film structure exemplified above may be regarded as a preferable thickness ratio, and the thicknesses exemplified above may be multiplied by 2 to 4 while keeping the thickness ratio, in accordance to the desired thickness of the recording section.

Regardless of which of the stacked structures is employed, it is preferable that thickness of the recording section (total thickness of two or more layers) is in a range of from 6 nm to 15 nm, in order to achieve high recording sensitivity of the information layer 16. When the recording section is thick, even within this range, diffusion of heat in the plane direction and has significant thermal influence on the adjacent regions. When the recording section is thin, the reflectance of the information layer 16 decreases. Accordingly, the thickness of the recording section is more preferably in a range of from 8 nm to 13 nm.

Each layer contained in the recording section may further contain at least one element selected from among B, Mg, Al, S, Ca, Sc, Ti, V, Cr, Mn, Fe, Co, Ni, Cu, Sr, Y, Zr, Nb, Mo, Ru, Rh, Pd, Hf, Ta, W, Ir, Pt, Au, La, Ce, Pr, Nd, Sm, Eu, Gd, Tb, Dy, Ho, Er, Tn, Yb and Lu.

Of the stacked structures exemplified above, it is particularly preferable that the recording section contains at least one element selected from among Zn, Si and C, and Sb in 85 atomic % or more in total. Alternatively, the recording section preferably contains 75 atomic %, more preferably 80 atomic % or more Sb as a whole. Or, in the case where at least one layer of the recording section contains at least one element selected from among Zn, Si and C, and Sb in 85 atomic % or more in total, good recording power and good erasability can be achieved even when the proportion of Sb in the entire composition is low. It is also preferable that the recording section as a whole contains one of the materials represented by the formulas (1) through (6). Thus it is preferable to constitute the recording section by determining the compositions of the constituent layers by giving consideration to the desirable composition as a whole.

The second interface layer (not shown) may also be provided between the recording layer 104 and the second dielectric material layer 106. In the case where the second interface Layer is provided in the information recording medium 15 shown in FIG. 1, the second interface layer can be represented as a layer denoted by reference numeral 105 disposed between a layer denoted by reference numeral 104 and a layer denoted by reference numeral 106. The second interface layer, similarly to the first interface layer 103, is provided to prevent material transfer from being caused by overwriting operations between the first dielectric material layer 106 and the recording layer 104.

The second interface layer can be formed by using the materials exemplified for the first dielectric material layer 102. Among the materials, it is preferable to use a material that contains In and O. In and O preferably form an oxide, that is, In$_2$O$_3$. The second interface layer may also be formed from a material that particularly contains Cr and O. Cr and O preferably form an oxide, that is, Cr$_2$O$_3$. The second interface layer 105 may also be formed from a material that particularly contains Ga and O. Ga and O are materials which preferably form an oxide, that is, Ga$_2$O$_3$.

The second interface layer may include, similarly to the first interface layer 103, besides In and O, Cr and O or Ga and O, at least one element selected from among Zr, Hf and Y, or contain Si in addition to In, Cr, Ga, Zr, Hf, Y and O. Since the second interface layer tends to present lower bonding than the first interface layer 103, lower limit of the preferable content of In$_2$O$_3$, Cr$_2$O$_3$ or Ga$_2$O$_3$ in the second interface layer is 20 mol % that is higher than that in the first interface layer 103.

The thickness of the second interface layer 105 is, similarly to the first interface layer 103, preferably in a range of from 0.5 nm to 15 nm, and more preferably from 1 nm to 10 nm.

The reflective layer 108 has an optical function of increasing the intensity of light absorbed by the recording layer 104. The reflective layer 108 also has a thermal function of quickly dispersing the heat generated in the recording layer 104 so that the recording layer 104 can easily turn amorphous. Moreover the reflective layer 108 has a function of protecting the multi-layer film from the operating environment.

The reflective layer 108 may be formed from an elemental metal having high heat conductivity such as Ag, Au, Cu or Al. An alloy such as Al—Cr, Al—Ti, Al—Ni, Al—Cu, Au—Pd, Au—Cr, Ag—Cu, Ag—Pd, Ag—Pd—Cu, Ag—Pd—Ti, Ag—Ru—Au, Ag—Cu—Ni, Ag—Zn—Al, Ag—Nd—Au, Ag—Nd—Cu, Ag—Bi, Ag—Ga, Ag—Ga—In, Ag—Ga—Cu, Ag—In, Ag—In—Sn or Cu—Si may also be used. An alloy that contains 50 atomic % or more Ag, in particular, has high heat conductivity and is preferably used to form the reflective layer 108.

The thickness of the reflective layer 108 is preferably 30 nm or more, so that the heat dissipation effect can be fully achieved. However, when the reflective layer 108 is thicker than 200 nm, heat dissipation effect is achieved excessively, and recording sensitivity of the information layer 16 may decrease. Therefore, the thickness of the reflective layer 108 is more preferably in a range of from 30 nm to 200 nm.

An interface layer may also be disposed between the reflective layer 108 and the second dielectric material layer 106. In the case where the interface layer is provided in the information recording medium 15 shown in FIG. 1, the interface layer may be formed as a layer denoted by reference numeral 107 disposed between a layer denoted by reference numeral 108 and a layer denoted by reference numeral 106. In this case, the interface layer preferably formed from a material that has lower heat conductivity than that of the material described for the reflective layer 108. In the case where the reflective layer 108 is formed from an Ag alloy, the interface layer may be formed, for example, from Al or an Al alloy.

The materials for interface layer include:
an element such as Cr, Ni, Si or C,
an oxide such as $TiO_2$, $ZrO_2$, $HfO_2$, ZnO, $Nb_2O_5$, $Ta_2O_5$, $SiO_2$, $SnO_2$, $Al_2O_3$, $Bi_2O_3$, $Cr_2O_3$, $Ca_2O_3$, $In_2O_3$, $Sc_2O_3$, $Y_2O_3$, $La_2O_3$ $Gd_2O_3$, $Dy_2O_3$, $Yb_2O_3$, CaO, MgO, $CeO_2$ or $TeO_2$,
a nitride such as C—N, Ti—N, Zr—N, Nb—N, Ta—N, —N, Ge—N, Cr—N, Al—N, Ge—Si—N and Ge—Cr—N,
a sulfide such as ZnS, a carbide such as SiC,
a fluoride such as $LaF_3$ or $CeF_3$ and
C.

The interface layer may also be formed from a mixture of one or more materials selected from among those listed above. The thickness of the interface layer 107 is more preferably in a range of from 3 nm to 100 nm, and more preferably from 10 nm to 50 nm.

In the information layer 16, it is preferable that an inequality $R_a < R_c$ is satisfied wherein $R_c$ (%) is the reflectance of the recording Layer 104 in crystal phase and $R_a$ (%) is the reflectance of the recording layer 104 in amorphous phase. This enables it to achieve higher reflectance in the initial state where information is not yet recorded, thereby enabling a stable recording and reproducing operation. In order to achieve excellent recording and reproducing characteristics by increasing the difference in reflectivity ($R_c - R_a$), it is preferable that $R_a$ and $R_c$ satisfy relationships $0.2 \leq R_a \leq 10$ and $12 \leq R_c \leq 40$, and more preferably $0.2 \leq R_a \leq 5$ and $12 \leq R_c \leq 30$.

The information recording medium 15 may be manufactured by a method described below.

First, the information layer 16 is formed on the substrate 14 (having a thickness of, for example, 1.1 mm). The information layer is formed in single-layer or multi-layer constitution. Layers that constitute the information layer can be formed by successively sputtering the sputtering targets are suitable for forming the constituent respective layers.

Specifically, first, the reflective layer 108 is formed on the substrate 14. The reflective layer 108 can be formed by sputtering a sputtering target formed from a metal or an alloy that constitutes the reflective layer 108, in an atmosphere of rare gas (for example, argon gas) or an atmosphere of mixed gas of rare gas and reaction gas (at least one kind of gas selected from among $O_2$ and $N_2$), by using a DC power supply, pulse DC power supply or high frequency (RF) power supply. Since the reflective layer 108 is a metal layer or an alloy layer, it is preferably formed by sputtering by means of a DC power supply or pulse DC power supply that is capable of increasing the film growing rate.

Then the interface layer is formed as required on the reflective layer 108. The interface layer can be formed by sputtering a sputtering target formed from an element or a compound that constitutes the interface layer, in an atmosphere of rare gas or an atmosphere of mixed gas of rare gas and reaction gas, by using a DC power supply, a pulse DC power supply or an RF power supply. In the case where the interface layer is formed from an electrically conductive material, a DC power supply or pulse DC power supply are preferably used since they are capable of increasing the film formation rate. In the case where the interface layer is formed from an insulating material, an RF power supply is preferably used.

Then the second dielectric material layer 106 is formed on the reflective layer 108 or on the interface layer. The second dielectric material layer 106 can be formed by sputtering a sputtering target formed from a compound that constitutes the second dielectric material layer 106, in an atmosphere of rare gas or an atmosphere of mixed gas of rare gas and reaction gas (particularly $O_2$ gas) by using RF power supply. In order to increase the film formation rate, a sputtering target to which electrical conductivity is conferred is formed from the material of the second dielectric material layer 106 with a small amount of an electrically conductive material added may be sputtered by means of a DC power supply or a pulse DC power supply. The second dielectric material layer 106 may also be formed by carrying out reactive sputtering of a sputtering target formed from a metal in an atmosphere of mixed gas of rare gas and reaction gas by using a DC power supply, a pulse DC power supply or an RF power supply.

The second dielectric material layer 106 may also be formed by simultaneously sputtering a plurality of kinds of sputtering targets formed from single component at the same time by using a plurality of power supplies. Alternatively, the second dielectric material layer 106 may also be formed by sputtering binary or tertiary sputtering targets comprising a combination of two or more compounds simultaneously by using a plurality of power supplies. Regardless of which of these sputtering targets is used, the sputtering operation may be carried out in an atmosphere of rare gas or an atmosphere of mixed gas of rare gas and reaction gas (particularly $O_2$ gas).

Then the second interface layer is formed, as required, on the reflective layer 108, the interface layer 107 or the second dielectric material layer 106. The second interface layer can be formed by a method similar to that for the second dielectric material layer 106.

Then the recording layer 104 is formed on the second dielectric material layer 106 or the second interface layer 105. The recording layer 104 can be formed by sputtering a sputtering target that contains at least one element selected from among Zn, Si and C, and Sb by using a single power supply. Specifically, the recording layer can be formed by sputtering a sputtering target, of which composition is adjusted to contain the material represented by one of formulas (1) through (5), or to be formed solely from the material, by using a single power supply.

The recording layer 104 may also be formed by sputtering another sputtering target that is formed by adding at least one element selected from among Ga, Ge, Ag, In, Sn, Te and Bi to the sputtering target described above, by using a single power supply. Specifically, the recording layer can be formed by sputtering a sputtering target, of which composition is adjusted to contain the material represented by the formula (6), or to be formed solely from the material, by using a single power supply.

The recording layer 104 may also be formed by sputtering two or more sputtering targets selected from sputtering targets represented by Sb, M1 (wherein M1 represents at least one element selected from among Zn, Si and C), M2 (wherein M2 represents at least one element selected from among Ga, Ge, Ag, In, Sn, Te and Bi), Sb-M1, Sb-M2, M1-M2 and Sb-M1-M2, simultaneously by using two or more power supply. In this case, composition of the recording layer obtained is determined by types and number of the sputtering targets used, output of the power supply and other factors. Accordingly, it is preferable to appropriately set these factors so as to obtain the recording layer 104 of the desired composition. It is advantageous to use two or more types of sputtering targets when, for example, it is difficult to prepare a sputtering target having a mixed composition.

The recording layer 104, when formed in the form of recording section consisting of two or more layers, may also be formed by sputtering two or more types of sputtering targets selected from sputtering targets represented by Sb, M1 (wherein M1 represents at least one element selected from among Zn, Si and C), M2 (wherein M2 represents at least one element selected from among Ga, Ge, Ag, In, Sn, Te and Bi), Sb-M1, Sb-M2, M1-M2 and Sb-M1-M2, successively and/or simultaneously by using two or more power supplies. That is, the recording section may be formed by carrying out the sputtering operations twice or more by using two or more sputtering targets, or by sputtering two or more types of sputtering targets at the same time.

Regardless of whether the recording layer 104 is formed in single-layer structure or in the form of recording section, any of the sputtering targets described above may further contain at least one element selected from among B, Mg, Al, S, Ca, Sc, Ti, V, Cr, Mn, Fe, Co, Ni, Cu, Sr, Y, Zr, Nb, Mo, Ru, Rh, Pd, Hf, Ta, W, Ir, Pt, Au, La, Ce, Pr, Nd, Sm, Eu, Gd, Tb, Dy, Ho, Er, Tm, Yb and Lu.

In either case of forming the recording layer in single-layer structure or in the form of recording section, the sputtering operation may be carried out in an atmosphere of rare gas or an atmosphere of mixed gas of rare gas and a reaction gas (at least one kind of gas selected from among $O_2$ and $N_2$). A DC power supply, a pulse DC power supply or a RF power supply may be used as the sputtering power supply.

Then the first interface layer 103 is formed as required on the recording layer 104. The first interface layer 103 can be formed by a method similar to that for forming the second dielectric material layer 106.

Then the first dielectric material layer 102 is formed on the recording layer 104 or the first interface layer 103. The first dielectric material layer 102 can be formed by a method similar to that for forming the second dielectric material layer 106.

Last, the transparent layer 13 is formed on the first dielectric material layer 102. The transparent layer 13 can be formed by applying a photo-curable resin (particularly an ultraviolet-curable resin) or a delayed-action resin on the first dielectric material layer 102, subjecting it to spin coating operation and curing the resin. A transparent disk-shaped substrate may be used as the transparent layer 13. The substrate is formed, for example, from a resin such as polycarbonate, amorphous polyolefin or PMMA or glass, In this case, the transparent layer 13 can be formed by applying the photo-curable resin (particularly the ultraviolet-curable resin) or the delayed-action resin on the first dielectric material layer 102, putting the substrate into contact with the first dielectric material layer 102, subjecting the substrate in contact with the layer 102, to spin coating operation, then curing the resin. Alternatively, the substrate with an adhesive resin applied uniformly thereon may be put into contact with the first dielectric material layer 102 by using the adhesive resin.

After forming the first dielectric material layer 102, or after forming the transparent layer 13, initialization process may be carried out as required by crystallizing the recording layer 104 over the entire surface thereof. Crystallization of the recording layer 104 is carried out generally by irradiating it with laser beam The information recording medium 15 can be manufactured as described above. In this embodiment, the layers are formed by the sputtering process. However, the process of forming the layers is not restricted to this, and a vacuum deposition process, an ion plating process, a CVD process, an MBE process or the like may also be employed.

Second Embodiment

Figure 2:
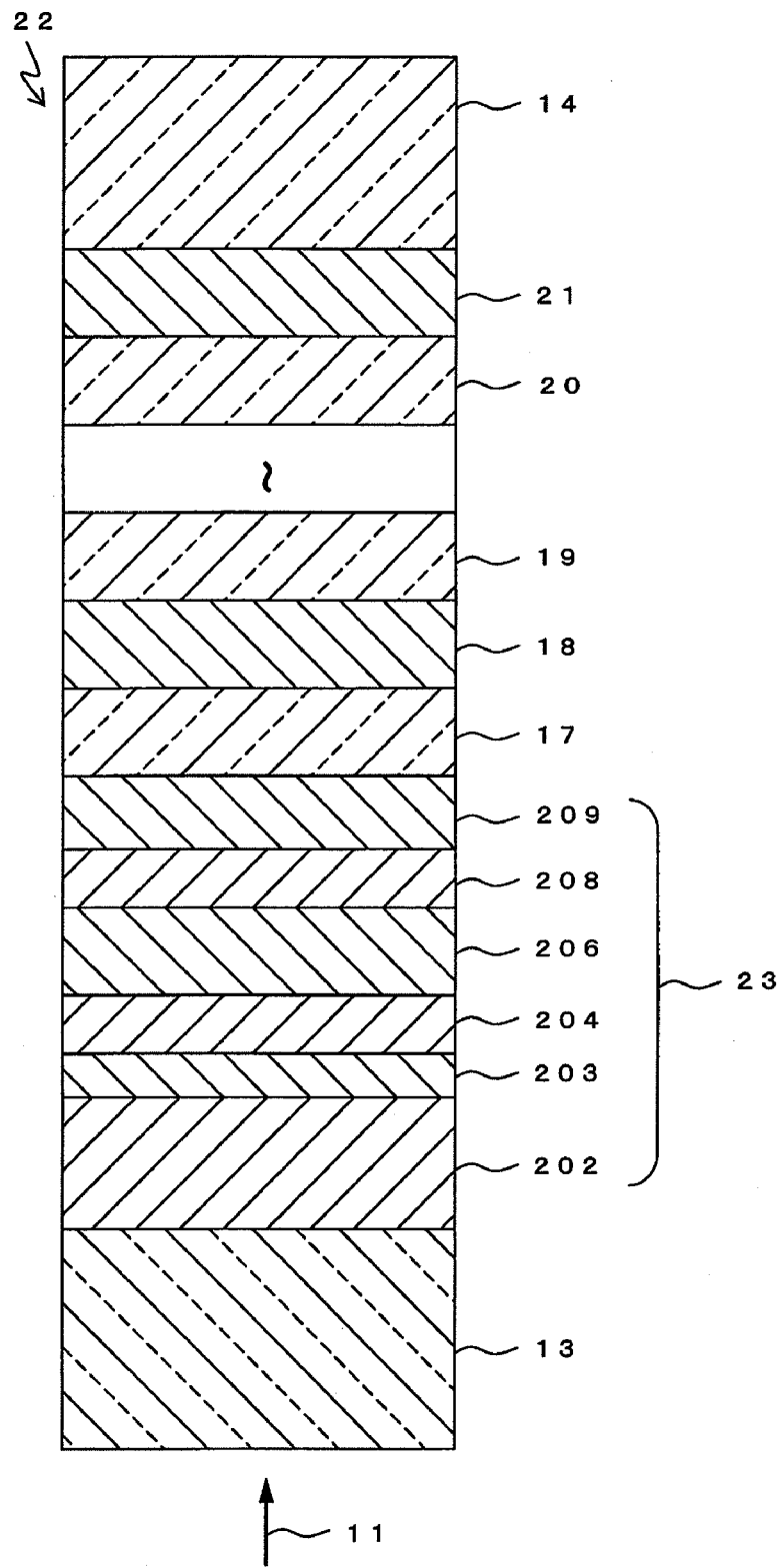
FIG. 2 is a partial sectional view schematically showing an example of layer constitution of an information recording medium having N information layers of the present invention.

Another example of the information recording medium of the present invention will be described as the second embodiment. A partial sectional view of the information recording medium 22 of the second embodiment is shown in FIG. 2. The information recording medium 22 is a multi-layer optical information recording medium on and from which information can be recorded and reproduced by irradiation of the unidirectional laser beam 11 thereof (namely with a laser beam that is applied to only one surface).

The information recording medium 22 is constituted from N sets (N is 2 or greater natural number) of information layers including the $N_{th}$ information layer 21, the second information layer 18 and the first information layer 23, and the transparent layer 13 that are formed successively on the substrate 14. Optical separation layers 20, 19, . . . 17 are disposed between the information layers. In the illustrated embodiment, the information layers other than the $N_{th}$ information layer 21, namely the first information Layer 23, the second information layer 18, . . . the $(N-1)_{th}$ information layer (hereafter the information layer located at the Kth ($1 \leq K \leq N$) position when counted from the surface whereon the laser beam is incident will be referred to as the Kth information layer) are light transmission type information layers. The substrate 14 and the transparent layer 13 may be formed from material similar to that described in the first embodiment, and configurations and the functions thereof are described above in connection with the first embodiment.

The optical separation layers 20, 19, . . . and 17 are formed from a resin such as a photo-curable resin (particularly an ultraviolet-curable resin) or a delayed-action resin, or a dielectric material. The optical separation Layers 20, 19, . . . and 17 preferably have low optical absorbance to the laser beam 11 being used, and a low birefringence coefficient in the short wavelength range.

The optical separation layers 20, 19, . . . and 17 are provided for the purpose of distinguishing the focusing positions of the first information layer 23, the second information layer 18, and $N_{th}$ information layer 21 of the information recording medium 22. Thicknesses of the optical separation layers 20, 19, . . . and 17 must not be smaller than the focal depth $\Delta Z$ that is determined by the numerical aperture NA of the objective lens and the wavelength $\lambda$ of the laser bean 11. Assuming that a criterion for the intensity at the focal point is set to 80% of that of an aplanatic lens, $\Delta Z$ can be approximated as $\Delta Z = \lambda / \{2(NA)^2\}$. When $\lambda = 405$ nm and NA=0.85, $\Delta Z = 0.280$ μm is obtained which means that a region within ±0.3 μm falls in the focal depth. This implies that each of the optical separation layers 20, 19, . . . and 17 must have thickness not less than 0.6 μm.

The distance between two neighboring information layers and the distance between the first information layer 23 and the Nth information layer that is farthest therefrom are preferably set so that the laser beam 11 can be focused by using the objective lens. Accordingly, total thickness of the optical separation layers 20, 19, . . . and 17 is preferably set within a tolerance (for example, 50 μm or less) permitted by the objective lens.

The optical separation layers 20, 19, . . . and 17 may optionally have guide grooves formed to guide the laser beam on the surface where the laser beam 11 enters. In this case, information can be recorded on and reproduced from the $K_{th}$ information layer (K is a natural number satisfying $1<K\leqq N$) by means of the laser beam 11 that has transmitted through the first through the $(K-1)_{th}$ information layers by irradiating only on one side of the medium with the laser beam 11.

One of the N information layers may be used as a read-only memory (ROM) type information layer for reproduction only or a write once (WO) information layer that allows recording only once.

Now the constitution of the first information layer 23 will be described in detail.

The first information layer 23 includes a third dielectric material layer 202, a first recording layer 204 and a fourth dielectric material layer 206 that are disposed in this order from the side whereon the laser beam 11 enters. As required, a first reflective layer 208, and/or a transmittance adjustment layer 209 may also be provided. A third interface layer 203 may also be provided between the third dielectric material layer 202 and the first recording layer 204. The interface layer and two dielectric material layers that constitute the first information layer are referred to as the third interface layer and the third and fourth dielectric material layers for convenience. These layers may also be identified under another rule, such as naming them with the ordinal number as first, second and so on from the side on which the laser beam 11 enters.

The third dielectric material layer 202 may be formed from a material similar to that of the first dielectric material layer 102 of the first embodiment. Function of this layer is similar to that of the first dielectric material layer 102 of the first embodiment.

The thickness of the third dielectric material layer 202 can be exactly determined by calculation based on matrix method, so as to satisfy the conditions for achieving greater change in the amount of reflected light between a case where the first recording layer 204 is in crystal phase and a case where it is amorphous, and achieving greater absorption of light by the first recording layer 204 and higher transmittance of the first information layer 23.

The third interface layer 203, that is provided as required, can be formed by using a material similar to that used for the first interface layer 103 of the first embodiment. Function and configuration of the third interface layer 203 are similar to those of the first interface layer 103 of the first embodiment.

The fourth dielectric material layer 206 serves to adjust the optical distance so as to improve the optical absorption efficiency of the first recording layer 204, and to increase the change in the amount of reflected light before and after recording, so as to increase the signal intensity. The fourth dielectric material layer 206 can be formed from a material similar to that used for the second dielectric material layer 106 of the first embodiment. The thickness of the fourth dielectric material layer 206 is preferably within a range of from 0.5 nm to 75 nm, and more preferably from 1 nm to 40 nm. The fourth dielectric material layer 206 having a thickness within this range is capable of diffusing heat generated in the first recording layer 204 efficiently toward the first reflective layer 208.

The fourth interface layer may also be disposed between the first recording layer 204 and the fourth dielectric material layer 206. The fourth interface layer can be formed by using a material similar to that used for the second interface layer 105 of the first embodiment. In the case where the fourth interface layer is provided in the information recording medium 22 shown in FIG. 1, the fourth interface layer can be identified as a layer indicated by the reference numeral 205 and located between the layer indicated by the reference numeral 204 and the layer indicated by the reference numeral 206.

The first recording layer 204 can be formed by using a material similar to that used for the recording layer 104 of the first embodiment. In the case where the recording layer of the other information layer contains Sb and M1 in total proportion of 85 atomic % or more, the first recording layer 204 may be formed from other material. For example, the first recording layer 204 may be formed from a material that contains one of GeTe, (Ge—Sn)Te, GeTe—$Sb_2Te_3$, (Ge—Sn)Te—$Sb_2Te_3$, GeTe—$Bi_2Te_3$, (Ge—Sn)Te—$Bi_2Te_3$, GeTe—(Sb—Bi)$_2$Te$_3$, (Ge—Sn)Te—(Sb—Bi)$_2$Te$_3$, GeTe—(Bi—In)$_2$Te$_3$ and (Ge—Sn)Te—(Bi—In)$_2$Te$_3$. The first recording layer 204 may also be formed from a material that is represented by Sb—Ga, (Sb—Te)—Ga, Sb—Ge, (Se—Te)—Ge, Sb—In, (Sb—Te)—In, or (Sb—Te)—Ag—In and contains 50 atomic % or more Sb.

The first information layer 23 is required to have high transmittance so that laser beam 11 with sufficient intensity to record and reproduce the information reaches an information layer located further than the first information layer 23 from the side whereon the laser beam 11 enters. For this reason, the thickness of the first recording layer 204 is preferably 15 nm or less, and more preferably 8 nm or less.

The first recording layer 204 may also be formed from a material that undergoes irreversible phase change, such as Te—O, Te—Pd—O, Bi—O or Sb—O. In this case, the thickness of the first recording layer 204 is preferably not larger than 30 nm. The first recording layer 204 may also be formed by stacking layers of materials that undergo irreversible alloying (for example, Cu/Si stacked layer construction).

The first reflective layer 208, which is provided as required, has an optical function to increase the intensity of light absorbed by the first recording layer 204. The first reflective layer 208 also has a thermal function to quickly dissipate the heat generated in the first recording layer 204 and facilitate the amorphousization of the first recording layer 204. The first reflective layer 208 further has a function to protect the multi-layer film from the operating environment The first reflective layer 208 can be formed by using a material similar to that used for the reflective layer 108 of the first embodiment. An Ag alloy has high heat conductivity, and is therefore preferably used for the material of the first reflective layer 208. The thickness of the first reflective layer 208 is preferably not larger than 20 nm, more preferably not larger than 5 nm, in order to make the transmittance of the first information layer 23 as high as possible. The first reflective layer 208 having thickness in this range is capable of achieving sufficient heat dissipation, ensuring satisfactory level of reflectivity of the first information layer 23 and increasing the transmittance of the first information layer 23 well.

The transmittance adjustment layer 209, that is provided as required, is formed from a dielectric material and has the function to adjust the transmittance of the first information layer 23, particularly in the case of providing the first reflective layer 208. The transmittance adjustment layer 209 enables it to increase both the transmittance $T_C$ (%) of the first information layer 23 when the first recording layer 204 is in crystal phase and the transmittance $T_a$ (%) of the first information layer 23 when the first recording layer 204 is in amorphous phase. Specifically, the transmittance of the first information layer 23 provided with the transmittance adjustment layer 209 is about 2% to 10% higher than that of a case without the transmittance adjustment layer 209. The transmittance adjustment layer 209 also effectively dissipates the heat generated in the first recording layer 204.

A refractive index $n_t$ and an extinction coefficient $k_t$ of the transmittance adjustment layer 209 are preferably set to satisfy $2.0 \leq n_t$ and $k_t \leq 0.1$, more preferably $2.4 \leq n_t \leq 3.0$ and $k_t \leq 0.05$, so that the transmittance $T_c$ and $T_a$ of the first information layer 23 can be further increased.

It is preferable that the thickness L of the transmittance adjustment layer 209 satisfies relationship $(1/32)\lambda/n_t \leq L \leq (3/16)\lambda/n_t$, or $(17/32)\lambda/n_t \leq L \leq (11/16)\lambda/n_t$, and more preferably $(1/16)\lambda/n_t \leq L \leq (5/32)\lambda/n_t$ or $(9/16)\lambda/n_t \leq L \leq (21/32)\lambda/n_t$. When the wavelength λ of the laser beam 11 and the refractive index $n_t$ of the transmittance adjustment layer 209 are set so as to satisfy the relationships 350 nm $\leq \lambda \leq$ 450 nm and $2.0 \leq n_t \leq 3.0$, for example, preferable range of L becomes 3 nm $\leq$ L $\leq$ 40 nm or 60 nm $\leq$ L $\leq$ 130 nm, and more preferable range of L becomes 7 nm $\leq$ L $\leq$ 30 nm or 65 nm $\leq$ L $\leq$ 120 nm. Both the transmittance $T_c$ and $T_a$ of the first information layer 23 can be increased by setting the value of L in this range.

The materials for the transmittance adjustment layer 209 include, for example, $TiO_2$, $ZrO_2$, $HfO_2$, $ZnO$, $Nb_2O_5$, $Ta_2O_5$, $SiO_2$, $Al_2O_3$, $Bi_2O_3$, $CeO_2$, $Cr_2O_3$, $Ga_2O_3$ and Sr—O. Further, the materials for the transmittance adjustment layer 209 include Ti—N, Zr—N, Nb—N, Ta—N, Si—N, Ge—N, Cr—N, Al—N, Ge—Si—N and Ge—Cr—N. Sulfides such as ZnS may also be used. The transmittance adjustment layer 209 may be formed from one compound selected from among the materials listed above, or a mixture of a plurality of compounds. Among these, it is particularly preferable to use $TiO_2$ or a material that contains $TiO_2$. Since these materials have high refractive index (n=2.6 to 2.8) and low extinction coefficient (k=0.0 to 0.05), the transmittance adjustment layer 209 formed from one of these materials enables it to achieve higher transmittance of the first information layer 23.

Values of transmittance $T_c$ and $T_a$ of the first information layer 23 preferably satisfy relationships $40 < T_c$ and $40 < T_a$ and more preferably satisfy $46 < T_c$ and $46 < T_a$, in order to have the laser beam 11, with a sufficient intensity of light required for recording and reproducing information, reach the information layer(s) located farther than the first information layer 23 from the side where the laser beam 11 enters.

Values of transmittance $T_c$ and $T_a$ of the first information layer 23 preferably satisfy relationship of the inequality $-5 \leq (T_c - T_a) \leq 5$, and more preferably $-3 \leq (T_c - T_a) \leq 3$. When $T_c$ and $T_a$ satisfy this requirement, there occurs less influence on a change in the transmittance due to the state of the first recording layer 204 of the first information layer 23 and good recording and reproducing characteristics can be obtained, when recording or reproducing information on or from the information layer(s) located farther than the first information layer 23 from the side where the laser beam 11 enters.

In the information layer 23, it is preferable that reflectance $R_{c1}$ (%) of the first recording layer 204 when it is in crystal phase and reflectance $R_{a1}$ (%) of the first recording layer 204 when it is in amorphous phase satisfy the inequality $R_{a1} < R_{c1}$. This enables it to achieve higher reflectivity in the initial state where information is not yet recorded, thereby enabling stable recording and reproducing operation. In order to achieve favorable recording and reproducing characteristics by increasing the difference in reflectance $(R_{c1} - R_{a1})$, it is preferable that $R_{a1}$ and $R_{c1}$ satisfy relationships $0.1 \leq R_{a1} \leq 5$ and $4 \leq R_{c1} \leq 15$, and more preferably $0.1 \leq R_{a1} \leq 3$ and $4 \leq R_{c1} \leq 10$.

The information recording medium 22 can be manufactured by the method described below.

First, (N−1) information layers are formed on the substrate 14 (having a thickness of, for example, 1.1 mm) with optical separation layers interposed therebetween. The information layer is formed in single-layer or multi-layer constitution. Layers that constitute the information layer can be formed by successively sputtering the sputtering targets that are appropriate for the constituent layers. The optical separation layers can be formed by applying a photo-curable resin (particularly an ultraviolet-curable resin) or a delayed-action resin onto the information layer, then rotating the substrate 14 so as to spread the resin uniformly (spin coating) and curing the resin. In the case where the optical separation layer has a guide groove formed thereon for the laser beam 11, the guide groove can be formed by putting the resin that has not yet cured into contact with the substrate (die) whereon the groove has been formed, rotating the substrate 14 together with the die so as to spin-coat the resin, then curing the resin and then removing the substrate (die).

After stacking the (N−1) information layers with the optical separation layers therebetween on the substrate 14, the optical separation layers 17 are further formed. Then the first information layer 23 is formed on the optical separation layer 17. Specifically, (N−1) information layers are firstly formed interposing the optical separation Layers therebetween, then the substrate 14 having the optical separation layers 17 formed thereon is put into a film formation apparatus, and the transmittance adjustment layer 209 is formed as required on the optical separation layer 17. The transmittance adjustment layer 209 can be formed by a method similar to that for forming the second dielectric material layer 106 of the first embodiment.

Then the first reflective layer 208 is formed as required on the optical separation layer 17 or on the transmittance adjustment layer 209. The first reflective layer 208 can be formed by a method similar to that for forming the first reflective Layer 108 of the first embodiment. Then the fourth dielectric material layer 206 is formed on the optical separation layer 17, the first reflective layer 208 or on the transmittance adjustment layer 209. The fourth dielectric material layer 206 can be formed by a method similar to that for forming the second dielectric material layer 106 of the first embodiment.

Then the fourth interface layer is formed as required on the fourth dielectric material layer 206. The fourth interface layer can be formed by a method similar to that for forming the second dielectric material layer 106 of the first embodiment. Then the first recording layer 204 is formed on the fourth dielectric material layer 206 or on the fourth interface layer. The first recording layer 204 can be formed by a method similar to that for forming the recording layer 104 of the first embodiment by using a sputtering target tailored to the composition of the layer 204.

Then the third interface layer 203 is formed as required on the first recording layer 204. The third interface layer 203 can be formed by a method similar to that for forming the second dielectric material layer 106 of the first embodiment. Then the third dielectric material layer 202 is formed on the third interface layer 203. The third dielectric material layer 202 can be formed by a method similar to that for forming the second dielectric material layer 106 of the first embodiment. Last, the transparent layer 13 is formed on the third dielectric material layer 202. The transparent layer 13 can be formed by the method described in the first embodiment.

After forming the third dielectric material layer 202, or after forming the transparent layer 13, the first recording layer 204 may optionally be crystallized over the entire surface thereof, so as to be initialized. The crystallization of the first recording layer 204 is carried out generally by irradiating it with laser beam.

The information recording medium 22 can be manufactured as described above. In this embodiment, the layers are formed by the sputtering process. But the process of forming the layers is not restricted to this, and the vacuum vapor deposition process, the ion plating process, the CVD process, the MBE process or the like may be employed. Also the information layers other than the first information layer may be formed similarly to the first information layer.

Third Embodiment

Figure 3:
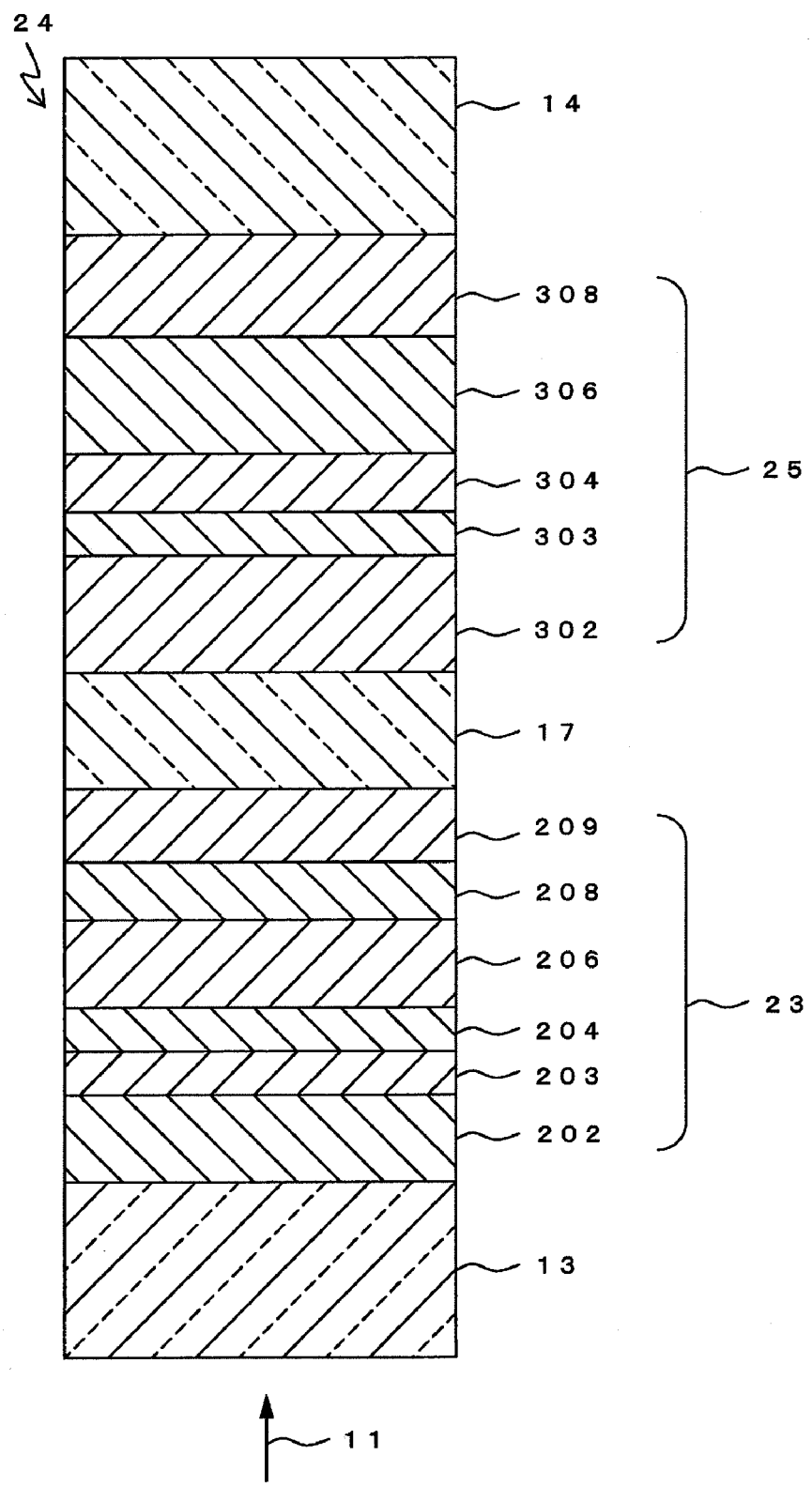
FIG. 3 is a partial sectional view schematically showing an example of layer constitution of an information recording medium having two information layers of the present invention.

Another example of the information recording medium that is constituted from two sets of information layers, namely by setting N=2 in the multi-layer optical information recording medium according to the second embodiment of the present invention will be described as the third embodiment. A partial sectional view of the information recording medium 24 of the third embodiment is shown in FIG. 3. The information recording medium 24 is a double-layer optical information recording medium on and from which information can be recorded and reproduced by irradiation of the unidirectional laser beam 11.

The information recording medium 24 is constituted from a second information layer 25, the optical separation layer 17, the first information layer 23 and the transparent layer 13 formed successively on the substrate 14. The substrate 14, the optical separation layer 17, the first information layer 23 and the transparent layer 13 may be formed from materials described in the first and second embodiments, and configurations and the functions thereof are as described in the first and second embodiments.

Now the constitution of the second information layer 25 will be described in detail.

The second information layer 25 includes a first dielectric material layer 302, a first interface layer 303, a second recording layer 304, a second dielectric material layer 306 and a second reflective layer 308, that are disposed in this order from the side whereon the laser beam 11 enters. Information is recorded on and reproduced from the second information layer 25 by means of the laser beam 11 that has transmitted through the transparent layer 13, the first information layer 23 and the optical separation layer 17.

The first dielectric material layer 302 can be formed by using a material similar to that used for the first dielectric material layer 102 of the first embodiment, and the function thereof is similar to that of the first dielectric material layer 102 of the first embodiment. The ordinal number of "first" is used here for reasons of expediency, and other ordinal number may be used as long as it can distinguish the layer in question from other dielectric material layer. This applies to other layers.

The thickness of the first dielectric material layer 302 can be exactly determined by calculation based on the matrix method, so as to achieve greater change in the intensity of reflected light between a case where the second recording layer 304 is in crystal phase and a case where it is in amorphous phase.

The first interface layer 303 can be formed by using a material similar to that used for the first interface layer 103 of the first embodiment. The first interface layer 303 may or may not be provided as required. Function and configuration of the first interface layer 303 are similar to those of the first interface layer 103 of the first embodiment.

The second dielectric material layer 306 can be formed by using a material similar to that used for the second dielectric material layer 106 of the first embodiment, and function and configuration thereof are similar to those of the second dielectric material layer 106 of the first embodiment.

A second interface layer may also be disposed between the second recording layer 304 and the second dielectric material layer 306 as required. The second interface layer can be formed by using a material similar to that used for the second interface layer 105 of the first embodiment, and function and configuration thereof are the same as those of the second interface layer 105 of the first embodiment. In the case where the second interface layer is provided in the information recording medium 24 shown in FIG. 3, the second interface layer can be identified as a layer indicated by the reference numeral 305 located between the layer indicated by the reference numeral 304 and the layer indicated by the reference numeral 306.

The second recording layer 304 can be formed from a material similar to that used for the recording layer 104 of the first embodiment. In the case where the first recording layer 204 of the first information layer 23 contains Sb and M1 in total proportion of 85 atomic % or more, the second recording layer 304 may be formed from other material. For example, the second recording layer 304 may be formed from a material that contains one of GeTe, (Ge—Sn)Te, GeTe—$Sb_2Te_3$, (Ge—Sn)Te—$Sb_2Te_3$, GeTe—$Bi_2Te_3$, (Ge—Sn)Te—$Bi_2Te_3$, GeTe—(Sb—Bi)$_2$Te$_3$, (Ge—Sn)Te—(Sb—Bi)$_2$Te$_3$, GeTe—(Bi—In)$_2$Te$_3$ and (Ge—Sn)Te—(Bi—In)$_2$Te$_3$. The second recording layer 304 may also be formed from a material that is represented by Sb—Ga, (Sb—Te)—Ga, Sb—Ge, (Sb—Te)—Ge, Sb—In, (Sb—Te)—In, or (Sb—Te)—Ag—In and contains 50 atomic % or more Sb.

In the case where the material of the second recording layer 304 is one that can undergo reversible phase change, the thickness thereof is preferably in a range of from 6 nm to 15 nm in order to improve the recording power of the second information layer 25. When the second recording layer 304 has a larger thickness within this range, diffusion of heat in the plane direction causes larger thermal effect on adjacent regions. When the second recording layer 304 is thinner, reflectance of the second information layer 25 becomes lower. Accordingly, the thickness of the second recording layer 304 is more preferably within a range of from 8 nm to 13 nm. In the case where the second recording layer 304 is formed from a material that undergoes irreversible phase change (for example, Te—Pd—O), the thickness of the second recording layer 304 is preferably in a range of from 10 nm to 40 nm.

The second reflective layer 308 can be formed by using a material similar to that used for the reflective layer 108 of the first embodiment, and function and configuration thereof are similar to those of the reflective layer 108 of the first embodiment.

An interface layer may also be disposed between the second reflective layer 308 and the second dielectric material layer 306. The interface layer can be formed from a material similar to that of the interface layer of the first embodiment, and function and configuration thereof are similar to those of the interface layer of the first embodiment. In the case where the interface layer is provided in the information recording medium 24 shown in FIG. 3, the interface layer can be identified as a layer indicated by the reference numeral 307 located between the layer indicated by the reference numeral 308 and the layer indicated by the reference numeral 306.

The information recording medium 24 can be manufactured by a method described below.

First, the second information layer 25 is formed. Specifically, the substrate 14 (having a thickness of, for example, 1.1 mm) is prepared and placed in a film formation apparatus.

Then the second reflective layer 308 is formed on the substrate 14. In the case where the substrate 14 has guide groove formed thereon for guiding the laser beam 11, the Second reflective layer 308 is formed on the side where the guide groove is formed. The second reflective layer 308 can be formed by a method similar to that for forming the reflective layer 108 of the first embodiment.

Then an interface layer is formed as required on the second reflective layer 308. The interface layer 307 can be formed by a method similar to that forming the interface layer or the second dielectric material layer 106 of the first embodiment.

Then the second dielectric material layer 306 is formed on the second reflective layer 308 or on the interface layer 307. The second dielectric material layer 306 can be formed by a method similar to that for the dielectric material layer 106 of the first embodiment.

Then the second interface layer is formed as required on the second reflective layer 308, the interface layer or the second dielectric material layer 306. The second interface layer can be formed by a method similar to that for forming the second dielectric material layer 106 of the first embodiment.

Then the second recording layer 304 is formed on the second dielectric material layer 306 or on the second interface layer. The second recording layer 304 can be formed by a method similar to that for forming the recording layer 104 of the first embodiment by using a sputtering target tailored to the composition of the layer 304.

Then the first interface layer 303 is formed as required on the second recording layer 304. The first interface layer 303 can be formed by a method similar to that for forming the second dielectric material layer 106 of the first embodiment. Then the first dielectric material layer 302 is formed on the second recording layer 304 or on the first interface layer 303. The first dielectric material layer 302 can be formed by a method similar to that for forming the second dielectric material layer 106 of the first embodiment. The second information layer 25 is formed as described above.

Then the optical separation layer 17 is formed on the first dielectric material layer 302 of the second information layer 25. The optical separation layer 17 can be formed by applying a photo-curable resin (particularly an ultraviolet-curable resin) or a delayed-action resin onto the first dielectric material layer 302, then carrying out spin coating operation and curing the resin. In the case where the optical separation layer 17 has a guide groove for the laser beam 11, the guide groove can be formed by putting the resin that has not yet cured into contact with the substrate (die) whereon the groove has been formed, curing the resin and then removing the substrate (die).

After forming the second dielectric material layer 302, or after forming the optical separation layer 17, the second recording layer 304 may optionally be crystallized over the entire surface thereof, so as to be initialized. The crystallization of the second recording layer 304 is carried out generally by irradiating it with laser beam.

Then the first information layer 23 is formed on the optical separation layer 17. Specifically, the fourth dielectric material layer 206, the first recording layer 204, and the third dielectric material layer 202 are formed in this order on the optical separation layer 17. The fourth interface layer may also be formed as required between the fourth dielectric material layer 206 and the first recording layer 204. The third interface layer 203 may also be formed as required between the third dielectric material layer 202 and the first recording layer 204. According to the constitution of the first information layer 23, the first reflective layer 208 may be formed before forming the fourth dielectric material layer 206, and the transmittance adjustment layer 209 may be formed before forming the first reflective layer 208. Each of these layers can be formed by a method similar to that described in the second embodiment.

Last, the transparent layer 13 is formed on the third dielectric material layer 202. The transparent layer 13 can be formed by a method similar to that described in the first embodiment.

After forming the third dielectric material layer 202, or after forming the transparent layer 13, the first recording layer 204 may optionally be crystallized over the entire surface thereof so as to be initialized. The crystallization of the first recording layer 204 is carried out generally by irradiating with laser beam.

Alternatively, initialization of the second recording layer 304 (in the case where it has not been initialized before the first information Layer 23 is formed) and initialization of the first recording layer 204 may be conducted at this stage. In this case, the crystallization of the second recording layer 304 is preferably carried out first, since the output power of laser required for carrying out the crystallization of the second recording layer 304 tends to increase when the crystallization of the first recording layer 204 is carried out first.

The information recording medium 24 can be manufactured as described above. In this embodiment, the layers are formed by the sputtering process. But the process of forming the layers is not restricted to this, and the vacuum vapor deposition process, the ion plating process, the CVD process, the MBE process or the like may also be employed.

Fourth Embodiment

Figure 4:
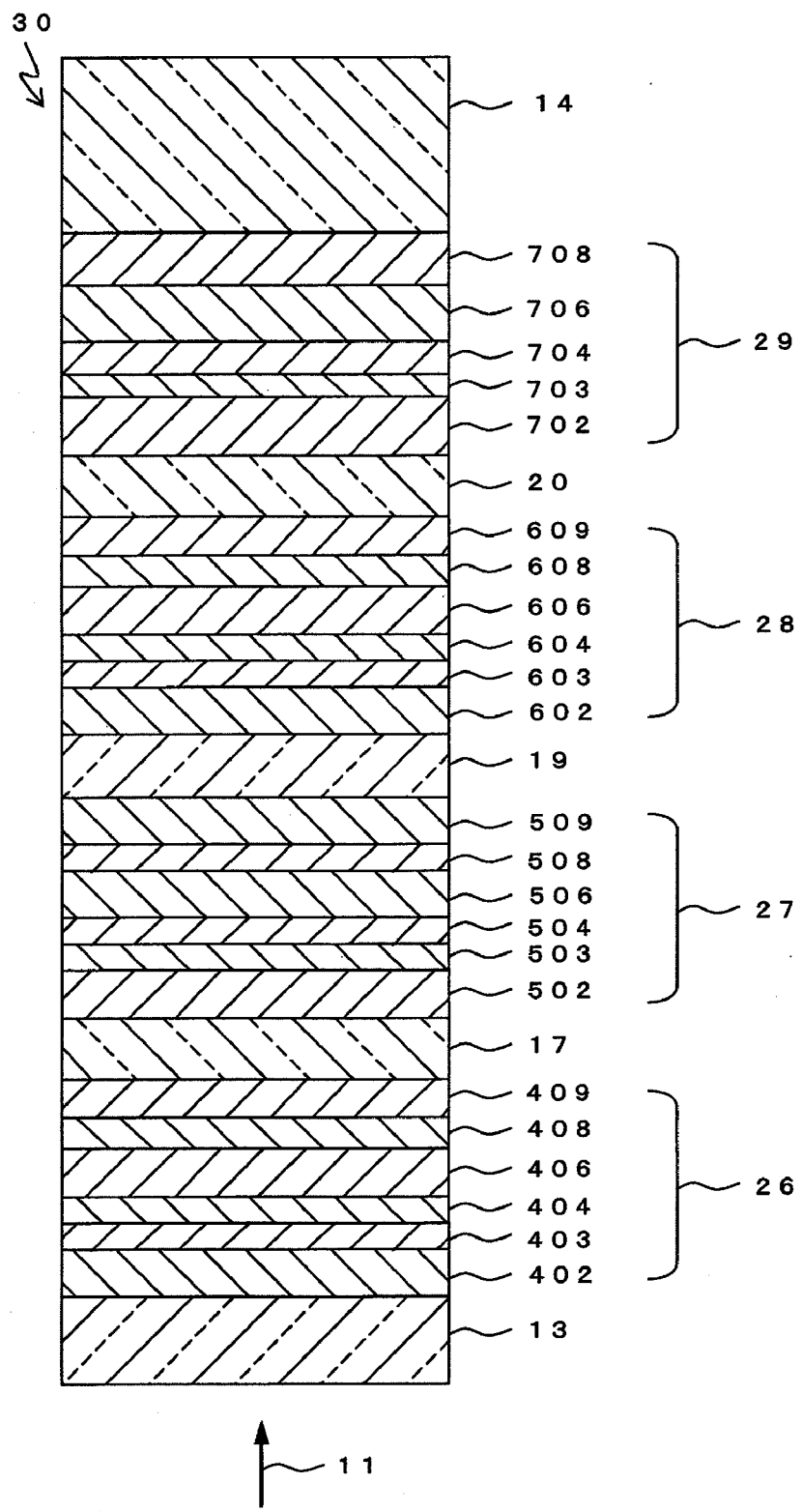
FIG. 4 is a partial sectional view schematically showing an example of layer constitution of an information recording medium having four information layers of the present invention.

Another example of the information recording medium consisting of four sets of information layers, namely N=4 in the multi-layer information recording medium, will be described as the fourth embodiment. A partial sectional view of the information recording medium 30 of the fourth embodiment is shown in FIG. 4. The information recording medium 30 is a 4-layer optical information recording medium on and from which information can be recorded and reproduced by irradiation of the unidirectional laser beam 11.

The information recording medium 30 is constituted from a fourth information layer 29, an optical separation layer 20, a third information layer 28, the optical separation layer 19, a second information layer 27, the optical separation layer 17, a first information layer 26 and the transparent layer 13 that are stacked successively on the substrate 14. The substrate 14, the optical separation layers 17, 19 and 20 and the transparent layer 13 may be formed from the materials described in the first and second embodiments, and functions and configurations those layers are as described in the first and the second embodiments.

Now the constitution of the fourth information layer 29, the third information layer 28, the second information layer 27 and the first information layer 26 will be described in detail. The fourth information layer 29 includes a first dielectric material layer 702, a fourth recording layer 704, a second dielectric material layer 706 and a fourth reflective layer 708, that are disposed in this order from the side whereon the laser beam 11 enters. A first interface layer 703 may be provided between the first dielectric material layer 702 and the fourth recording layer 704. Information is recorded on and reproduced from the fourth information layer 29 by means of the laser beam 11 that has transmitted through the transparent layer 13, the first information layer 26, the optical separation layer 17, the second information layer 27, the optical separation layer 19, the third information layer 28 and the optical separation layer 20.

The first dielectric material layer 702 can be formed by using a material similar to that used for the first dielectric material layer 102 of the first embodiment, and the function thereof is similar to that of the first dielectric material layer 102 of the first embodiment.

The thickness of the first dielectric material layer 702 can be exactly determined by calculation based on the matrix method, so as to achieve greater change in the intensity of reflected light between a case where the fourth recording layer 704 is in crystal phase and a case where it is in amorphous phase.

The first interface layer 703 can be formed as required by using a material similar to that used for the first interface layer 103 of the first embodiment, and function and configuration thereof are similar to those of the first interface layer 103 of the first embodiment. The second dielectric material layer 706 can be formed by using a material similar to that used for the second dielectric material layer 106 of the first embodiment, and function and configuration thereof are similar to those of the second dielectric material layer 106 of the first embodiment.

A second interface layer may be formed between the fourth recording layer 704 and the second dielectric material layer 706 as required. The second interface layer can be formed by using a material similar to that used for the second interface layer of the first embodiment, and the function and configuration thereof are the same as those of the second interface layer of the first embodiment. In the case where the second interface layer is provided in the information recording medium 30 shown in FIG. 4, the second interface layer can be identified as a layer indicated by the reference numeral 705 located between the layer indicated by the reference numeral 704 and the layer indicated by the reference numeral 706.

The fourth recording layer 704 can be formed from a material similar to that used for the recording layer 104 of the first embodiment. In the case where the recording layer of the other information layer contains Sb and M1 in total proportion of 85 atomic % or more, the fourth recording layer 704 may be formed from other material. For example, a material that contains one of GeTe, (Ge—Sn)Te, GeTe—Sb$_2$Te$_3$, (Ge—Sn)Te—Sb$_2$Te$_3$, GeTe—Bi$_2$Te$_3$, (Ge—Sn)Te—Bi$_2$Te$_3$, GeTe—(Sb—Bi)$_2$Te$_3$, (Ge—Sn)Te—(Sb—Bi)$_2$Te$_3$, GeTe—(Bi—In)$_2$Te$_3$ and (Ge—Sn)Te—(Bi—In)$_2$Te$_3$ may be used. The fourth recording layer 704 may also be formed from a material that is represented by Sb—Ga, (Sb—Te)—Ga, Sb—Ge, (Sb—Te)—Ge, Sb—In, (Sb—Te)—In, or (Sb—Te)—Ag—In and contains 50 atomic % or more Sb.

In the case where the material of the fourth recording layer 704 is one that can undergo reversible phase change, the thickness of the fourth recording layer 704 is preferably in a range of from 6 nm to 15 nm in order to improve the recording power of the fourth information layer 29. When the fourth recording layer 704 has a larger thickness within this range, diffusion of heat in the plane direction causes larger thermal effect on adjacent regions. When the fourth recording layer 704 is thinner, the reflectance of the fourth information layer 29 becomes lower. Accordingly, the thickness of the fourth recording layer 704 is more preferably within a range of from 8 nm to 13 nm. In the case where the fourth recording layer 704 is formed from a material that undergoes irreversible phase change (for example, Te—Pd—O), the thickness of the fourth recording layer 704 is preferably in a range of from 10 nm to 40 nm.

The fourth reflective layer 708 can be formed by using a material similar to that used for the reflective layer 108 of the first embodiment, and function and configuration thereof are similar to those of the reflective layer 108 of the first embodiment.

An interface layer may also be formed between the fourth reflective layer 708 and the second dielectric material layer 706. The interface layer can be formed by using a material similar to that used for the interface layer of the first embodiment, and function and configuration thereof are similar to those of the interface layer of the first embodiment. In the case where the interface layer is provided in the information recording medium 30 shown in FIG. 4, the interface layer can be identified as a layer indicated by the reference numeral 707 located between the layer indicated by the reference numeral 706 and the layer indicated by the reference numeral 708.

The third information layer 28 includes a third dielectric material layer 602, a third recording layer 604 and a fourth dielectric material layer 606 that are disposed in this order from the side whereon the laser beam 11 enters. As required, the third information layer 28 may further have a third reflective layer 608, and/or a third transmittance adjustment layer 609. Furthermore, the third information layer 28 may have a third interface layer 603 between the third dielectric material layer 602 and the third recording layer 604.

The third dielectric material layer 602 may be formed by using a material similar to that used for the first dielectric material layer 102 of the first embodiment, and function thereof is similar to that of the first dielectric material layer 102 of the first embodiment.

The thickness of the third dielectric material layer 602 can be exactly determined by calculation based on the matrix method, so as to satisfy the conditions for achieving greater change in the intensity of reflected light between a case where the third recording layer 604 is in crystal phase and a case where it is in amorphous, achieving greater absorbance of light by the third recording layer 604 and higher transmittance of the third information layer 28.

The third interface layer 603, that is provided as required, can be formed by using a material similar to that used for the first interface layer 103 of the first embodiment and function and configuration thereof are similar to those of the first interface layer 103 of the first embodiment.

The fourth dielectric material layer 606 has a function of adjusting the optical distance so as to improve the optical absorption efficiency of the third recording layer 604, and increasing the change in the intensity of reflected light before and after recording, so as to increase the signal intensity. The fourth dielectric material layer 606 can be formed using a material similar to that used for the second dielectric material layer 106 of the first embodiment. The thickness of the fourth dielectric material layer 606 is preferably within a range of from 0.5 nm to 75 nm, and more preferably from 1 nm to 40 nm. The fourth dielectric material layer 606 having a thickness within this range is capable of diffusing heat generated in the third recording layer 604 efficiently toward the third reflective layer 608.

A fourth interface layer may also be disposed between the third recording layer 604 and the fourth dielectric material layer 606. The fourth interface layer can be formed by using a material similar to that used for the second interface layer of the first embodiment. In the case where the fourth interface layer is provided in the information recording medium 30 shown in FIG. 4, the fourth interface layer can be identified as a layer indicated by the reference numeral 605 located between the layer indicated by the reference numeral 604 and the layer indicated by the reference numeral 606.

The third recording layer 604 can be formed by using a material similar to that used for the recording layer 104 of the first embodiment. In the case where the recording layer of the other information layer contains Sb and M1 in total proportion of 85 atomic % or more, the third recording layer 604 may be formed from other material. For example, a material that contains one of GeTe, (Ge—Sn)Te, GeTe—Sb$_2$Te$_3$, (Ge—Sn)Te—Sb$_2$Te$_3$, GeTe—Bi$_2$Te$_3$, (Ge—Sn)Te—Bi$_2$Te$_3$, GeTe—(Sb—Bi)$_2$Te$_3$, (Ge—Sn)Te—(Sb—Bi)$_2$Te$_3$, GeTe—(Bi—In)$_2$Te$_3$ and (Ge—Sn)Te—(Bi—In)$_2$Te$_3$ may be used. The third recording layer 604 may also be formed from a material that is represented by Sb—Ga, (Sb—Te)—Ga, Sb—Ge, (Sb—Te)—Ge, Sb—In, (Sb—Te)—In, or (Sb—Te)—Ag—In and contains 50 atomic % or more Sb.

The third information layer 28 is required to have high transmittance so that laser beam with sufficient intensity to record and reproduce the information reaches an information layer located farther than the third information layer 28 from the side whereon the laser beam 11 enters. For this reason, the thickness of the third recording layer 604 is preferably not larger than 8 nm, and more preferably not larger than 5 nm.

The third recording layer 604 may also be formed from a material that undergoes irreversible phase change such as Te—Pd—O. In this case, the thickness of the third recording layer 604 is preferably not larger than 20 nm.

The third reflective layer 608, which is provided as required, has an optical function to increase the amount of light absorbed by the third recording layer 604. The third reflective layer 608 also has a thermal function to quickly dissipate the heat generated in the third recording layer 604 and makes it easier for the third recording layer 604 to turn to amorphous phase. The third reflective layer 608 further has a function to protect the multi-layer film from the operating environment The third reflective layer 608 can be formed by using a material similar to that used for the reflective layer 108 of the first embodiment. An Ag alloy has high heat conductivity, and is therefore preferably used for the material of the third reflective layer 608. The thickness of the third reflective layer 608 is preferably not larger than 10 nm, and more preferably not larger than 7 nm, in order to make the transmittance of the third information layer 28 as high as possible. The third reflective layer 608 having thickness in this range is capable of achieving sufficient heat dissipation, ensuring satisfactory level of reflectance of the third information layer 28 and increasing the transmittance of the third information layer 28 well.

The third transmittance adjustment layer 609, that is provided as required, can be formed by using a material similar to that used for the transmittance adjustment layer 209 of the second embodiment and function and configuration thereof are similar to those of the transmittance adjustment layer 209 of the second embodiment.

Values of transmittance $T_{c3}$ and $T_{a3}$ of the third information layer 28 preferably satisfy relationships $60<T_{c3}$ and $60<T_{a3}$, and more preferably satisfy $65<T_{c3}$ and $65<T_{a3}$, in order to have the laser beam 11, with a sufficient intensity of light required for recording and reproducing information, reach the information layer located farther than the third information layer 28 from the side where the laser beam 11 enters.

Also the values of transmittance $T_{c3}$ and $T_{a3}$ of the third information layer 28 preferably satisfy relationship of inequality $-5 \leq (T_{c3}-T_{a3}) \leq 5$, and more preferably $-3 \leq (T_{c3}-T_{a3}) \leq 3$. When $T_{c3}$ and $T_{a3}$ satisfy this requirement, there occurs less influence on a change in the transmittance due to the state of the third recording layer 604 of the third information layer 28 and good recording and reproducing characteristics can be obtained, when recording or reproducing information on or from the information layer located farther than the third information layer 28 from the side where the laser beam 11 enters.

In the third information layer 28, it is preferable that reflectance $R_{c3}$ (%) of the third recording layer 604 when it is in crystal phase and reflectance $R_{a3}$ (%) of the third recording layer 604 when it is in amorphous phase satisfy the inequality $R_{a3}<R_{c3}$. This enables it to achieve higher reflectance in the initial state where information is not yet recorded, thereby enabling stable recording and reproducing operation.

The second information layer 27 is of a constitution including a fifth dielectric material layer 502, a second recording layer 504 and a sixth dielectric material layer 506 that are disposed in this order from the side whereon the laser beam 11 enters. As required, the second information layer 27 may further have a second reflective layer 508, and/or a second transmittance adjustment layer 509. The second information layer 27 may also have a fifth interface layer 503 provided between the fifth dielectric material layer 502 and the second recording layer 504.

The fifth dielectric material layer 502 may be formed using a material similar to that used for the first dielectric material layer 102 of the first embodiment, and function thereof is similar to that of the first dielectric material layer 102 of the first embodiment.

The thickness of the fifth dielectric material layer 502 can be exactly determined by calculation based on the matrix method, so as to satisfy the conditions for achieving greater change in the intensity of reflected light between a case where the second recording layer 504 is in crystal phase and a case where it is in amorphous phase, achieving greater absorbance of light by the second recording layer 504 and higher transmittance of the second information layer 27.

The fifth interface layer 503, that is provided as required, can be formed by using a material similar to that used for the first interface layer 103 of the first embodiment and function and configuration thereof are similar to those of the first interface layer 103 of the first embodiment.

The sixth dielectric material layer 506 has a function of adjusting the optical distance so as to improve the optical absorption efficiency of the second recording layer 504, and increasing the change in the intensity of reflected light before and after recording, so as to increase the signal intensity. The sixth dielectric material layer 506 can be formed using a material similar to that used for the second dielectric material layer 106 of the first embodiment. The thickness of the sixth dielectric material layer 506 is preferably within a range of from 0.5 nm to 75 nm, and more preferably from 1 nm to 40 nm. The sixth dielectric material layer 506 having a thickness within this range is capable of diffusing heat generated in the second recording layer 504 efficiently toward the second reflective layer 508.

A sixth interface layer may also be provided between the second recording layer 504 and the sixth dielectric material layer 506. The sixth interface layer can be formed by using a material similar to that used for the second interface layer 105 of the first embodiment. In the case where the sixth interface layer is provided in the information recording medium 30 shown in FIG. 4, the sixth interface layer can be identified as a layer indicated by the reference numeral 505 located between the layer indicated by the reference numeral 504 and the layer indicated by the reference numeral 506.

The second recording layer 504 can be formed by using a material similar to that used for the recording layer 104 of the first embodiment. In the case where the recording layer of the other information layer contains Sb and M1 in total proportion of 85 atomic % or more, the second recording layer 504 may be formed from other material. For example, a material that contains one of GeTe, (Ge—Sn)Te, GeTe—$Sb_2Te_3$, (Ge—Sn)Te—$Sb_2Te_3$, GeTe—$Bi_2Te_3$, (Ge—Sn)Te—$Bi_2Te_3$, GeTe—$(Sb—Bi)_2Te_3$, (Ge—Sn)Te—$(Sb—Bi)_2Te_3$, GeTe—$(Bi—In)_2Te_3$ and (Ge—Sn)Te—$(Bi—In)_2Te_3$ may be used. The second recording layer 504 may also be formed from a material that is represented by Sb—Ga, (Sb—Te)—Ga, Sb—Ge, (Sb—Te)—Ge, Sb—In, (Sb—Te)—In, or (Sb—Te)—Ag—In and contains 50 atomic % or more Sb.

The second information layer 27 is required to have high transmittance so that laser beam with sufficient intensity to record and reproduce the information reaches an information layer located farther than the second information layer 27 from the side whereon the laser beam 11 enters. For this reason, the thickness of the second recording layer 504 is preferably not larger than 7 nm, and more preferably not larger than 4 nm.

The second recording layer 504 may also be formed from a material that undergoes irreversible phase change (such as Te—Pd—O). In this case, the thickness of the second recording layer 504 is preferably not larger than 20 nm.

The second reflective layer 508, which is provided as required, has an optical function to increase the intensity of light absorbed by the second recording layer 504. The second reflective layer 508 also has a thermal function to quickly dissipate the heat generated in the second recording layer 504 and makes it easier for the second recording layer 504 to turn to amorphous phase. The second reflective layer 508 further has a function to protect the multi-layer film from the operating environment. The second reflective layer 508 can be formed by using a material similar to that used for the reflective layer 108 of the first embodiment, and the function thereof is also similar to that of the reflective layer 108 of the first embodiment. An Ag alloy has high heat conductivity, and is therefore preferably used for the material of the second reflective layer 508. The thickness of the second reflective layer 508 is preferably not larger than 9 nm, and more preferably not larger than 6 nm, in order to increase the transmittance of the second information layer 27. The second reflective layer 508 having thickness in this range is capable of achieving sufficient heat dissipation, ensuring satisfactory level of reflectance of the second information layer 27 and increasing the transmittance of the second information layer 27 well.

The second transmittance adjustment layer 509, that is provided as required, can be formed by using a material similar to that used for the transmittance adjustment layer 209 of the second embodiment and function and configuration thereof are similar to those of the transmittance adjustment layer 209 of the second embodiment.

Values of transmittance $T_{c2}$ and $T_{a2}$ of the second information layer 27 preferably satisfy the inequality 65<$T_{c2}$ and 65<$T_{a2}$, and more preferably satisfy 70<$T_{c2}$ and 70<$T_{a2}$, in order to have the laser beam 11, with a sufficient intensity of light required for recording and reproducing information, reach the information layer located farther than the second information layer 27 from the side where the laser beam 11 enters.

The values of transmittance $T_{c2}$ and $T_{a2}$ of the second information layer 27 preferably satisfy the inequality $-5 \leq (T_{c2}-T_{a2}) \leq 5$, and more preferably $-3 \leq (T_{c2}-T_{a2}) \leq 3$. When $T_{c2}$ and $T_{a2}$ satisfy this requirement, there occurs less influence on a change in the transmittance due to the state of the second recording layer 504 of the second information layer 27 and good recording and reproducing characteristics can be obtained, when recording and reproducing information on and from the information layer located farther than the second information layer 27 from the side where the laser beam 11 enters.

In the second information layer 27, it is preferable that the reflectance $R_{c2}$ (%) of the second recording layer 504 when it is in crystal phase and reflectance $R_{a2}$ (%) of the second recording layer 504 when it is in amorphous phase satisfy the inequality $R_{a2}<R_{c2}$. This enables it to achieve higher reflectance in the initial state where information is not yet recorded, thereby enabling stable recording and reproducing operation.

The first information layer 26 is of a constitution having a seventh dielectric material layer 402, a first recording layer 404 and an eighth dielectric material layer 406 that are disposed in this order from the side whereon the laser beam 11 enters. As required, the first information layer 26 may further have a first reflective layer 408, and/or a first transmittance adjustment layer 409. The first information layer 26 may also have a seventh interface layer 403 provided between the seventh dielectric material layer 402 and the first recording layer 404.

The seventh dielectric material layer 402 may be formed using a material similar to that used for the first dielectric material layer 102 of the first embodiment, and function thereof is similar to that of the first dielectric material layer 102 of the first embodiment.

The thickness of the seventh dielectric material layer 402 can be exactly determined by calculation based on the matrix method, so as to satisfy the conditions for achieving greater change in the intensity of reflected light between a case where the first recording layer 404 is in crystal phase and a case where it is in amorphous phase, achieving greater absorption of light by the first recording layer 404 and higher transmittance of the first information layer 26.

The seventh interface layer 403, that is provided as required, can be formed by using a material similar to that used for the first interface layer 103 of the first embodiment and function and configuration thereof are similar to those of the first interface layer 103 of the first embodiment.

The eighth dielectric material layer 406 has a function of adjusting the optical distance so as to improve the optical absorption efficiency of the first recording layer 404, and increasing the change in the intensity of reflected light before and after recording, so as to increase the signal intensity. The eighth dielectric material layer 406 can be formed using a material similar to that used for the second dielectric material layer 106 of the first embodiment. The thickness of the eighth dielectric material layer 406 is preferably within a range of from 0.5 nm to 75 nm, and more preferably from 1 nm to 40 nm. The eighth dielectric material layer 406 having a thickness within this range is capable of diffusing heat generated in the first recording layer 404 efficiently toward the first reflective layer 408.

An eighth interface layer may also be disposed between the first recording layer 404 and the eighth dielectric material layer 406. The eighth interface layer can be formed by using a material similar to that used for the second interface layer of the first embodiment. In the case where the eighth interface layer is provided in the information recording medium 30 shown in FIG. 4, the eighth interface layer can be identified as a layer indicated by the reference numeral 405 located between the layer indicated by the reference numeral 404 and the layer indicated by the reference numeral 406.

The first recording layer 404 can be formed by using a material similar to that of the recording layer 104 of the first embodiment. In the case where the recording layer of the other information layer contains Sb and M1 in total proportion of 85 atomic % or more, the first recording layer 404 may be formed from other material. For example, a material that contains one of GeTe, (Ge—Sn)Te, GeTe—$Sb_2Te_3$, (Ge—Sn)Te—$Sb_2Te_3$, GeTe—$Bi_2Te_3$, (Ge—Sn)Te—$Bi_2Te_3$, GeTe—(Sb—$Bi)_2Te_3$, (Ge—Sn)Te—(Sb—$Bi)_2Te_3$, GeTe—(Bi—$In)_2Te_3$ and (Ge—Sn)Te—(Bi—$In)_2Te_3$ may be used. The first recording layer 404 may also be formed from a material that is represented by Sb—Ga, (Sb—Te)—Ga, Sb—Ge, (Sb—Te)—Ge, Sb—In, (Sb—Te)—In, or (Sb—Te)—Ag—In and contains 50 atomic % or more Sb.

The first information layer 26 is required to have high transmittance so that laser beam with sufficient intensity to record and reproduce the information reaches an information layer(s) located farther than the first information layer 26 from the side whereon the laser beam 11 enters. For this reason, the thickness of the first recording layer 404 is preferably not larger than 6 nm, and more preferably not larger than 3 nm.

The first recording layer 404 may also be formed from a material that undergoes irreversible phase change (such as Te—Pd—O). In this case, the thickness of the first recording layer 404 is preferably not larger than 20 nm.

The first reflective layer 408, which is provided as required, has an optical function to increase the intensity of light absorbed by the first recording layer 404. The first reflective layer 408 also has a thermal function to quickly dissipate the heat generated in the first recording layer 404 and makes it easier for the first recording layer 404 to turn to amorphous phase. The first reflective layer 408 further has a function to protect the multi-layer film from the operating environment The first reflective layer 408 can be formed by using a material similar to that used for the reflective layer 108 of the first embodiment. An Ag alloy has high heat conductivity and is therefore preferably used for the material of the first reflective layer 408. Thickness of the first reflective layer 408 is preferably 8 nm or less, and more preferably 5 nm or less, in order to increase the transmittance of the first information layer 26. The first reflective layer 408 having a thickness in this range is capable of achieving sufficient heat dissipation, ensuring satisfactory level of reflectance of the first information layer 26 and increasing the transmittance of the first information layer 26 well.

The first transmittance adjustment layer 409, that is provided as required, can be formed by using a material similar to that used for the transmittance adjustment layer 209 of the second embodiment and function and configuration thereof are similar to those of the transmittance adjustment layer 209 of the second embodiment.

Values of transmittance $T_{c1}$ and $T_{a1}$ of the first information layer 26 preferably satisfy relationships $65<T_{c1}$ and $65<T_{a1}$, and more preferably satisfy $70<T_{c1}$ and $7<T_{a1}$, in order to have the laser beam 11, with a sufficient intensity of light required for recording and reproducing information, reach the information layer(s) located farther than the first information layer 26 from the side where the laser beam 11 enters.

The values of transmittance $T_{c1}$ and $T_{a1}$ of the first information layer 26 preferably satisfy the inequality $-5 \leq (T_{c1}-T_{a1}) \leq 5$, and more preferably $-3 \leq (T_{c1}-T_{a1}) \leq 3$. When $T_{c1}$ and $T_{a1}$ satisfy this requirement, there occurs less influence on a change in the transmittance due to the state of the first recording layer 404 of the first information layer 26 and good recording and reproducing characteristics can be obtained, when recording or reproducing information on or from the information layer(s) located farther than the first information layer 26 from the side where the laser beam 11 enters.

In the first information layer 26, it is preferable that the reflectance $R_{c1}$ (%) of the first recording layer 404 when it is in crystal phase and the reflectance $R_{a1}$ (%) of the first recording layer 404 when it is in amorphous phase satisfy the inequality $R_{a1}<R_{c1}$. This enables it to achieve higher reflectance in the initial state where information is not yet recorded, thereby enabling stable recording and reproducing operation.

The information recording medium 30 can be manufactured by a method described below.

First, the fourth information layer 29 is formed. Specifically, the substrate 14 (having a thickness of, for example, 1.1 mm) is prepared and placed in a film formation apparatus.

Then the fourth reflective layer 708 is formed on the substrate 14. In the case where the substrate 14 has guide groove formed thereon for guiding the laser beam 11, the fourth reflective layer 708 is formed on the side where the guide groove is formed. The fourth reflective layer 708 can be formed by a method similar to that for forming the reflective layer 108 of the first embodiment.

Then an interface layer is formed as required on the fourth reflective layer 708. The interface layer can be formed by a method similar to that for forming the interface layer or the second dielectric material layer 106 of the first embodiment. Then the second dielectric material layer 706 is formed on the fourth reflective layer 708 or on the interface layer. The second dielectric material layer 706 can be formed by a method similar to that for forming the second dielectric material layer 106 of the first embodiment.

Then a second interface layer 705 is formed as required on the fourth reflective layer 708, the interface layer 707 or the second dielectric material layer 706. The second interface layer 705 can be formed by a method similar to that for forming the second dielectric material layer 106 of the first embodiment.

Then the second recording layer 704 is formed on the second dielectric material layer 706 or on the second interface layer 705. The fourth recording layer 704 can be formed by a method similar to that for forming the recording layer 104 of the first embodiment by using a sputtering target tailored to the composition of the layer 704.

Then the first interface layer 703 is formed as required on the fourth recording layer 704. The first interface layer 703 can be formed by a method similar to that for forming the second dielectric material layer 106 of the first embodiment. Then the first dielectric material layer 702 is formed on the fourth recording layer 704 or on the first interface layer 703. The first dielectric material layer 702 can be formed by a method similar to that for forming the second dielectric material layer 106 of the first embodiment. The fourth information layer 29 is formed as described above.

Then the optical separation layer 20 is formed on the first dielectric material layer 702 of the fourth information layer 29. The optical separation layer 20 can be formed by applying a photo-curable resin (particularly an ultraviolet-curable resin) or a delayed-action resin onto the first dielectric material layer 702, then carrying out spin coating operation and curing the resin. In the case where the optical separation layer 20 has a guide groove for the laser beam 11, the guide groove can be formed by putting the resin that has not yet cured into contact with the substrate (die) whereon the groove has been formed, curing the resin and then removing the substrate (die).

After forming the first dielectric material layer 702, or after forming the optical separation layer 20, the fourth recording layer 704 may optionally be crystallized over the entire surface thereof, so as to be initialized. The crystallization of the fourth recording layer 704 is carried out generally by irradiating it with laser beam.

Then the third information layer 28 is formed on the optical separation layer 20. Specifically, a stack constituted from the fourth information layer 29 and the optical separation layer 20 formed on the substrate 14 is placed in a film formation apparatus. Then the third transmittance adjustment layer 609 is formed as required on the optical separation layer 20. The third transmittance adjustment layer 609 can be formed by a method similar to that for forming the second dielectric layer 106 of the first embodiment.

Then the third reflective layer 608 is formed as required on the optical separation layer 20 or on the third transmittance adjustment layer 609. The third reflective layer 608 can be formed by a method similar to that for forming the reflective layer 108 of the first embodiment.

Then the fourth dielectric material layer 606 is formed on the optical separation layer 20, the third transmittance adjustment layer 609 or the third reflective layer 608. The fourth dielectric material layer 606 can be formed by a method similar to that for forming the second dielectric material layer 106 of the first embodiment.

Then the fourth interface layer is formed as required on the fourth dielectric material layer 606. The fourth interface layer 605 can be formed by a method similar to that for forming the second dielectric material layer 106 of the first embodiment. Then the third recording layer 604 is formed on the fourth dielectric material layer 606 or on the fourth interface layer. The third recording layer 604 can be formed by a method similar to that for forming the recording layer 104 of the first embodiment by using a sputtering target tailored to the composition of the layer 604.

Then the third interface layer 603 is formed as required on the third recording layer 604. The third interface layer 603 can be formed by a method similar to that for forming the second dielectric material layer 106 of the first embodiment. Then a third dielectric material layer 602 is formed on the third recording layer 604 or the third interface layer 603. The third dielectric material layer 602 can be formed by a method similar to that for forming the second dielectric material layer 106 of the first embodiment.

The third information layer 28 is formed as described above.

Then the optical separation layer 19 is formed on the third dielectric material layer 602 of the third information layer 28 by a method similar to that for forming the optical separation layer 20 described above.

After forming the third dielectric material layer 602, or after forming the optical separation layer 19, the third recording layer 604 and/or the fourth recording layer 704 (if not crystallized before forming the third information layer 28) may optionally be crystallized over the entire surface thereof, so as to be initialized. The crystallization of the third recording layer 604 and/or the fourth recording layer 704 is carried out generally by irradiating it with laser beam.

Then the second information layer 27 is formed on the optical separation layer 19. Specifically, a stack constituted from the fourth information layer 29, the optical separation layer 20, the third information layer 28 and the optical separation layer 19 formed on the substrate 14 is placed in a film formation apparatus. Then the second transmittance adjustment layer 509 is formed as required on the optical separation layer 19. The second transmittance adjustment layer 509 can be formed by a method similar to that for forming the second dielectric layer 106 of the first embodiment.

Then the second reflective layer 508 is formed as required on the optical separation layer 19 or on the second transmittance adjustment layer 509. The second reflective layer 508 can be formed by a method similar to that for forming the reflective layer 108 of the first embodiment. Then the sixth dielectric material layer 506 is formed on the optical separation layer 19 or the second reflective layer 508. The sixth dielectric material layer 506 can be formed by a method similar to that for forming the second dielectric material layer 106 of the first embodiment.

Then the sixth interface layer is formed as required on the sixth dielectric material layer 506. The sixth interface layer can be formed by a method similar to that for forming the second dielectric material layer 106 of the first embodiment. Then the second recording layer 504 is formed on the sixth dielectric material layer 506 or on the sixth interface layer. The second recording layer 504 can be formed by a method similar to that for the recording layer 104 of the first embodiment by using a sputtering target tailored to the composition of the layer 504.

Then the fifth interface layer 503 is formed as required on the second recording layer 504. The fifth interface layer 503 can be formed by a method similar to that for forming the second dielectric material layer 106 of the first embodiment. Then a fifth dielectric material layer 502 is formed on the second recording layer 504 or the fifth interface layer 503. The fifth dielectric material layer 502 can be formed by a method similar to that for forming the second dielectric material layer 106 of the first embodiment. The second information layer 27 is formed as described above.

Then the optical separation layer 17 is formed on the fifth dielectric material layer 502 of the second information layer 27 by a method similar to that for forming the optical separation layer 20 described above.

After forming the fifth dielectric material layer 502, or after forming the optical separation layer 17, the second recording layer 504, the third recording layer 604 and/or the fourth recording layer 704 may optionally be crystallized over the entire surface thereof, so as to be initialized. The crystallization of the second recording layer 504 and/or the third recording layer 604 may be conducted at this stage. The crystallization of the second recording layer 504, the third recording layer 604 and/or the fourth recording layer 704 is carried out generally by irradiating it with laser bean.

Then the first information layer 26 is formed on the optical separation layer 17. Specifically, a stack constituted from the fourth information layer 29, the optical separation layer 20, the third information layer 28, the optical separation layer 19, the second information layer 27 and the optical separation layer 17 formed on the substrate 14 is placed in a film formation apparatus. Then the first transmittance adjustment layer 409 is formed as required on the optical separation layer 17. The first transmittance adjustment layer 409 can be formed by a method similar to that for forming the second dielectric layer 106 of the first embodiment.

Then the first reflective layer 408 is formed as required on the optical separation layer 17 or on the first transmittance adjustment layer 409. The first reflective layer 408 can be formed by a method similar to that for forming the reflective layer 108 of the first embodiment. Then the eighth dielectric material layer 406 is formed on the optical separation layer 17 or the first reflective layer 408. The eighth dielectric material layer 406 can be formed by a method similar to that for forming the second dielectric material layer 106 of the first embodiment.

Then the eighth interface layer 405 is formed as required on the eighth dielectric material layer 406. The eighth interface layer 405 can be formed by a method similar to that for forming the second dielectric material layer 106 of the first embodiment. Then the first recording layer 404 is formed on the eighth dielectric material layer 406 or on the eighth interface layer 405. The first recording layer 404 can be formed by a method similar to that for forming the recording layer 104 of the first embodiment by using a sputtering target tailored to the composition of the layer 404.

Then the seventh interface layer 403 is formed as required on the first recording layer 404. The seventh interface layer 403 can be formed by a method similar to that for forming the second dielectric material layer 106 of the first embodiment. Then the seventh dielectric material layer 402 is formed on the first recording layer 404 or the seventh interface Layer 403. The seventh dielectric material layer 402 can be formed by a method similar to that for forming the second dielectric material layer 106 of the first embodiment. The first information layer 26 is formed as described above. Last, the transparent layer 13 is formed on the seventh dielectric material layer 402. The transparent layer 13 can be formed by a method similar to that described in the first embodiment.

After forming the seventh dielectric material layer 402, or after forming the transparent layer 13, the first recording layer 404, the second recording layer 504, the third recording layer 604 and/or the fourth recording layer 704 may optionally be crystallized over the entire surface thereof, so as to be initialized. That is, the crystallization of the second recording layer 504, the third recording layer 604 and/or the fourth recording layer 704 may be conducted at this stage. The crystallization of the first recording layer 404, the second recording layer 504, the third recording layer 604 and/or the fourth recording layer 704 is carried out generally by irradiating it with laser beam.

The information recording medium 30 can be manufactured as described above. In this embodiment, the layers are formed by the sputtering process. But the process of forming the layers is not restricted to this, and the vacuum vapor deposition process, the ion plating process, the CVD process, the MBE process or the like may also be employed.

Fifth Embodiment

Figure 5:
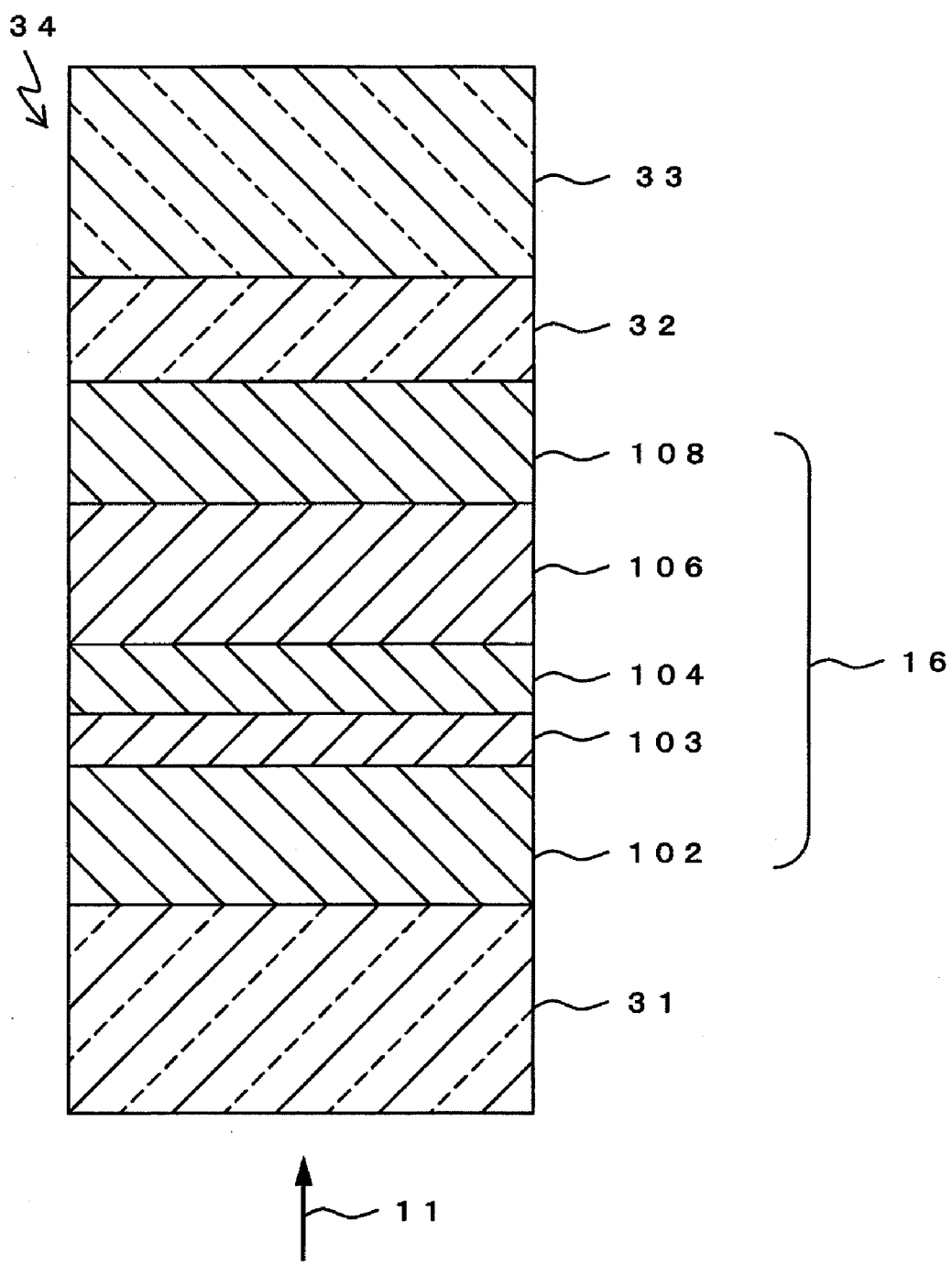
FIG. 5 is a partial sectional view schematically showing an example of layer constitution of the information recording medium having one information layer of the present invention.

Another example of the information recording medium of the present invention will be described as the fifth embodiment. A partial sectional view of the information recording medium 34 of the fifth embodiment is shown in FIG. 5. The information recording medium 34 is an optical information recording medium on and from which information can be recorded and reproduced by irradiation of the laser beam 11, similarly to the information recording medium 15 of the first embodiment.

The information recording medium 34 has such a constitution as the information layer 16 formed on a substrate 31 and a dummy substrate 33 are bonded together by means of an adhesive layer 32.

The substrate 31 and the dummy substrate 33 are transparent substrates of disk shape. The substrate 31 and the dummy substrate 33 may be formed from a resin such as polycarbonate, amorphous polyolefin or PMMA or glass, similarly to the substrate 14 of the first embodiment. The substrate 31 and the dummy substrate 33 are preferably formed from polycarbonate for reasons of good transfer property, ease of mass production and low cost.

The substrate 31 may have a guide groove formed as required to guide the laser beam on the surface which is on the first dielectric material layer 102 side. The surface of the substrate 31 opposite to the first dielectric material layer 102 side and the surface of the dummy substrate 33 opposite to the adhesive layer 32 side are preferably smooth. The substrate 31 and the dummy substrate 33 have thicknesses preferably in a range of from 0.3 mm to 0.9 mm, so as to ensure sufficient strength and enable the information recording medium 34 to have the thickness of about 1.2 mm.

The adhesive layer 32 is formed preferably from a resin such as a photo-curable resin (particularly an ultraviolet-curable resin) or a delayed-action resin, that has low light absorbance to the laser beam 11 used, and a low birefringence coefficient in the short wavelength range. The thickness of the adhesive layer 32 is preferably within a range of from 0.6 μm to 50 μm, for the same reasons as those described in relation to the optical separation layers 19 and 17.

Description will be omitted for elements identified with the same reference numerals as in the first embodiment.

The information recording medium 34 can be manufactured by a method described below.

First, the information layer 16 is formed on the substrate 31 (having a thickness of, for example, 0.6 mm). In the case where the substrate 31 has guide groove formed thereon for guiding the laser beam 11, the information layer 16 is formed on the side where the guide groove is formed. Specifically, the substrate 31 is placed in a film formation apparatus, and the first dielectric material layer 102, the recording layer 104, the second dielectric material layer 106 and the reflective layer 108 are successively stacked. The first interface layer 103 may be formed as required between the first dielectric material layer 102 and the recording layer 104. A second interface layer may also be formed as required between the recording layer 104 and the second dielectric material layer 106. Furthermore, an interface layer may also be formed as required between the second dielectric material layer 106 and the reflective layer 108. A method for forming each layer is similar to the method for forming each layer of the first embodiment.

Then the dummy substrate 33 (having a thickness of, for example, 0.6 mm) is laminated by using the adhesive layer 32 onto the substrate 31 whereon the information layer 16 has been formed. Specifically, the lamination is carried out according to the following procedures. First, a photo-curable resin (particularly an ultraviolet-curable resin) or a delayed-action resin is applied onto the dummy substrate 33, and a spin coating operation is carried out with the substrate 31 having the information layer 16 formed thereon being put into close contact with the dummy substrate 33, followed by curing the resin. Alternatively, the dummy substrate 33 may also be uniformly coated with an adhesive resin in advance and put into close contact with the substrate 31 having the information layer 16 formed thereon.

After putting the substrate 31 and the dummy substrate 33 into close contact with each other, the recording layer 104 may optionally be crystallized over the entire surface thereof, so as to be initialized. The crystallization of the recording layer 104 is carried out generally by irradiating it with laser beam.

The information recording medium 34 can be manufactured as described above. In this embodiment, the layers are formed by the sputtering process. But the process of forming the layers is not restricted to this, and the vacuum vapor deposition process, the ion plating process, the CVD process, the MBE process or the like may be employed.

Sixth Embodiment

Figure 6:
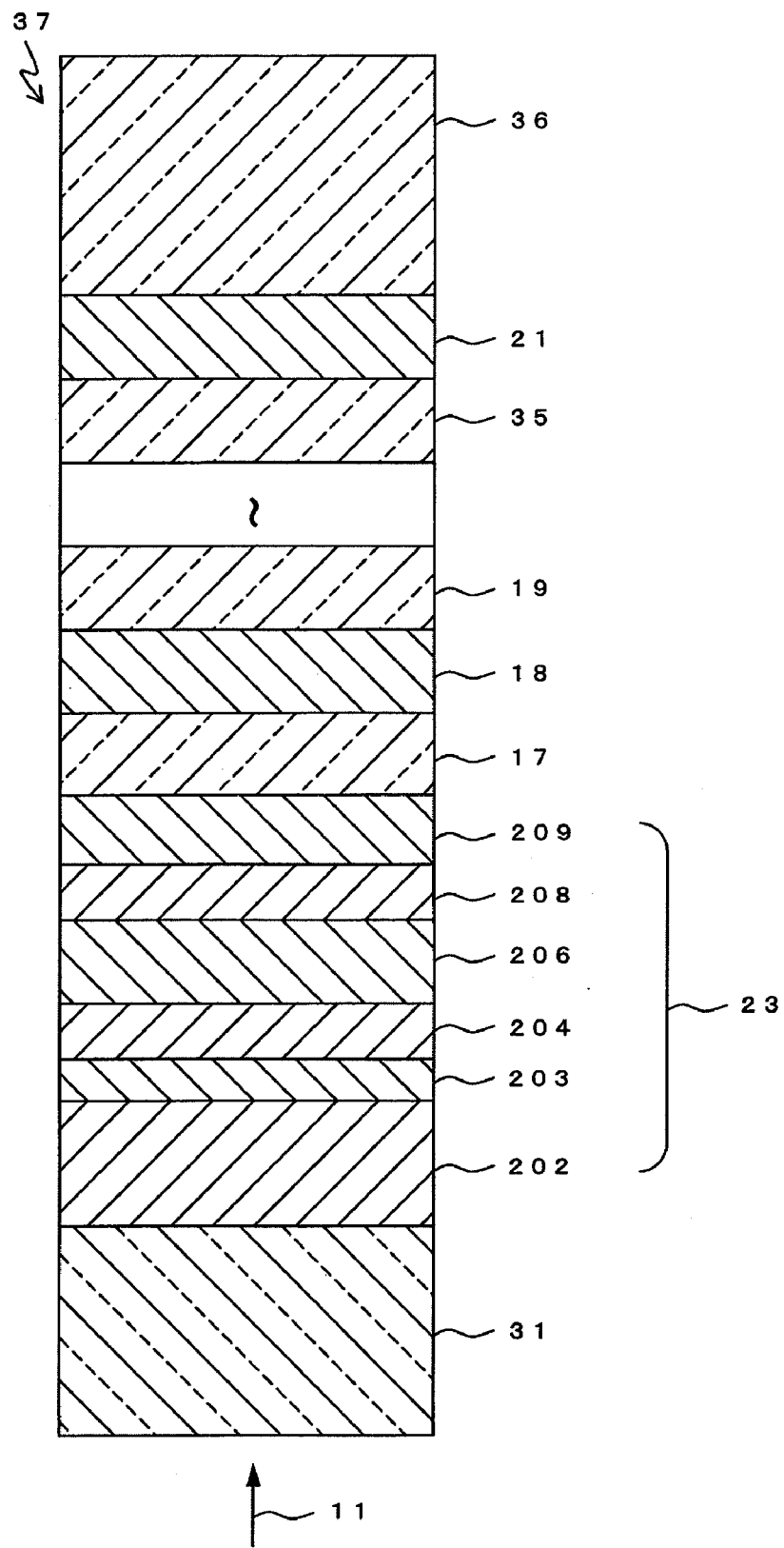
FIG. 6 is a partial sectional view schematically showing an example of layer constitution of the information recording medium having N information layers of the present invention.

Another example of the information recording medium of the present invention will be described as the sixth embodiment. A partial sectional view of the information recording medium 37 of the sixth embodiment is shown in FIG. 6. The information recording medium 37 is a multi-layer optical information recording medium on and from which information can be recorded and reproduced by irradiation of the unidirectional laser beam 11, similarly to the information recording medium 22 of the second embodiment.

The information recording medium 37 has such a constitution as N sets of information layers including the first information layer 23 and the information layer 18 formed successively on a substrate 31 and an information layer 21 formed on a substrate 36 are put into close contact with each other via an adhesive layer 35. The optical separation layers 17, 19 ... are disposed between the information layers.

The substrate 36 is a transparent substrate of disk shape. The substrate 36 may be formed from a resin such as polycarbonate, amorphous polyolefin or P or glass, similarly to the substrate 14.

The substrate 36 may have a guide groove formed as required to guide the laser beam on the surface which is on the information layer 21 side. The surface of the substrate 36 opposite to the information layer 21 side is preferably smooth. The substrate 36 is preferably formed from polycarbonate for reasons of good transfer property, ease of mass production and low cost. The substrate 36 has a thickness preferably in a range from 0.3 mm to 0.9 mm, so as to ensure sufficient strength and enable the information recording medium 37 to have the thickness of about 1.2 mm.

Description will be omitted for elements identified with the same reference numerals as in the second and fifth embodiments.

The information recording medium 37 can be manufactured by a method described below.

First, the first information layer 23 is formed on the substrate 31 (having a thickness of, for example, 0.6 mm). In the case where the substrate 31 has guide groove formed thereon for guiding the laser beam 11, the first information layer 23 is formed on the side where the guide groove is formed. Specifically, the substrate 31 is placed in a film formation apparatus, and the third dielectric material layer 202, the first recording layer 204 and the fourth dielectric material layer 206 are formed successively. A third interface layer 203 may be formed as required between the third dielectric material layer 202 and the first recording layer 204. A fourth interface layer may also be formed as required between the first recording layer 204 and the fourth dielectric material layer 206. Moreover, after forming the fourth dielectric material layer 206, the first reflective layer 208 may be formed depending on the constitution of the first information layer 23. Furthermore, after forming the first reflective layer 208, a transmittance adjustment layer 209 may be formed. Method for forming each layer is similar to the method for forming each layer of the second embodiment. Then (N−2) information layers are formed successively with the optical separation layers interposed therebetween.

Meanwhile the information layer 21 is formed on the substrate 36 (having a thickness of, for example, 0.6 mm). The information layer is formed in single-layer or multi-layer constitution, and these layers can be formed by successively sputtering targets that are suitable for forming the layers in a film formation apparatus.

Last, the substrates 31 and 36 having the information layers formed thereon are laminated with each other by using the adhesive layer 35. Specifically, a photo-curable resin (particularly an ultraviolet-curable resin) or a delayed-action resin is applied onto the information layer 21, and a spin coating operation is carried out with the substrate 31 having the first information layer 23 formed thereon being put into close contact with the information layer 21, followed by curing the resin. Alternatively, the information layer 21 may also be uniformly coated with an adhesive resin in advance and put into close contact with the substrate 31.

After putting the substrate 31 and the substrate 36 into close contact with each other, the first recording layer 204 may optionally be crystallized over the entire surface thereof, so as to be initialized. The crystallization of the first recording layer 204 is carried out generally by irradiating it with laser beam.

The information recording medium 37 can be manufactured as described above. In this embodiment, the layers are formed by the sputtering process. But the process of forming the layers is not restricted to this, and the vacuum vapor deposition process, the ion plating process, the CVD process, the MBE process or the like may be employed.

Seventh Embodiment

Figure 7:
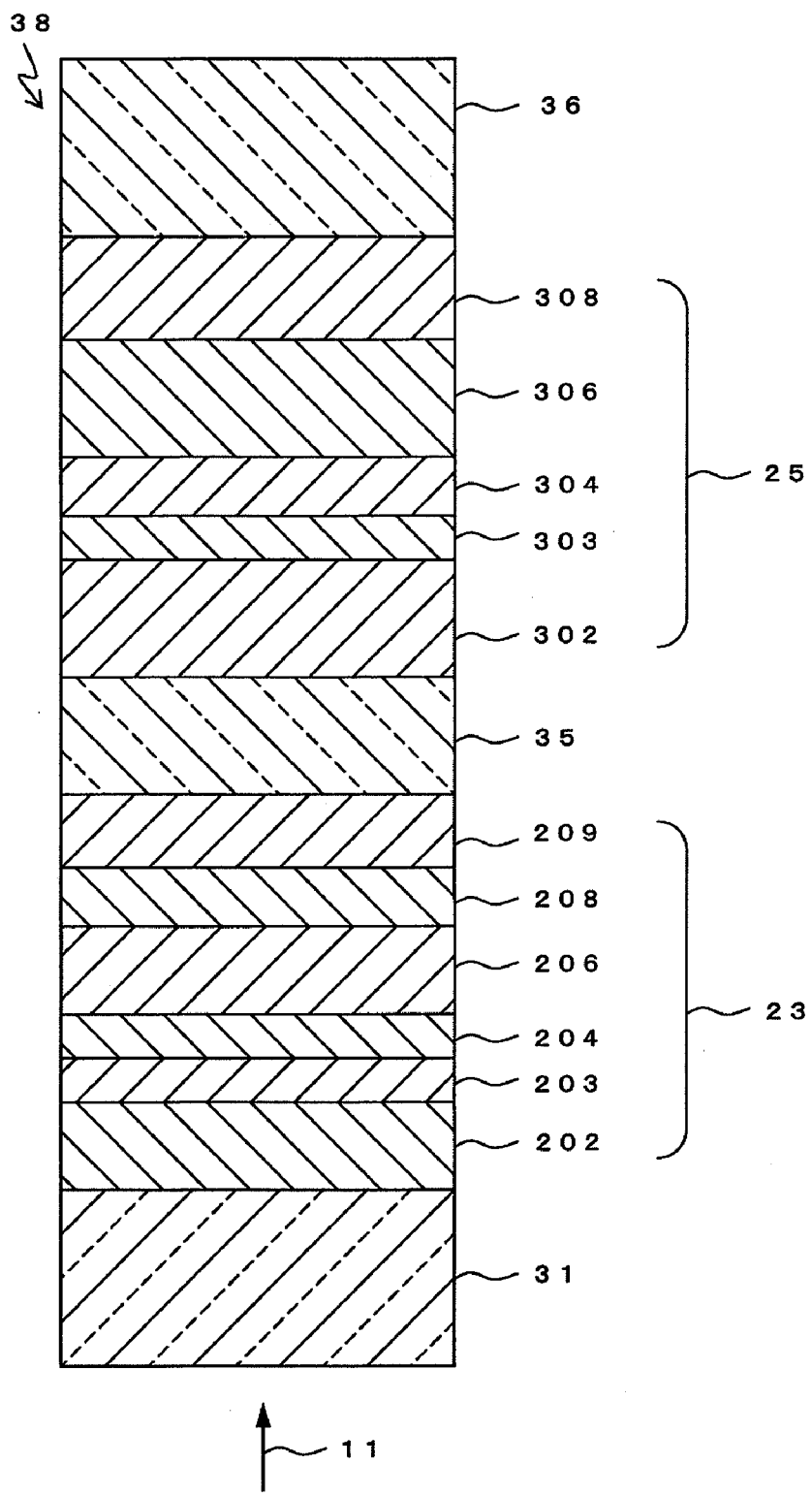
FIG. 7 is a partial sectional view schematically showing an example of layer constitution of the information recording medium having two information layers of the present invention.

An example of the multi-layer optical information recording medium of the sixth embodiment wherein the information recording medium is constituted from two sets of information layers, namely N=2 will be described as the seventh embodiment. A partial sectional view of the information recording medium 38 of the seventh embodiment is shown in FIG. 7. The information recording medium 38 is a two-layer optical information recording medium on and from which information can be recorded and reproduced by irradiating with the unidirectional laser beam 11, similarly to the information recording medium 24 of the third embodiment.

The information recording medium 38 has such a constitution as the substrate 31 having the first information layer 23 formed thereon and the substrate 36 having the second information layer 25 formed thereon are bonded together by means of an adhesive layer 35. The substrate 36 may have a guide groove formed as required to guide the laser beam on the surface of the second reflective layer 308 side. The surface of the substrate 36 opposite to the second reflective layer 308 is preferably smooth. Description will be omitted for the elements identified with the same reference numerals as those in the third embodiment, the fifth embodiment and the sixth embodiment.

The information recording medium 38 can be manufactured by a method described below. First, the first information layer 23 is formed on the substrate 31 (having a thickness of, for example, 0.6 mm) by a method similar to that employed in the sixth embodiment.

After forming the transmittance adjustment layer 209, the first reflective layer 208 or the fourth dielectric material layer 206, the first recording layer 204 may optionally be crystallized over the entire surface thereof, so as to be initialized. The crystallization of the first recording layer 204 is carried out generally by irradiating it with laser beam.

In the meantime, the second information layer 25 is formed on the substrate 36 (having a thickness of, for example, 0.6 mm). In the case where the substrate 36 has guide groove formed thereon for guiding the laser beam 11, the second information layer 25 is formed on the side where the guide groove is formed. Specifically, the substrate 36 is placed in a film formation apparatus, and the second reflective layer 308, the second dielectric material layer 306, the second recording layer 304 and the first dielectric material layer 302 are formed successively. A first interface layer 303 may be formed as required between the first dielectric material layer 302 and the second recording layer 304. A second interface layer may also be formed as required between the second recording layer 304 and the second dielectric material layer 306. Furthermore, an interface layer may also be formed as required between the second reflective layer 308 and the second dielectric material layer 306. Method for forming each layer is similar to the method for forming each layer of the third embodiment.

After forming the first dielectric material layer 302, the second recording layer 304 may optionally be crystallized over the entire surface thereof, so as to be initialized. The crystallization of the second recording layer 304 is carried out generally by irradiating it with laser beam.

Last, the substrate 31 having the first information layer 23 formed thereon and the substrate 36 having the second information layer 25 formed thereon are bonded with each other by using the adhesive layer 35. Specifically, photo-curable resin (particularly an ultraviolet-curable resin) or a delayed-action resin is applied onto the first information layer 23 or the second information layer 25. The first dielectric material layer 302 formed on the substrate 31 and the transmittance adjustment layer 209 formed on the substrate 36, or the first reflective layer 208 or the fourth dielectric material layer 206 are put into contact with each other and spin coating is carried out followed by curing the resin. Alternatively, the first information layer 23 or the second information layer 25 may be uniformly coated with an adhesive resin in advance, and the substrate 31 and the substrate 36 may be bonded by means of the resin.

The first recording layer 204 may optionally be crystallized over the entire surface thereof, so as to be initialized. Alternatively, the second recording layer 304 may also be initialized in addition to the first recording layer 204, at this stage. In this case, it is preferable to crystallize the second recording layer 304 first, for the same reasons as described in the third embodiment.

The information recording medium 38 can be manufactured as described above. In this embodiment, the layers are formed by the sputtering process. But the process of forming the layers is not restricted to this, and the vacuum vapor deposition process, the ion plating process, the CVD process, the MBE process or the like may be employed.

Eighth Embodiment

Figure 8:
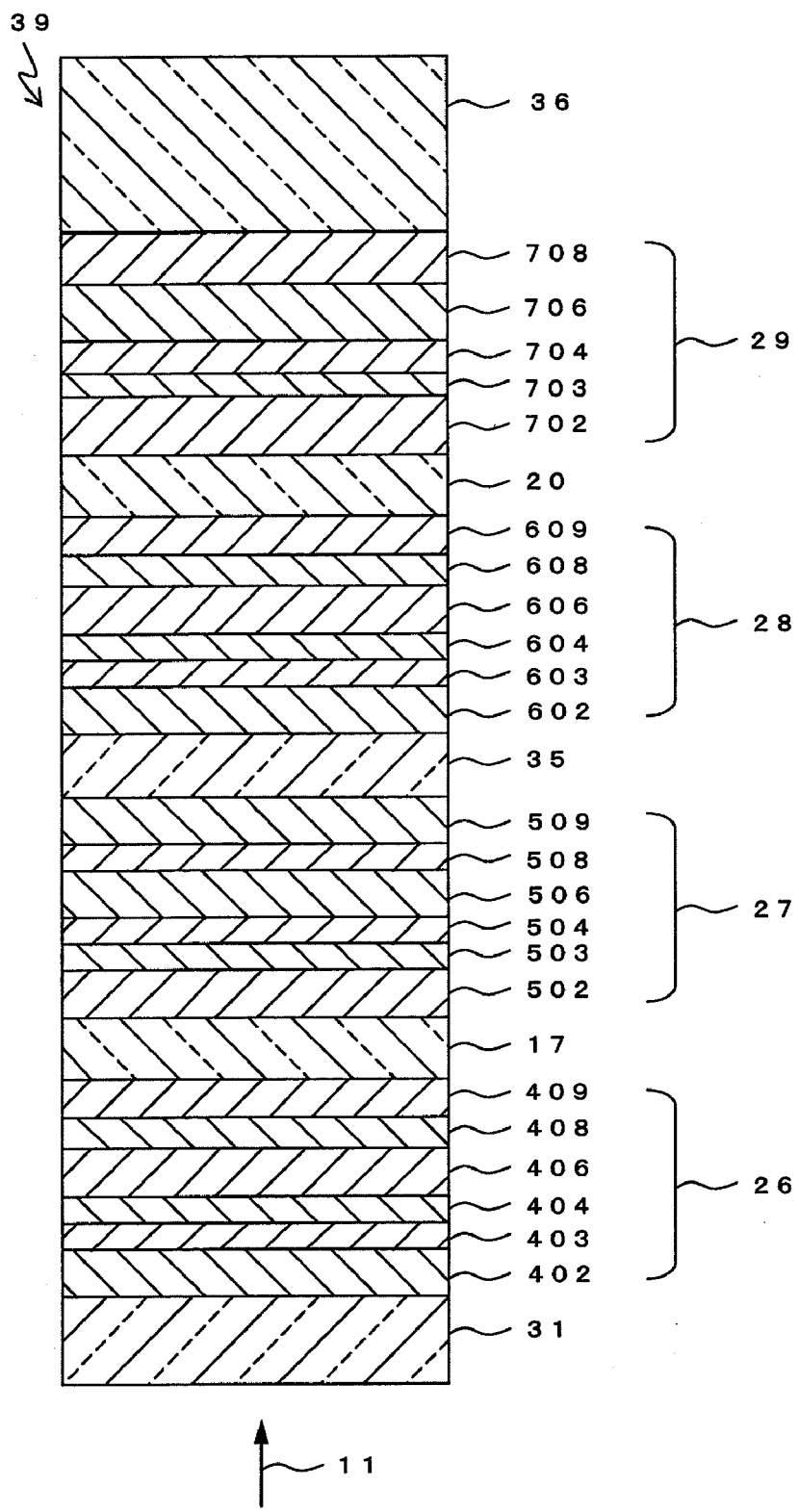
FIG. 8 is a partial sectional view schematically showing an example of layer constitution of the information recording medium having four information layers of the present invention.

Another example of the information recording medium, that is the multi-layer optical information recording medium of the sixth embodiment wherein the information recording medium is constituted from four sets of information layers, namely by setting N=4, will be described as the eighth embodiment. A partial sectional view of the information recording medium 39 of the eighth embodiment is shown in FIG. 8. The information recording medium 39 is a four-layer optical information recording medium on and from which information can be recorded and reproduced by irradiating it with the unidirectional laser beam 11, similarly to the information recording medium 30 of the fourth embodiment.

The information recording medium 39 has such a constitution as the first information layer 26 and the second information layer 27 are formed on the substrate 3 and the fourth information layer 29 and the third information layer 28 are formed on the substrate 36, and these stacks are bonded together via the adhesive layer 35.

Description will be omitted for the elements identified with the same reference numerals as those in the fourth embodiment, the fifth embodiment, the sixth embodiment and the seventh embodiment.

The information recording medium 39 can be manufactured by a method described below.

First, the first information layer 26 is formed on the substrate 31 (having a thickness of, for example, 0.6 mm). In the case where the guide groove is formed for guiding the laser beam 11, the first information layer 26 is formed on the side where the guide groove is formed. Specifically, the substrate 31 is placed in a film formation apparatus, and the seventh dielectric material layer 402, the first recording layer 404 and the eighth dielectric material layer 406 are formed successively. The seventh interface layer 403 may be formed as required between the seventh dielectric material layer 402 and the first recording layer 404. Moreover, the eighth interface layer may be formed as required between the first recording layer 404 and the eighth dielectric material layer 406. Moreover, after forming the eighth dielectric material layer 406, the first reflective layer 408 may be formed depending on the constitution of the first information layer 23. Furthermore the first transmittance adjustment layer 409 may be formed after forming the first reflective layer 408. Method for forming each layer is similar to the method for forming each layer of the fourth embodiment.

Then the optical separation layer 17 is formed on the first transmittance adjustment layer 409, the first reflective layer 408 or the eighth dielectric material layer 406 by a method similar to that described in relation to the fourth embodiment. After forming the optical separation layer 17, the first transmittance adjustment layer 409, the first reflective layer 408 or the eighth dielectric material layer 406, the first recording layer 404 may optionally be crystallized over the entire surface thereof, so as to be initialized. The crystallization of the first recording layer 404 can be carried out generally by irradiating it with laser beam.

Then the second information layer 27 is formed on the optical separation layer 17. Specifically, a stack constituted from the first information layer 26 and the optical separation layer 17 formed on the substrate 31 is placed in a film formation apparatus, and the fifth dielectric material layer 502, the second recording layer 504 and the sixth dielectric material layer 506 are formed successively. The fifth interface layer 503 may be formed as required between the fifth dielectric material layer 502 and the second recording layer 504. The sixth interface layer may also be formed as required between the second recording layer 504 and the sixth dielectric material layer 506. Moreover, after forming the sixth dielectric material layer 506, the second reflective layer 508 may be formed depending on the constitution of the second information layer 27. Furthermore the second transmittance adjustment layer 509 may be formed after forming the second reflective layer 508. Method for forming each layer is similar to the method for forming each layer of the fourth embodiment.

After forming the second transmittance adjustment layer 509, or after forming the second reflective layer 508 or the sixth dielectric material layer 506, the first recording layer 404 and/or the second recording layer 504 may optionally be crystallized over the entire surface thereof, so as to be initialized. That is, the crystallization of the first recording layer 404 may be carried out at this stage. The crystallization of the first recording layer 404 and/or the second recording layer 504 is carried out generally by irradiating it with laser beam.

Then the fourth information layer 29 is formed on the substrate 36 (having a thickness of, for example, 0.6 mm). In the case where the substrate 36 has guide groove formed thereon for guiding the laser beam 11, the fourth information layer 29 is formed on the side where the guide groove is formed. Specifically, the substrate 36 is placed in a film formation apparatus, and the fourth reflective layer 708, the second dielectric material layer 706, the fourth recording layer 704 and the first dielectric material layer 702 are formed successively. A first interface layer 703 may be formed as required between the first dielectric material layer 702 and the fourth recording layer 704. A second interface layer may also be formed as required between the fourth recording layer 704 and the second dielectric material layer 706. Furthermore, an interface layer may also be formed as required between the second dielectric material layer 706 and the fourth reflective layer 708. Method for forming each layer is similar to the method for forming each layer of the fourth embodiment.

Then the optical separation layer 20 is formed on the first dielectric material layer 702 by a method similar to that described in relation to the fourth embodiment. After forming the optical separation layer 20, or forming the first dielectric material layer 702, the fourth recording layer 704 may optionally be crystallized over the entire surface thereof, so as to be initialized. The crystallization of the fourth recording layer 704 is carried out generally by irradiating it with laser beam.

Then the third information layer 28 is formed on the optical separation layer 20. Specifically, a stack constituted from the fourth information layer 29 and the optical separation layer 20 formed on the substrate 36 is placed in a film formation apparatus, and the fourth dielectric material layer 606, the third recording layer 604 and the third dielectric material layer 602 are formed successively. A third interface layer 603 may be formed as required between the third dielectric material layer 602 and the third recording layer 604. A fourth interface layer may also be formed as required between the third recording layer 604 and the fourth dielectric material layer 606. Furthermore, the third reflective layer 608 layer may also be formed before forming the fourth dielectric material layer 606 depending on the constitution of the third information layer 28. The third transmittance adjustment layer 609 may be formed before forming the third reflective layer 608. Method for forming each layer is similar to that for forming each layer of the fourth embodiment.

After forming the third dielectric material layer 602, the third recording layer 604 and/or the fourth recording layer 704 (if not initialized before the third information layer 28 is formed) may optionally be crystallized over the entire surface thereof, so as to be crystallized. The crystallization of the third recording layer 604 and/or the fourth recording layer 704 is carried out generally by irradiating it with laser beam.

Last, the substrate 31 having the first information layer 26, the optical separation layer 17 and the second information layer 27 formed thereon and the substrate 36 having the fourth information layer 29, the optical separation layer 20 and the third information layer 28 formed thereon are bonded together by means of the adhesive layer 35. Specifically, a photo-curable resin (particularly an ultraviolet-curable resin) or a delayed-action resin is applied onto the second information layer 27 or the third information layer 28. Then the substrate 31 and the substrate 36 are put into contact and then subjected to spin coating, and the resin is cured. Alternatively, the second information layer 27 or the third information layer 28 may also be uniformly coated with an adhesive resin in advance and the substrate 31 and the substrate 36 may be bonded with each other by means of the resin.

Then, an initialization process may be carried out as required, wherein the fourth recording layer 704, the third recording layer 604, the second recording layer 504 and/or the first recording layer 404 are crystallized over the entire surface thereof.

The information recording medium 39 can be manufactured as described above. In this embodiment, the layers are formed by the sputtering process. But the process of forming the layers is not restricted to this, and the vacuum vapor deposition process, the ion plating process, the CVD process, the MBE process or the like may be employed.

Ninth Embodiment

The ninth embodiment is a method for recording or reproducing information on or from the information recording medium of the present invention described in the first, second, third, fourth, fifth, sixth, seventh and eighth embodiments.

Figure 9:
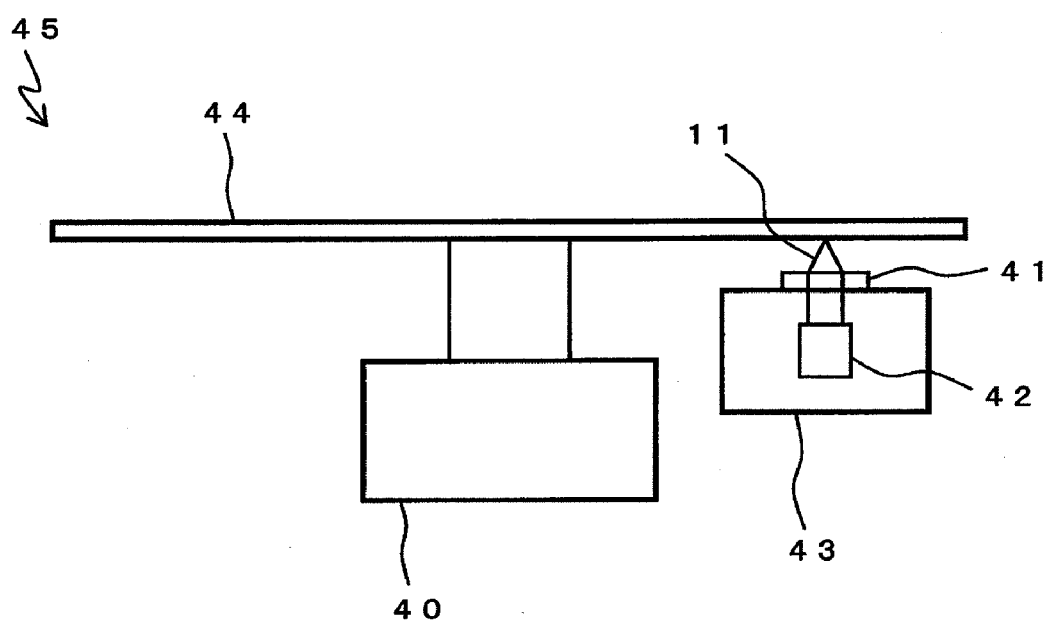
FIG. 9 schematically shows a part of the constitution of a recording/reproduction apparatus used in recording and reproduction of the information recording medium of the present invention.

Constitution of a part of a recording/reproduction apparatus 45 used in the method for recording and reproducing information on or from the information recording medium of the present invention is schematically shown in FIG. 9. The recording/reproduction apparatus 45 shown in FIG. 9 is provided with a spindle motor 40 that drives an information recording medium 44 to rotate, a semiconductor laser 42 and an optical head 43 having an objective lens 41 that focuses the laser beam 11 emitted by the semiconductor laser 42. The information recording medium 44 is the information recording medium described in the first, second, third, fourth, fifth, sixth, seventh or eighth embodiment, having a single information layer (for example, the information layer 16) or a plurality of information layers (for example, the first information layer 23 and the second information layer 25). The objective lens 41 focuses the laser beam 11 on the information layer.

Information is recorded on, erased from and overwritten on the information recording medium, while modulating the power of the laser beam 11 between peak power ($P_p$ (mW)) of a high power level and bias power ($P_b$ (mW)) of a low power level. Irradiation of the laser beam 11 at the peak power turns the recording layer locally into amorphous phase, with the portion that has turned to amorphous phase becoming a recording mark. The portion between the recording marks is irradiated with the laser beam 11 of bias power so that crystal phase (erasure portion) is formed. The laser beam 11 at the peak power is usually emitted in the form of a train of pulses, the so-called multiple pulses. The multiple pulse train may be subjected to binary modulation between the peak power and the bias power. Alternatively, the multiple pulse may also be modulated between three values or four values over a range from 0 mW to the peak power by setting a cooling power level ($P_c$ (mW)) and a bottom power level ($P_b$ (mW)) that are lower than the bias power.

Recorded information is reproduced by using a detector that detects a signal obtained from the information recording medium by irradiating it with the laser beam 11 at the reproduction power level. The reproduction power level ($P_r$ (mW)) is set lower than the peak power and the bias power levels. The reproduction power level is set so that irradiation of the laser beam 11 at this power level does not affect the optical properties of the recording mark, and the information recording medium reflects light of intensity high enough to reproduce the recording mark.

Numerical aperture NA of the objective lens 41 is preferably in a range of from 0.5 to 1.1 and more preferably from 0.6 to 0.9, so as to adjust the diameter of the laser beam spot within a range of from 0.4 μm to 0.7 μm. Wavelength of the laser beam 11 is preferably not longer than 450 nm, more preferably in a range of from 350 nm to 450 nm. A linear velocity of the information recording medium during recording is preferably in a range of from 4 m/second to 50 m/second, and more preferably from 9 m/second to 40 m/second, that enables it to ensure sufficient erasure operation and does not cause crystallization due to the reproduction laser beam.

It goes without saying that a wavelength, a numerical aperture of the objective lens and a linear velocity other than those described above may be employed in accordance to the type of the information recording medium. For example, a laser beam having a wavelength between 650 nm and 670 nm may also be used.

In the information recording medium 24 and the information recording medium 38 provided with two information layers, recording of information onto the first information layer 23 is carried out by means of the laser beam 11 that has transmitted through the transparent layer 13, with the laser beam 11 being focused onto the first recording layer 204, thereby recording the information in the first recording layer 204. Reproduction of information is carried out by detecting the laser beam 11 that has reflected on the first recording layer 204 and transmitted through the transparent layer 13. Recording of information onto the second information layer 25 is carried out by means of the laser beam 11 that has transmitted through the transparent layer 13, the first information layer 23 and the optical separation layer 17, with the laser beam 11 being focused onto the second recording layer 304. Information is reproduced by detecting the laser beam 11 that has reflected on the second recording layer 304 and transmitted through the optical separation layer 17, the first information layer 23 and the transparent layer 13.

In the case where the substrate 14, the optical separation layer 20, 19 and 17 have guide grooves formed thereon for guiding the laser beam 11, information may be recorded either on the surface located near the side where the laser beam 11 enters (groove) or on the surface located away from the side where the Laser beam 11 enters (land). Alternatively, information may be recorded on both the groove and the land.

Performance of the information recording medium can be evaluated as described below by using the recording/reproduction apparatus. First, the laser beam 11 is power-modulated between 0 and $P_p$ (mW), and random signals are recorded with mark length from 0.149 μm (2T) to 0.596 μm (8T) by (1-7) modulation scheme. Jitters (error of mark position) between the leading edges and trailing edges of the recording marks are measured with a time interval analyzer, to evaluate the recording performance. As the value of the jitter is smaller, the recording characteristics are higher. $P_p$ and $P_b$ are set so as to minimize the mean value of the jitters between the leading edges and trailing edges of the recording marks (mean jitter). Optimum value of $P_p$ determined in this process is taken as the recording power.

Erasability is evaluated as described below. The laser beam 11 is power-modulated between 0 and $P_p$ (mW), and signals with mark length of 0.149 μm (2T) and 0.671 μm (9T) are alternately recorded in the same groove consecutively 10 times. The difference between the amplitude of 2T signal when 2T signal is overwritten in the eleventh recording cycle and the amplitude of 2T signal when 9T signal is overwritten thereafter is measured with a spectrum analyzer as the erase ratio of 2T signal. As the value of the erase ratio is larger, the erasability is more favorable.

Signal intensity is evaluated as follows. The laser beam 11 is power-modulated between 0 and $P_p$ (mW), and signals with mark lengths of 0.149 μm (2T) and 0.671 μm (9T) are recorded alternately in the same groove consecutively 10 times, followed by overwriting of 2T signal at the last. The ratio (CNR: carrier to nose ratio) of the signal amplitude (carrier level) at the frequency of 2T signal to the noise amplitude (noise level) is measured with a spectrum analyzer. As the value of CNR is larger, the signal intensity is stronger.

The number of overwrite cycles is evaluated in a procedure described below. The laser beam 11 is power-modulated between 0 and $P_p$ (mW), and random signals having the mark lengths of from 0.149 μm (2T) to 0.596 μm (8T) are recorded by continuously 10 times on the same groove. Jitter between the leading edges and trailing edges at the end of each overwrite cycle is measured with a time interval analyzer. The number of overwrite cycles at which the jitter increases by 3% over the mean jitter between the leading edges and trailing edges at the first overwrite cycle is taken as the upper limit. $P_p$, $P_b$, $P_c$ and $P_B$ are set so as to minimize the mean value of the jitters.

Tenth Embodiment

Figure 10:
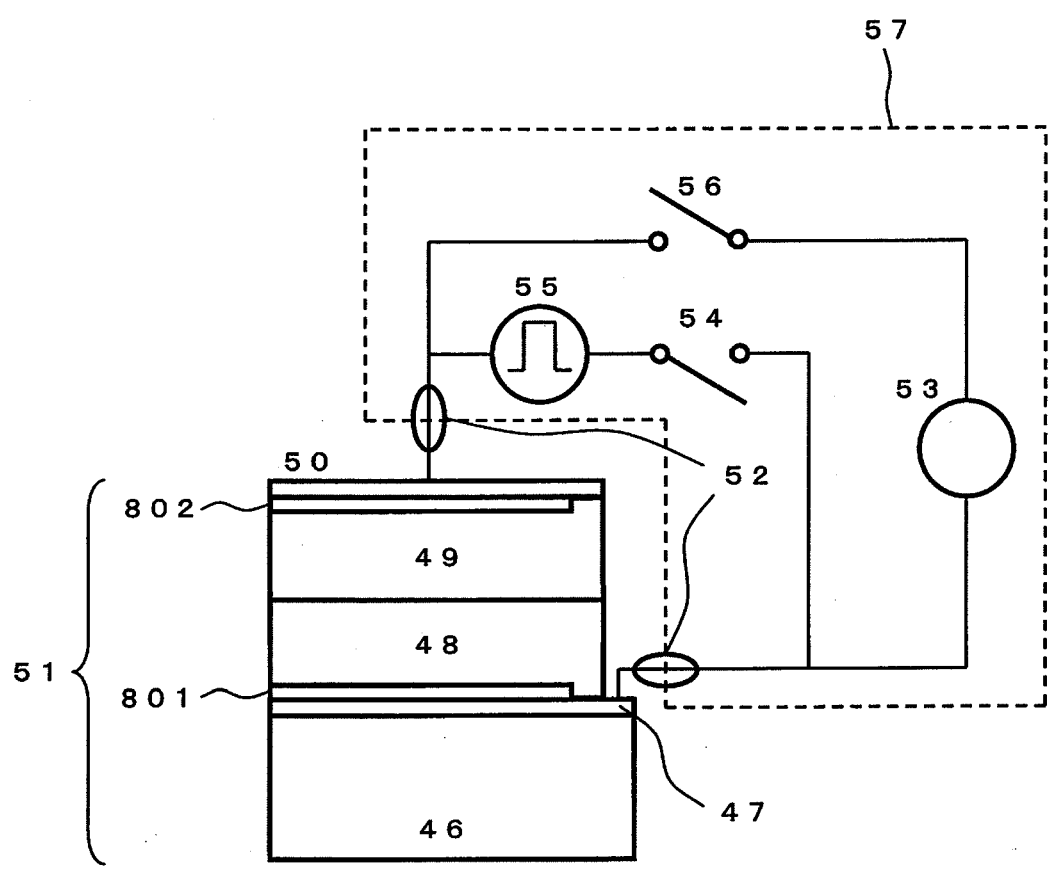
FIG. 10 schematically shows a part of the constitution of the information recording medium and an electrical information recording/reproduction apparatus of the present invention.

Another example of the information recording medium of the present invention will be described as the tenth embodiment. An example of the constitution of an electrical information recording medium 51 of the tenth embodiment is shown in FIG. 10. The electrical information recording medium 51 is an information recording medium on and from which information can be recorded and reproduced by applying an electrical energy (particularly electric current).

A substrate 46 may be a resin substrate such as polycarbonate, a glass substrate, a ceramics substrate such as $Al_2O_3$, a semiconductor substrate such as Si or a metal substrate such as Cu. An embodiment wherein an Si substrate is used as the substrate will be described here. The electrical information recording medium 51 is constituted by forming a lower electrode 47, a first dielectric material layer 801, a first recording layer 48, a second recording layer 49, a second dielectric material layer 802 and an upper electrode 50 in this order on the substrate 46. The lower electrode 47 and the upper electrode 50 are formed for the purpose of supplying electrical current to the first recording layer 48 and the second recording layer 49. The first dielectric material layer 801 is provided for the purpose of adjusting the amount of electrical energy supplied to the first recording layer 48, and the second dielectric material layer 802 is provided for the purpose of adjusting the amount of electrical energy supplied to the second recording layer 49. The first dielectric material layer 801 and the second dielectric material layer 802 may be formed using a material similar to that used for the second dielectric material layer 106 of the first embodiment.

The first recording layer 48 and the second recording layer 49 are formed from a material that undergoes reversible phase change between the crystal phase and the amorphous phase caused by the Joule heat generated by applying the electrical current. This medium utilizes the difference in resistivity between the crystal phase and the amorphous phase for recording information. The first recording layer 48 and the second recording layer 49 may be formed using a material similar to that used for the recording layer 104 of the first embodiment. The first recording layer 48 and the second recording layer 49 can be formed by a method similar to that employed for the recording layer 104 of the first embodiment.

The lower electrode 47 and the upper electrode 50 can be formed from an element metal such as Ti, W, Al, Au, Ag, Cu, Pt or the like. Alternatively, the lower electrode 47 and the upper electrode 50 may be formed from an alloy which is based on one or more elements selected from these elements as the main component and contains one or more other elements added to improve the humidity resistance or to control the thermal conductivity. The lower electrode 47 and the upper electrode 50 can be formed by sputtering a base metal or a base alloy which is the material for the electrodes, in an Ar gas atmosphere or an atmosphere of mixed gas of Ar gas and reaction gas (at least one kind of gas selected from among $O_2$ and $N_2$). The process of forming each layer is not restricted to sputtering, and other process such as the vacuum vapor the deposition process, the ion plating process, the CVD process or the MBE process may also be employed.

The electrical information recording medium 51 is electrically connected via voltage applying sections 52 to an electrical information recording/reproduction apparatus 57. In the electrical information recording/reproduction apparatus 57, a pulse supply 55 is connected via a switch 54 between the lower electrode 47 and the upper electrode 50 so as to supply electrical pulses to the first recording layer 48 and the second recording layer 49. A resistance measuring instrument 53 is connected via a switch 56 between the lower electrode 47 and the upper electrode 50 so as to detect the change in the resistance due to phase change in the first recording layer 48 and the second recording layer 49.

The first recording layer 48 or the second recording layer 49 that is in amorphous phase (the state of high resistance) can be turned into crystal phase (the state of low resistance) by closing the switch 54 (the switch 56 is opened) so as to supply current pulses between the electrodes. The current pulses are supplied in such a manner as the portion supplied with the electrical pulses is kept at a temperature higher than the crystallization temperature of the material and lower than the melting point for the period of crystallization. The material can be turned from the crystal phase back into the amorphous phase by supplying electrical pulses having an amplitude higher than that of crystallization for a shorter period of time so as to heat the recording layer to a temperature higher than the melting point and melting it, then cooling it down quickly. The pulse supply 55 of the electrical information recording/reproduction apparatus 57 is a power supply that is capable of delivering recording and erasure pulses of waveforms shown in FIG. 13.

Here, $r_{a1}$ is a resistance of the first recording layer 48 in amorphous phase, $r_{c1}$ is a resistance of the first recording layer 48 in crystal phase, $r_{a2}$ is a resistance of the second recording layer 49 in amorphous phase and $r_{c2}$ is a resistance of the second recording layer 49 in crystal phase. When these satisfy relationships $r_{c1} \leq r_{c2} < r_{a1} < r_{a2}$, or $r_{c1} \leq r_{c2} < r_{a2} < r_{a1}$, or $r_{c2} \leq r_{c1} < r_{a1} < r_{a2}$, or $r_{c2} \leq r_{c1} < r_{a2} < r_{a1}$, the sum of the resistances of the first recording layer 48 and the second recording layer 49 can be set to four different values of $r_{a1}+r_{a2}$, $r_{a1}+r_{a2}$, $r_{a2}+r_{c1}$ and $r_{c1}+r_{c2}$. As a result, binary information of four distinct states can be detected simultaneously by measuring the resistance between the electrodes with the resistance measuring instrument 53.

Figure 11:
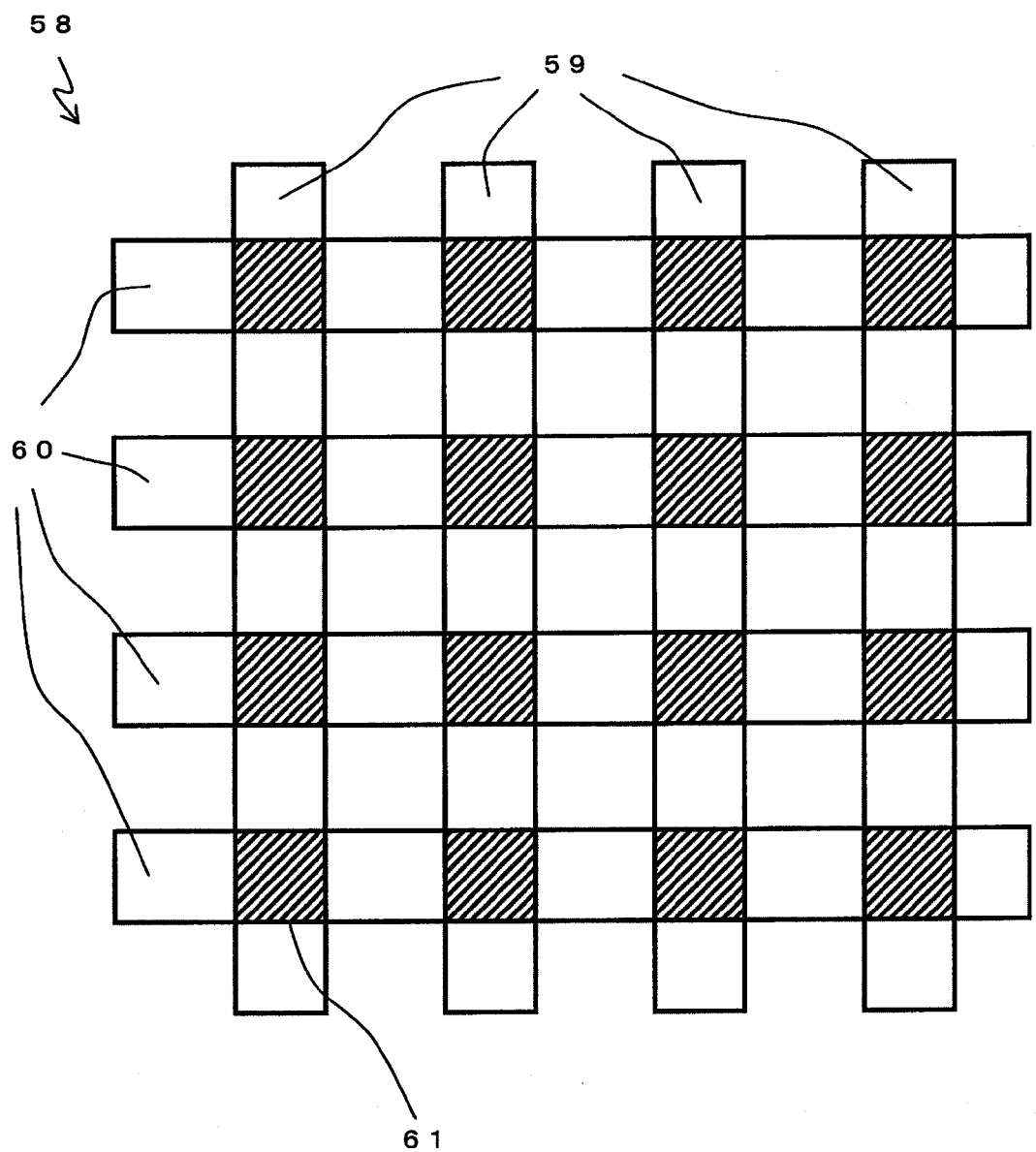
FIG. 11 schematically shows a part of the constitution of an electrical information recording medium of the present invention having large storage capacity.

The electrical information recording medium 58 having a large storage capacity shown in FIG. 11 can be constituted by disposing multitude of the electrical information recording media 51 in a matrix array. Each memory cell 61 has a tiny region having constitution similar to that of the electrical information recording medium 51. Information is recorded on and reproduced from each memory cell 61 by designating a word line 59 and a bit line 60.

Figure 12:
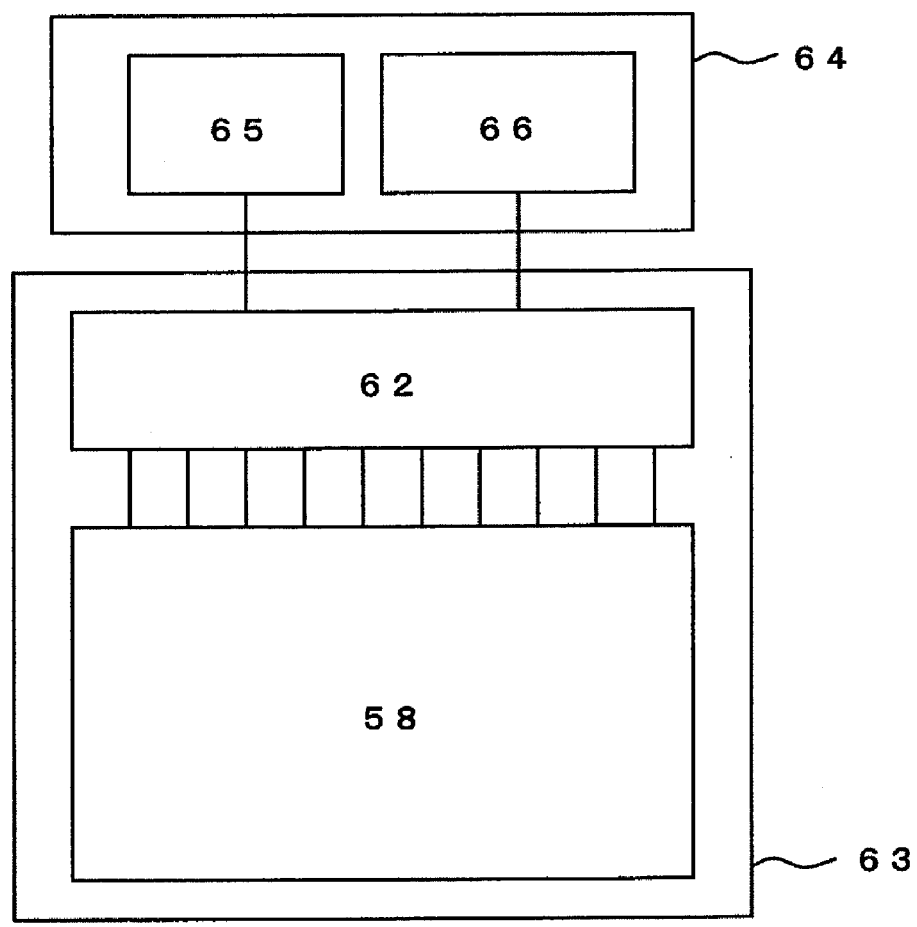
FIG. 12 schematically shows a part of the constitution of the electrical information recording medium of the present invention and a recording/reproduction system therefor.

FIG. 12 shows an example of constitution of an information recording system that uses the electrical information recording medium 58. A memory device 63 is constituted from the electrical information recording medium 58 and an addressing circuit 62. The word line 59 and the bit line 60 of the electrical information recording medium 58 are designated by the addressing circuit 62, so as to record information and reproduce information on and from each of the memory cells 61. With the memory device 63 electrically connected to an external circuit 64 constituted from at least the pulse supply 65 and the resistance measuring instrument 66, information can be recorded on or reproduced from the electrical information recording medium 58.

Eleventh Embodiment

The sputtering target of the present invention will be described as the eleventh embodiment.

The sputtering target of the present invention contains at least one element selected from among Zn, Si and C (group of these elements will hereafter be referred to as M1), and Sb in 85 atomic % or more in total. The sputtering target of the present invention may also contain at least one element selected from among Ga, Ge, Ag, In, Sn Te and Bi (group of these elements will hereafter be referred to as M2). The sputtering target of the present invention may further contain at least one element selected from among B, Mg, Al, S, Ca, Sc, Ti, V, Cr, Mn, Fe, Co, Ni, Cu, Sr, Y, Zr, Nb, Mo, Ru, Rh, Pd, Hf, Ta, W, Ir, Pt, Au, La, Ce, Pr, Nd, Sm, Eu, Gd, Tb, Dy, Ho, Er, Tm, Yb and Lu (group of these elements will hereafter be referred to as M3). Use of a sputtering target having such a constitution as described above makes it possible to form a film that contains Sb-M1, Sb-M1-M2 or Sb-M1-M2-M3 as the recording layer of the information recording medium.

By using the sputtering target described above and introducing a rare gas or a mixture of rare gas and a trace of reactive gas, the recording layer can be formed, and variability in the reflectance and variability in jitter across the medium surface can be kept low when the layer is grown at a fast rate. In order to grow the layer at a faster rate and suppress the variability further, it is preferable that the sputtering target has a high density ("density" represents the packing ratio of powder, and the density is defined as 100% when the power is packed without any space empty). The sputtering target of the present invention preferably has a density of 80% or higher, and more preferably 90% or higher.

Now an example of method for manufacturing the sputtering target of the present invention will be described.

As an example, a method for manufacturing the sputtering target that contains Sb and M1 will be described. High-purity Sb powder and M1 powder that have predetermined particle size are weighed and mixed in predetermined proportions, and put into a hot press apparatus. The hot press apparatus is pumped vacuum as required, and is kept under condition of a predetermined high pressure and high temperature for a predetermined period of time so as to sinter the mixed powder. Composition of the sputtering target can be uniform within the plane and in the direction of thickness by mixing the powder carefully. The powder can be packed satisfactorily so as to enable it to manufacture the sputtering target having high density, by optimizing the pressure, the temperature and the duration. Thus the sputtering target that contains Sb and M1 in predetermined proportions is completed in this way.

After sintering, the sputtering target may be bonded onto a copper plate having smooth surface, by using a solder such as In, as required. This enables it to secure the sputtering target in the sputtering apparatus during the sputtering operation.

A sputtering target that contains Sb, M1 and M2 is similarly made by preparing high-purity Sb powder, M1 powder and M2 powder that have predetermined particle sizes are prepared, and following the manufacturing process described above. Alternatively, high-purity Sb-M1 powder and Sb-M2 that have predetermined particle sizes may be prepared. Or high-purity Sb powder and M1-M2 powder that have predetermined particle sizes may also be prepared. Or high-purity Sb powder, Sb-M1 powder and M1-M2 powder that have predetermined particle sizes may also be prepared. Or high-purity Sb powder, M1 powder, M2 powder, and Sb-M1-M2 that have predetermined particle sizes may also be prepared.

The sputtering target can be manufactured by the method described above, whichever of the combinations of powders is used.

A sputtering target that contains Sb, M1, M2 and M3 can also be made by preparing high-purity Sb powder, M1 powder, M2 powder and M3 powder that have predetermined particle sizes and following the method described above.

As described previously, the recording layer is preferably formed by sputtering the sputtering target described above, because film formation apparatus designed to form multi-layer film in mass production has been available in market, and enables it to obtain thin film having good film quality relatively easily.

The sputtering target of the present invention may have the composition represented by any of the formulas (1) through (6) described above in relation to the recording layer. In some cases, a sputtering target having parameters a1, a2, a3, a4, a5, a6 and b6 not in the range described above may also be used as the sputtering target of the present invention, depending on the sputtering conditions.

Since Sb contained in the recording layer of the present invention is easier to sputter (exhibits higher sputtering rate) than the other elements, the film obtained may have composition containing higher content of Sb than that of the sputtering target. For this reason, it is preferable that the sputtering target has a lower Sb content than that desired in the composition of the film to be formed. Other elements (M1, M2 and M3) also have specific sputtering rates, and therefore it is necessary to determine the actual relationship between the compositions of the film and the sputtering target and set the composition of the sputtering target so as to obtain the desired compositions of the film.

The sputtering target may contain a material represented by the formula (10):

$$Sb_{100-A1}M1_{A1}(\text{atomic \%}) \qquad (10)$$

wherein M1 represents at least one element selected from among Zn, Si and C, while a1 is a proportion in atomic % that satisfies a relationship of $a1<A1\leq(a1+3)$, when the film to be formed contains a material represented by the formula (1):

$$Sb_{100-a1}M1_{a1}(\text{atomic \%}) \qquad (1)$$

wherein M1 represents at least one element selected from among Zn, Si and C, while a1 is a proportion in atomic % that satisfies a relationship of $0<a1\leq50$.

Figure 14:
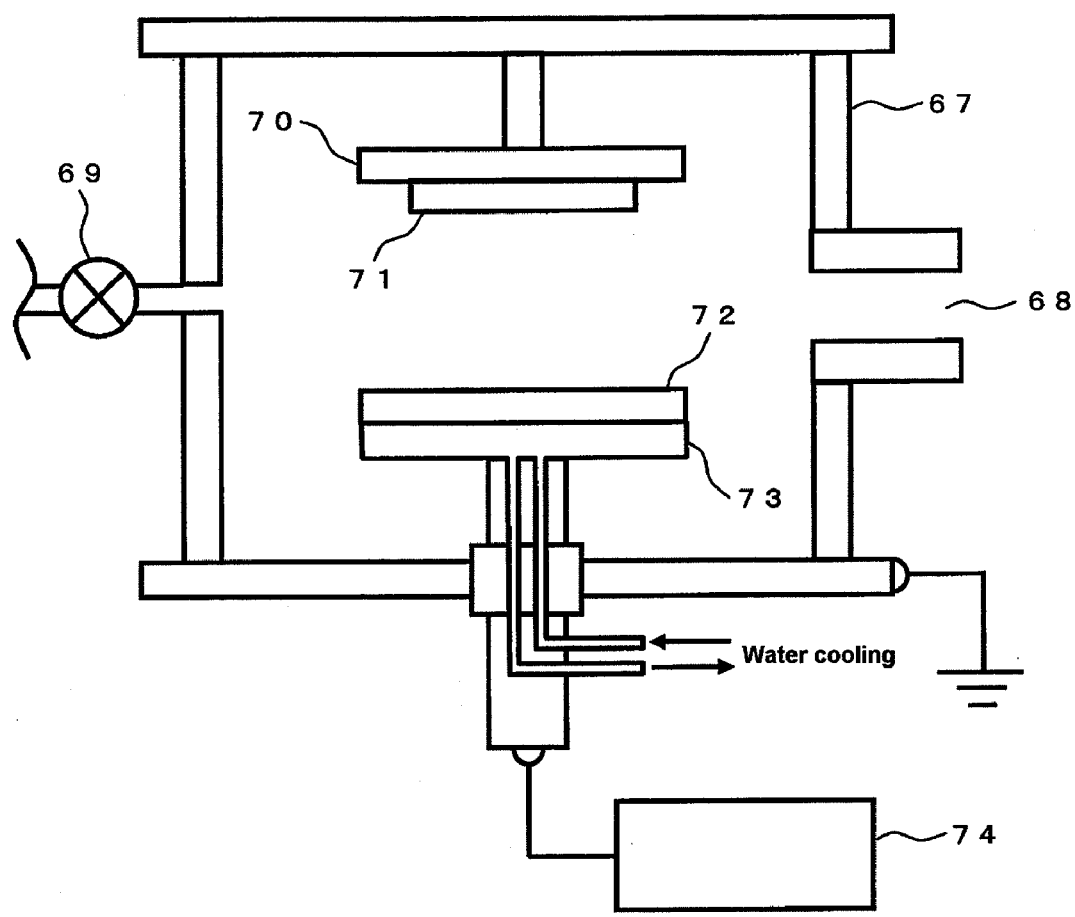
FIG. 14 schematically shows a part of a sputtering apparatus used to manufacture the information recording medium of the present invention.
Figure 15:
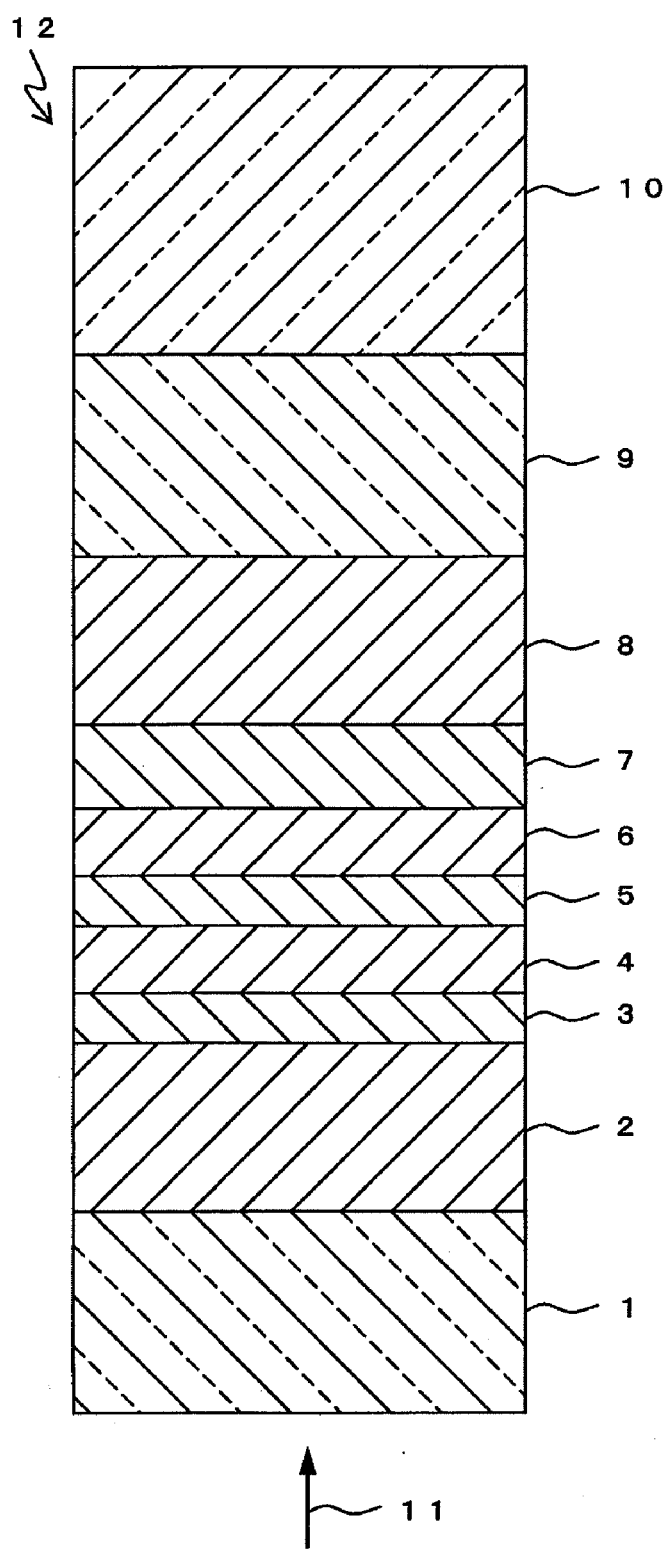
FIG. 15 is a partial sectional view schematically showing an example of layer constitution of 4.7 GB/DVD-RAM.

Now an example of sputtering apparatus used in the manufacture of the information recording medium of the present invention will be described. FIG. 14 schematically shows the formation of film by using a sputtering apparatus. As shown in FIG. 14, this sputtering apparatus has such a constitution as a vacuum pump (not shown) is connected via an exhaust port 68 to a vacuum vessel 67, so that inside of the vacuum vessel 67 can be kept at high degree of vacuum, while a gas can be supplied at a constant flow rate through a gas supply port 69. A substrate 71 (a base whereon the film is to be formed) is placed on a positive electrode 70. The vacuum vessel 67 is grounded to keep the vacuum vessel 67 and the substrate 71 at the potential of the positive electrode. The sputtering target 72 is connected to a negative electrode 73, and is connected via a switch (not shown) to a power supply 74. A thin film can be formed on the substrate 71 from particles released from the sputtering target 72 by applying a voltage across the positive electrode 70 and the negative electrode 73.

EXAMPLES

The present invention will be described more specifically by way of Examples.

Test 1

In Test 1, the information recording medium 15 shown in FIG. 1 was made, and the relations between the composition of the recording layer 104 and the recording power and the erasability of the information layer 16 were investigated. Specifically, samples 1-1 through 1-48 of the information recording mediums 15 including the information layers 16 with the recording layers 104 of different compositions were made, and the recording power and the erasability of the information layer 16 were measured.

Samples were made as follows. First, the substrate 14 made of polycarbonate (120 nm in diameter, 1.1 mm in thickness) was prepared with guide groove (20 nm in depth, 0.32 μm in track pitch (interval between grooves)) formed thereon for guiding the laser beam 11. An Ag—Pd—Cu layer (80 nm in thickness) as the reflective layer 108, an $(In_2O_3)_{50}(ZrO_2)_{50}$ layer (25 nm in thickness) as the second dielectric material layer 106; the recording layer 104 (10 nm in thickness), a $(Cr_2O_3)_{50}(ZrO_2)_{50}$ layer (5 nm in thickness) as the first interface layer 103, and a $(ZnS)_{80}(SiO_2)_{20}$ layer (60 nm in thickness) as the first dielectric material layer 102 were formed successively by sputtering on the polycarbonate substrate.

Provided in the film formation apparatus used for sputtering of the layers described above were an Ag—Pd—Cu alloy sputtering target for forming the reflective layer 108, an $(In_2O_3)_{50}(ZrO_2)_{50}$ sputtering target for forming the second dielectric material layer 106, an alloy sputtering target for forming the recording layer 104 (for example, an $Sb_{90}C_{10}$ layer was formed by using an alloy sputtering target that contains Sb and C), a $(Cr_2O_3)_{50}(ZrO_2)_{50}$ sputtering target for forming the first interface layer 103 and a $(ZnS)_{50}(SiO_2)_{20}$ sputtering target for forming the first dielectric material layer 102. All the sputtering targets had disk shape 100 mm in diameter and 6 mm in thickness.

The reflective layer 108 was formed by supplying electrical power of 200 W from a DC power supply in an. Ar gas atmosphere having a pressure of 0.2 Pa. The second dielectric material layer 106 was formed by supplying electrical power of 200 W from an RF power supply in an Ar gas atmosphere having a pressure of 0.2 Pa. The recording layer 104 was formed by supplying electrical power of 100 W from a DC power supply in an Ar gas atmosphere having a pressure of 0.2 Pa. The first interface layer 103 was formed by supplying electrical power of 200 W from an RF power supply in an Ar gas atmosphere having a pressure of 0.2 Pa. The first dielectric material layer 102 was formed by supplying electrical power of 400 W from an RF power supply in an Ar gas atmosphere having a pressure of 0.2 Pa.

Last, the first dielectric material layer 102 was coated with an ultraviolet-curable resin. The resin layer was made uniform by rotating the substrate 14, and then the resin was cured by irradiating it with ultraviolet ray. This resulted in the transparent layer 13 having a thickness of 100 μm. Then initialization process was carried out in which the recording layer 104 was crystallized by the laser bean. In this way, a plurality of samples having the recording layers 104 of different compositions were made.

Recording power and erasability of the information layer 16 of the information recording medium 15 were determined by using the recording/reproduction apparatus 45 shown in FIG. 9, for each of the samples made as described above. The determinations were made with the laser beam 11 having a wavelength of 405 nm, the objective lens 41 having a numerical aperture NA of 0.85, a linear velocity of 19.7 m/second during the determination (this speed corresponds to quadruple speed of Blu-ray disk specification for information recording and erasing operations by laser irradiation for an extremely short period of time) and a minimum mark length (2T) of 0.149 μm. Information was recorded in the groove.

Composition of the recording layer 104, and the evaluation results of recording power and erasability of the information layer 16 for each sample are shown in Table 1A and Table 1B. In the Tables, value of recording power less than 8 mW is shown as A, value not lower than 8 mW and less than 9 mW is shown as B, and value not less than 9 mW is shown as C. As to the erasability, value of erase ratio not less than 25 dB is shown as A, value not less than 20 dB and less than 25 dB is shown as B, and value less than 20 dB is shown as C. A medium rated as A or B is capable of serving in practical use, while a medium rated as C is not.

TABLE 1A

| Sample Nos. | Composition of recording layer 104 (atomic %) | Recording power | Erasability |
|---|---|---|---|
| 1-1 | $Sb_{100}$ | C | A |
| 1-2 | $Sb_{98}Zn_2$ | B | A |
| 1-3 | $Sb_{95}Zn_5$ | A | A |
| 1-4 | $Sb_{90}Zn_{10}$ | A | A |
| 1-5 | $Sb_{80}Zn_{20}$ | A | A |
| 1-6 | $Sb_{70}Zn_{30}$ | A | B |
| 1-7 | $Sb_{98}Si_2$ | B | A |
| 1-8 | $Sb_{95}Si_5$ | A | A |
| 1-9 | $Sb_{90}Si_{10}$ | A | A |
| 1-10 | $Sb_{80}Si_{20}$ | A | A |
| 1-11 | $Sb_{70}Si_{30}$ | A | B |
| 1-12 | $Sb_{98}C_2$ | B | A |
| 1-13 | $Sb_{95}C_5$ | A | A |
| 1-14 | $Sb_{90}C_{10}$ | A | A |
| 1-15 | $Sb_{80}C_{20}$ | A | A |
| 1-16 | $Sb_{70}C_{30}$ | A | A |
| 1-17 | $Sb_{50}C_{50}$ | A | B |
| 1-18 | $Sb_{50}Ge_{50}$ | A | C |
| 1-19 | $Sb_{90}Zn_5Si_5$ | A | A |
| 1-20 | $Sb_{90}Zn_5C_5$ | A | A |
| 1-21 | $Sb_{85}Si_5C_{10}$ | A | A |
| 1-22 | $Sb_{85}Zn_5Si_5C_5$ | A | A |
| 1-23 | $Sb_{50}Zn_5Si_5C_{40}$ | A | B |
| 1-24 | $Sb_{50}Ge_{25}Te_{25}$ | A | C |
| 1-25 | $Sb_{95}C_4Ge_1$ | A | A |
| 1-26 | $Sb_{95}C_3Ge_2$ | A | A |
| 1-27 | $Sb_{90}C_5Ge_5$ | A | A |
| 1-28 | $Sb_{85}C_5Ge_{10}$ | A | A |
| 1-29 | $Sb_{80}C_5Ge_{15}$ | A | B |
| 1-30 | $Sb_{90}C_5Ga_5$ | A | A |

TABLE 1B

| Sample Nos. | Composition of recording layer 104 (atomic %) | Recording power | Erasability |
|---|---|---|---|
| 1-31 | $Sb_{90}C_5Ag_5$ | A | A |
| 1-32 | $Sb_{90}C_5In_5$ | A | A |
| 1-33 | $Sb_{90}C_5Sn_5$ | A | A |
| 1-34 | $Sb_{90}C_5Te_5$ | A | A |
| 1-35 | $Sb_{90}C_5Bi_5$ | A | A |
| 1-36 | $Sb_{85}C_5Ge_5Te_5$ | A | A |
| 1-37 | $Sb_{85}C_5Ag_5In_5$ | A | A |
| 1-38 | $Sb_{90}C_5Ge_2Ag_1In_1Te_1$ | A | A |
| 1-39 | $Sb_{80}Zn_5Te_{10}Ge_5$ | A | B |
| 1-40 | $Sb_{80}Si_5Te_{10}Ge_5$ | A | B |
| 1-41 | $Sb_{75}C_{10}Te_{10}Ge_5$ | A | B |
| 1-42 | $Sb_{75}Ag_{10}Te_{10}Ge_5$ | A | C |
| 1-43 | $Sb_{75}In_{10}Te_{10}Ge_5$ | A | C |
| 1-44 | $Sb_{75}Sn_{10}Te_{10}Ge_5$ | B | C |
| 1-45 | $Sb_{75}Bi_{10}Te_{10}Ge_5$ | C | B |
| 1-46 | $Sb_{75}Zn_5Te_{15}Ge_5$ | A | C |
| 1-47 | $Sb_{75}Si_5Te_{15}Ge_5$ | A | C |
| 1-48 | $Sb_{70}C_{10}Te_{15}Ge_5$ | A | C |

These results show that sample 1-1 of which recording layer 104 is formed solely from Sb has a crystallization rate that is too high, resulting in low recording sensitivity (it requires laser of higher power to record information). Sample 1-18 and sample 1-24 having the recording layer 104 of compositions $Sb_{50}Ge_{50}$ and $Sb_{50}Ge_{25}Te_{25}$, respectively, have low crystallization rate due to the addition of too much Ge and Te, resulting in low erasability. Comparison of sample 1-41 and samples 1-42 through 1-44 show that samples that contain Sb but do not contain any of Zn, Si and C are inferior in the erasability or recording power. Samples 1-46 through 1-48 wherein the recording layer contains Sb and any of Zn, Si and C, but the total proportion thereof is less than 85 atomic % also show low erasability.

These results show the following: the samples wherein the recording layer 104 contains at least one element selected from among Zn, Si and C, and Sb in total proportion of 85 atomic % or more, specifically, Samples 1-19 through 1-23 having the recording layer 104 of composition represented by the formula (1);

Samples 1-2 through 1-6 having the recording layer 104 of composition represented by the formula (2);

Samples 1-7 through 1-11 having the recording layer 104 of composition represented by the formula (3);

Samples 1-12 through 1-17 having the recording layer 104 of composition represented by the formula (4); and Samples 1-25 through 1-41 having the recording layer 104 of composition represented by the formula (6)

all show satisfactory recording power and erasability.

However, samples 1-29, 1-39, 1-40 and 1-41 that contain M2 in a proportion of 15 atomic % show somewhat inferior erasability than samples that contain M2 in a proportion less than 15 atomic %.

In the case where the recording layer 104 having composition of $Sb_{90}C_{10}$ was formed by simultaneously sputtering an Sb sputtering target and a C sputtering target, the results were similar to those of a case where $Sb_{90}C_{10}$ layer was formed by sputtering an alloy sputtering target containing Sb and C. Also in a case where the recording layer 104 having other composition was formed by simultaneously sputtering two or more sputtering targets, the results were similar to those of a case where a single alloy sputtering target was sputtered.

When the recording layer 104 was formed by using a mixed gas wherein nitrogen and/or oxygen is added to Ar gas in a proportion of 1% by volume or lower to the entire mixed gas, the results were similar to those of case where only Ar gas was used.

Test 2

In Test 2, the information recording medium 24 shown in FIG. 3 was made, and the relations between the composition of the second recording layer 304 and the recording power and the erasability of the second information layer 25 were investigated. Specifically, samples 2-1 through 2-38 of the information recording medium 24 including the second information layers 25 with the second recording layer 304 of different compositions were made, and the recording power and the erasability of the second information layer 25 were determined.

Samples were made as follows. First, the substrate 14 made of polycarbonate (120 mm in diameter, 1.1 mm in thickness) was prepared with guide groove (20 nm in depth, 0.32 μm in track pitch) formed thereon for guiding the laser beam 11. An Ag—Pd—Cu layer (80 nm in thickness) as the second reflective layer 308, an $(In_2O_3)_{50}(ZrO_2)_{50}$ layer (25 nm in thickness) as the second dielectric material layer 306, the second recording layer 304 (10 nm in thickness), a $(Cr_2O_3)_{50}(ZrO_2)_{50}$ layer (5 nm in thickness) as the first interface layer 303, and a $(ZnS)_{80}(SiO_2)_{20}$ layer (60 nm in thickness) as the first dielectric material layer 302 were formed successively by sputtering on the polycarbonate substrate.

Provided in the film formation apparatus used for sputtering of the layers described above were an Ag—Pd—Cu alloy sputtering target for forming the second reflective layer 308, an $(In_2O_3)_{50}(ZrO_2)_{50}$ sputtering target for forming the second dielectric material layer 306, an alloy sputtering target for forming the second recording layer 304 (for example, an $Sb_{90}C_{10}$ layer was formed by using an alloy sputtering target that contains Sb and C), a $(Cr_2O_3)_{50}(ZrO_2)_{50}$ sputtering target for forming the first interface layer 303 and a $(ZnS)_{80}(SiO_2)_{20}$ sputtering target for forming the first dielectric material layer 302. All the sputtering targets had disk shape 100 mm in diameter and 6 mm in thickness.

The second reflective layer 308 was formed by supplying electrical power of 200 W from a DC power supply in an Ar gas atmosphere having a pressure of 0.2 Pa. The second dielectric material layer 306 was formed by supplying electrical power of 200 W from an RF power supply in an Ar gas atmosphere having a pressure of 0.2 Pa. The second recording layer 304 was formed by supplying electrical power of 100 W from a DC power supply in an Ar gas atmosphere having a pressure of 0.2 Pa. The first interface layer 303 was formed by supplying electrical power of 200 W from an RF power supply in an Ar gas atmosphere having a pressure of 0.2 Pa. The first dielectric material layer 302 was formed by supplying electrical power of 400 W from an RF power supply in an atmosphere of mixture of Ar having a pressure of 0.2 Pa.

Then the first dielectric material layer 302 was coated with an ultraviolet-curable resin. With the substrate having the guide groove (20 nm in depth, 0.32 μm in track pitch) formed therein being put into contact therewith, the resin layer was made uniform by rotating the substrate. Then the resin was cured and the substrate was removed. This resulted in the optical separation layer 17 having a thickness of 25 μm having the guide groove formed on the side of the first information layer 23 for guiding the laser beam 11.

Then on the optical separation layer 17, a $TiO_2$ layer (20 nm in thickness) as the transmittance adjustment layer 209, an Ag—Pd—Cu layer (10 nm in thickness) as the first reflective layer 208, a $(SiO_2)_{25}(In_2O_3)_{50}(ZrO_2)_{25}$ layer (15 nm in thickness) as the fourth dielectric material layer 206, a $Ge_{45}In_1Bi_3Te_{51}$ layer (6 nm in thickness) as the first recording layer 204, an $(SiO_2)_{25}(Cr_2O_3)_{50}(ZrO_2)_{25}$ layer (5 nm in thickness) as the third interface layer 203, and a $(ZnS)_{80}(SiO_2)_{20}$ layer (40 nm in thickness) as the third dielectric material layer 202 were formed successively by sputtering.

Provided in the film formation apparatus used for sputtering of the layers described above were a $TiO_2$ sputtering target for forming the transmittance adjustment layer 209, an Ag—Pd—Cu alloy sputtering target for forming the first reflective layer 208, a $(SiO_2)_{25}(In_2O_3)_{50}(ZrO_2)_{25}$ sputtering target for forming the fourth dielectric material layer 206, a Ge—In—Bi—Te alloy sputtering target for forming the first recording layer 204, an $(SiO_2)_{25}(Cr_2O_3)_{50}(ZrO_2)_{25}$ sputtering target for forming the third interface layer 203, and a $(ZnS)_{80}(SiO_2)_{20}$ sputtering target for forming the third dielectric material layer 202. All the sputtering targets had disk shape 100 mm in diameter and 6 mm in thickness.

The transmittance adjustment layer 209 was formed by supplying electrical power of 400 W from an RF power supply in an atmosphere of mixture of Ar and oxygen (oxygen occupied 3% by volume of the entire gas) having a pressure of 0.2 Pa. The first reflective layer 208 was formed by supplying electrical power of 100 W from a DC power supply in an Ar gas atmosphere having a pressure of 0.2 Pa. The fourth dielectric material layer 206 was formed by supplying electrical power of 200 W from an RF power supply in an Ar gas atmosphere having a pressure of 0.2 Pa. The first recording layer 204 was formed by supplying electrical power of 50 W from a DC power supply in an Ar gas atmosphere having a pressure of 0.2 Pa. The third interface layer 203 was formed by supplying electrical power of 200 W from an RF power supply in an Ar gas atmosphere having a pressure of 0.2 Pa. The third dielectric material layer 202 was formed by supplying electrical power of 400 W from an RF power supply in an Ar gas atmosphere having a pressure of 0.2 Pa.

Last, the third dielectric material layer 202 was coated with an ultraviolet-curable resin. The resin layer was made uniform by rotating the substrate 14. The resin was cured by irradiating it with ultraviolet ray, so as to form the transparent layer 13 having a thickness of 75 μm. Then initialization process was carried out in which the Second recording layer 304 and the first recording layer 204 were crystallized by means of the laser beam. In this way, a plurality of samples having the second recording layers 304 of different compositions were made.

Recording power and erasability of the second information layer 25 of the information recording medium 24 were determined by using the recording/reproduction apparatus 45 shown in FIG. 9, for each of the samples made as described above. The determinations were made with the laser beam 11 having a wavelength of 405 nm; the objective lens 41 having a numerical aperture NA of 0.85, a linear velocity of 19.7 m/second during the determination and a minimum mark length (2T) of 0.149 μm. Information was recorded in the groove.

Composition of the second recording layer 304, and the evaluation results of recording power and erasability of the second information layer 25 for each sample are shown in Table 2A and Table 2B. In the Tables, value of recording power less than 16 mW is shown as A, value not lower than 16 mW and less than 18 mW is shown as B, and value not lower than 18 mW is shown as C. The values of recording power of the second information layer 25 are two times those of Test 1, because intensity of the laser beam decreases to about one half while passing through the first information layer 23. As to the erasability, value of erase ratio not less than 25 dB is shown as A, value not lower than 20 dB and less than 25 dB is shown as B, and value less than 20 dB is shown as C.

TABLE 2A

| Sample Nos. | Composition of second recording layer 304 (atomic %) | Recording power | Erasability |
|---|---|---|---|
| 2-1 | $Sb_{100}$ | C | A |
| 2-2 | $Sb_{98}Zn_2$ | B | A |
| 2-3 | $Sb_{95}Zn_5$ | A | A |
| 2-4 | $Sb_{90}Zn_{10}$ | A | A |
| 2-5 | $Sb_{80}Zn_{20}$ | A | A |
| 2-6 | $Sb_{70}Zn_{30}$ | A | B |
| 2-7 | $Sb_{98}Si_2$ | B | A |
| 2-8 | $Sb_{95}Si_5$ | A | A |

TABLE 2A-continued

| Sample Nos. | Composition of second recording layer 304 (atomic %) | Recording power | Erasability |
|---|---|---|---|
| 2-9 | $Sb_{90}Si_{10}$ | A | A |
| 2-10 | $Sb_{80}Si_{20}$ | A | A |
| 2-11 | $Sb_{70}Si_{30}$ | A | B |
| 2-12 | $Sb_{98}C_2$ | B | A |
| 2-13 | $Sb_{95}C_5$ | A | A |
| 2-14 | $Sb_{90}C_{10}$ | A | A |
| 2-15 | $Sb_{80}C_{20}$ | A | A |
| 2-16 | $Sb_{70}C_{30}$ | A | A |
| 2-17 | $Sb_{50}C_{50}$ | A | B |
| 2-18 | $Sb_{50}Ge_{50}$ | A | C |
| 2-19 | $Sb_{90}Zn_5Si_5$ | A | A |
| 2-20 | $Sb_{90}Zn_5C_5$ | A | A |
| 2-21 | $Sb_{85}Si_5C_{10}$ | A | A |
| 2-22 | $Sb_{85}Zn_5Si_5C_5$ | A | A |
| 2-23 | $Sb_{50}Zn_5Si_5C_{40}$ | A | B |
| 2-24 | $Sb_{50}Ge_{25}Te_{25}$ | A | C |
| 2-25 | $Sb_{95}C_4Ge_1$ | A | A |
| 2-26 | $Sb_{95}C_3Ge_2$ | A | A |
| 2-27 | $Sb_{90}C_5Ge_5$ | A | A |
| 2-28 | $Sb_{85}C_5Ge_{10}$ | A | A |
| 2-29 | $Sb_{80}C_5Ge_{15}$ | A | B |
| 2-30 | $Sb_{90}C_5Ga_5$ | A | A |

TABLE 2B

| Sample Nos. | Composition of second recording layer 304 (atomic %) | Recording power | Erasability |
|---|---|---|---|
| 2-31 | $Sb_{90}C_5Ag_5$ | A | A |
| 2-32 | $Sb_{90}C_5In_5$ | A | A |
| 2-33 | $Sb_{90}C_5Sn_5$ | A | A |
| 2-34 | $Sb_{90}C_5Te_5$ | A | A |
| 2-35 | $Sb_{90}C_5Bi_5$ | A | A |
| 2-36 | $Sb_{85}C_5Ge_5Te_5$ | A | A |
| 2-37 | $Sb_{85}C_5Ag_5In_5$ | A | A |
| 2-38 | $Sb_{90}C_5Ge_2Ag_1In_1Te_1$ | A | A |
| 2-39 | $Sb_{80}Zn_5Te_{10}Ge_5$ | A | B |
| 2-40 | $Sb_{80}Si_5Te_{10}Ge_5$ | A | B |
| 2-41 | $Sb_{75}C_{10}Te_{10}Ge_5$ | A | B |
| 2-42 | $Sb_{75}Ag_{10}Te_{10}Ge_5$ | A | C |
| 2-43 | $Sb_{75}In_{10}Te_{10}Ge_5$ | A | C |
| 2-44 | $Sb_{75}Sn_{10}Te_{10}Ge_5$ | B | C |
| 2-45 | $Sb_{75}Bi_{10}Te_{10}Ge_5$ | C | B |
| 2-46 | $Sb_{75}Zn_5Te_{15}Ge_5$ | A | C |
| 2-47 | $Sb_{75}Si_5Te_{15}Ge_5$ | A | C |
| 2-48 | $Sb_{70}C_{10}Te_{15}Ge_5$ | A | C |

These results show that sample 2-1 of which second recording layer 304 is formed solely from Sb has a crystallization rate that is too high, resulting in low recording sensitivity. Sample 2-18 having the second recording layer 304 of composition $Sb_{50}Ge_{50}$ and sample 2-24 having the second recording layer 304 of composition $Sb_{50}Ge_{25}Te_{25}$ have a low crystallization rate due to the addition of too much Ge and Te, resulting in low erasability. Comparison of sample 2-41 and samples 2-42 through 2-44 show that samples wherein the second recording layer 304 contains Sb but does not contain any of Zn, Si and C are inferior in the erasability or recording sensitivity. Samples 2-46 through 2-48 wherein the second recording layer 304 contains Sb and any of Zn, Si and C, but the total proportion thereof is less than 85 atomic % also show low erasability.

These results show the following: the samples wherein the second recording layer 304 contains at least one element selected from among Zn, Si and C, and Sb in total proportion of 85 atomic % or more, specifically, Samples 2-19 through 2-23 having the second recording layer 304 of composition represented by the formula (1);

Samples 2-2 through 2-6 having the second recording layer 304 of composition represented by the formula (2);

Samples 2-7 through 2-11 having the second recording layer 304 of composition represented by the formula (3);

Samples 2-12 through 2-17 having the second recording layer 304 of composition represented by the formula (4); and Samples 2-25 through 2-41 having the second recording layer 304 of composition represented by the formula (6) all show satisfactory recording power and erasability. However, samples 2-29, 2-39, 2-40 and 2-41 that contain M2 in a proportion of 15 atomic % show somewhat inferior erasability than samples that contain M2 in a proportion less than 15 atomic %.

Test 3

In Test 3, the information recording medium 24 shown in FIG. 3 was made, and the relations between the composition of the first recording layer 204 and the recording power and the erasability of the first information layer 23 were investigated. Specifically, samples 3-1 through 3-35 of the information recording medium 24 including the first information layers 23 with the first recording layer 204 of different compositions were made, and the recording power and the erasability of the first information layer 23 were measured.

Samples were made as follows. First, the substrate 14 made of polycarbonate (120 mm in diameter, 1.1 mm in thickness) was prepared with guide groove (20 nm in depth, 0.32 μm in track pitch) formed thereon for guiding the laser beam 11. An Ag—Pd—Cu layer (80 nm in thickness) as the second reflective layer 308, a $(SiO_2)_{25}(In_2O_3)_{50}(ZrO_2)_{25}$ layer (15 nm in thickness) as the second dielectric material layer 306, a $(SiO_2)_{15}(In_2O_3)_{35}(ZrO_2)_{50}$ layer (10 nm in thickness) as the second interface layer 306 (not shown), a $Ge_{45}In_1Bi_3Te_{51}$ layer (10 nm in thickness) as the second recording layer 304, a $(Cr_2O_3)_{50}(ZrO_2)_{50}$ layer (5 nm in thickness) as the first interface layer 303 and a $(ZnS)_{80}(SiO_2)_{20}$ layer (60 nm in thickness) as the first dielectric material layer 302 were formed successively by sputtering on the polycarbonate substrate.

Provided in the film formation apparatus used for sputtering of the layers described above were an Ag—Pd—Cu alloy sputtering target for forming the second reflective layer 308, an $(SiO_2)_{25}(In_2O_3)_{50}(ZrO_2)_{25}$ sputtering target for forming the second dielectric material layer 306, a $(SiO_2)_{15}(In_2O_3)_{35}(ZrO_2)_{50}$ sputtering target for forming the second interface layer, a Ge—In—Bi—Te alloy sputtering target for forming the second recording layer 304, a $(Cr_2O_3)_{50}(ZrO_2)_{50}$ sputtering target for forming the first interface layer 303 and a $(ZnS)_{80}(SiO_2)_{20}$ sputtering target for forming the first dielectric material layer 302. All the sputtering targets had disk shape 100 mm in diameter and 6 mm in thickness.

The second reflective layer 308 was formed by supplying electrical power of 200 W from a DC power supply in an Ar gas atmosphere having a pressure of 0.2 Pa. The second dielectric material layer 306 was formed by supplying electrical power of 200 W from an RF power supply in an Ar gas atmosphere having a pressure of 0.2 Pa. The second interface layer was formed by supplying electrical power of 200 W from an RF power supply in an Ar gas atmosphere having a pressure of 0.2 Pa. The second recording layer 304 was formed by supplying electrical power of 100 W from a DC power supply in an Ar gas atmosphere having a pressure of 0.2 Pa. The first interface layer 303 was formed by supplying electrical power of 200 W from an RF power supply in an Ar gas atmosphere having a pressure of 0.2 Pa. The first dielectric material layer 302 was formed by supplying electrical power of 400 W from an RF power supply in an atmosphere of mixture of Ar having a pressure of 0.2 Pa.

The first dielectric material layer 302 was coated with an ultraviolet-curable resin. With the substrate having the guide groove (20 nm in depth, 0.32 μm in track pitch) formed thereon being put into contact thereon, the resin layer was made uniform by rotating the substrate 14. The resin was cured and the substrate was removed to obtain the optical separation layer 17 having a thickness of 25 μm with guide groove formed on the side of the first information layer 23 for guiding the laser beam 11.

Then on the optical separation layer 17, a $TiO_2$ layer (20 nm in thickness) as the transmittance adjustment layer 209, an Ag—Pd—Cu layer (10 nm in thickness) as the first reflective layer 208, a $(In_2O_3)_{50}(ZrO_2)_{50}$ layer (15 nm in thickness) as the fourth dielectric material layer 206, the first recording layer 204 (6 nm in thickness) as, an $(SiO_2)_{25}(Cr_2O_3)_{50}(ZrO_2)_{25}$ layer (5 nm in thickness) as the third interface layer 203, and a $(ZnS)_{80}(SiO_2)_{20}$ layer (40 nm in thickness) as the third dielectric material layer 202 were formed successively by sputtering.

Provided in the film formation apparatus used for sputtering of the layers described above were a $TiO_2$ sputtering target for forming the transmittance adjustment layer 209, an Ag—Pd—Cu alloy sputtering target for forming the first reflective layer 208, an $(In_2O_3)_{50}(ZrO_2)_{50}$ sputtering target for forming the fourth dielectric material layer 206, an alloy sputtering target (to form, for example, an $Sb_{90}C_{10}$ layer was formed by using an alloy sputtering target that contains Sb and C) for forming the first recording layer 204, an $(SiO_2)_{25}(Cr_2O_3)_{50}(ZrO_2)_{25}$ sputtering target for forming the third interface layer 203, and a $(ZnS)_{80}(SiO_2)_{20}$ sputtering target for forming the third dielectric material layer 202. All the sputtering targets had disk shape 100 mm in diameter and 6 mm in thickness.

The transmittance adjustment layer 209 was formed by supplying electrical power of 400 W from an RF power supply in an atmosphere of mixture of Ar and oxygen (oxygen occupied 3% by volume of the entire gas) having a pressure of 0.2 Pa. The first reflective layer 208 was formed by supplying electrical power of 100 W from a DC power supply in an Ar gas atmosphere having a pressure of 0.2 Pa. The fourth dielectric material layer 206 was formed by supplying electrical power of 200 W from an RF power supply in an Ar gas atmosphere having a pressure of 0.2 Pa. The first recording layer 204 was formed by supplying electrical power of 50 W from a DC power supply in an Ar gas atmosphere having a pressure of 0.2 Pa. The third interface layer 203 was formed by supplying electrical power of 200 W from an RF power supply in an Ar gas atmosphere having a pressure of 0.2 Pa. The third dielectric material layer 202 was formed by supplying electrical power of 400 W from an RF power supply in an Ar atmosphere having a pressure of 0.2 Pa.

Last, the third dielectric material layer 202 was coated with an ultraviolet-curable resin. The resin layer was made uniform by rotating the substrate 14. The resin was cured by irradiating it with ultraviolet ray, so as to form the transparent layer 13 having a thickness of 75 μm. Then initialization process was carried out in which the second recording layer 304 and the first recording layer 204 were crystallized by means of the laser beam. In this way, a plurality of samples having the first recording layers 204 of different compositions were made.

Recording power and erasability of the first information layer 23 of the information recording medium 24 were determined by using the recording/reproduction apparatus 45 shown in FIG. 9, for each of the samples made as described above. The determinations were made with the laser beam 11 having a wavelength of 405 nm, the objective lens 41 having a numerical aperture. NA of 0.85, a linear velocity of 19.7 m/second during the determination, and a minimum mark length (2T) of 0.149 μm. Information was recorded in the groove.

Composition of the first recording layer 204, and the evaluation results of recording power and erasability of the first information layer 23 for each sample are shown in Table 3A and Table 3B. In the Tables, value of recording power less than 16 mW is shown as A, value not lower than 16 mW and lower than 18 mW is shown as B, and value not lower than 18 mW is shown as C. The values of recording power of the first information layer 23 are two times as high as those of Test 1, because the first information layer 23 must transmit one half of the laser beam to record information on the second information layer 25. As a result, laser power that can be used in recording on the first information layer 23 is about one half of the output power of the laser. As to the erasability, value of erase ratio not less than 25 dB is shown as A, value not less than 20 dB and less than 25 dB is shown as B, and value less than 20 dB is shown as C.

TABLE 3A

| Sample Nos. | Composition of first recording layer 204 | Recording power | Erasability |
|---|---|---|---|
| 3-1 | $Sb_{98}Zn_2$ (atomic %) | B | A |
| 3-2 | $Sb_{95}Zn_5$ (atomic %) | A | A |
| 3-3 | $Sb_{90}Zn_{10}$ (atomic %) | A | A |
| 3-4 | $Sb_{80}Zn_{20}$ (atomic %) | A | B |
| 3-5 | $Sb_{98}Si_2$ (atomic %) | B | A |
| 3-6 | $Sb_{95}Si_5$ (atomic %) | A | A |
| 3-7 | $Sb_{90}Si_{10}$ (atomic %) | A | A |
| 3-8 | $Sb_{80}Si_{20}$ (atomic %) | A | B |
| 3-9 | $Sb_{98}C_2$ (atomic %) | B | A |
| 3-10 | $Sb_{95}C_5$ (atomic %) | A | A |
| 3-11 | $Sb_{90}C_{10}$ (atomic %) | A | A |
| 3-12 | $Sb_{80}C_{20}$ (atomic %) | A | A |
| 3-13 | $Sb_{70}C_{30}$ (atomic %) | A | B |
| 3-14 | $Sb_{98}(SiC)_2$ (mol %) | B | A |
| 3-15 | $Sb_{95}(SiC)_5$ (mol %) | A | A |
| 3-16 | $Sb_{90}(SiC)_{10}$ (mol %) | A | A |
| 3-17 | $Sb_{80}(SiC)_{20}$ (mol %) | A | A |
| 3-18 | $Sb_{70}(SiC)_{30}$ (mol %) | A | B |
| 3-19 | $Sb_{90}Zn_5Si_5$ (mol %) | A | A |
| 3-20 | $Sb_{90}Zn_5C_5$ (atomic %) | A | A |
| 3-21 | $Sb_{85}Si_5C_{10}$ (atomic %) | A | A |
| 3-22 | $Sb_{85}Zn_5Si_5C_5$ (atomic %) | A | A |
| 3-23 | $Sb_{95}C_4Ge_1$ (atomic %) | A | A |
| 3-24 | $Sb_{95}C_3Ge_2$ (atomic %) | A | A |
| 3-25 | $Sb_{90}C_5Ge_5$ (atomic %) | A | A |
| 3-26 | $Sb_{85}C_5Ge_{10}$ (atomic %) | A | B |
| 3-27 | $Sb_{90}C_5Ga_5$ (atomic %) | A | A |
| 3-28 | $Sb_{90}C_5Ag_5$ (atomic %) | A | A |
| 3-29 | $Sb_{90}C_5In_5$ (atomic %) | A | A |
| 3-30 | $Sb_{90}C_5Sn_5$ (atomic %) | A | A |
| 3-31 | $Sb_{90}C_5Te_5$ (atomic %) | A | A |
| 3-32 | $Sb_{90}C_5Bi_5$ (atomic %) | A | A |
| 3-33 | $Sb_{85}C_5Ge_5Te_5$ (atomic %) | A | B |
| 3-34 | $Sb_{85}C_5Ag_5In_5$ (atomic %) | A | B |
| 3-35 | $Sb_{90}C_5Ge_2Ag_1In_1Te_1$ (atomic %) | A | A |

TABLE 3B

| Sample Nos. | Composition of first recording layer 204 | Recording power | Erasability |
|---|---|---|---|
| 3-36 | $Sb_{80}Zn_5Te_{10}Ge_5$ (atomic %) | A | B |
| 3-37 | $Sb_{80}Si_5Te_{10}Ge_5$ (atomic %) | A | B |
| 3-38 | $Sb_{75}C_{10}Te_{10}Ge_5$ (atomic %) | A | B |
| 3-39 | $Sb_{75}Ag_{10}Te_{10}Ge_5$ (atomic %) | A | C |
| 3-40 | $Sb_{75}In_{10}Te_{10}Ge_5$ (atomic %) | A | C |
| 3-41 | $Sb_{75}Sn_{10}Te_{10}Ge_5$ (atomic %) | B | C |
| 3-42 | $Sb_{75}Bi_{10}Te_{10}Ge_5$ (atomic %) | C | B |

TABLE 3B-continued

| Sample Nos. | Composition of first recording layer 204 | Recording power | Erasability |
|---|---|---|---|
| 3-43 | $Sb_{75}Zn_5Te_{15}Ge_5$ (atomic %) | A | C |
| 3-44 | $Sb_{75}Si_5Te_{15}Ge_5$ (atomic %) | A | C |
| 3-45 | $Sb_{70}C_{10}Te_{15}Ge_5$ (atomic %) | A | C |

These results show the following:

the samples wherein the first recording layer 204 contains at least one element selected from among Zn, Si and C, and Sb in total proportion of 85 atomic % or more, specifically, Samples 3-19 through 3-22 having the first recording layer 204 of composition represented by the formula (1);

Samples 3-1 through 3-4 having the first recording layer 204 of composition represented by the formula (2);

Samples 3-5 through 3-8 having the first recording layer 204 of composition represented by the formula (3);

Samples 3-9 through 3-13 having the first recording layer 204 of composition represented by the formula (4);

Samples 3-14 through 3-18 having the first recording layer 204 of composition represented by the formula (5); and Samples 3-23 through 3-38 having the first recording layer 204 of composition represented by the formula (6) all show satisfactory recording power and erasability.

Comparison of sample 3-38 and samples 3-39 through 3-42 show that samples of which the first recording layer 204 contains Sb but does not contain any of Zn, Si and C are inferior in the erasability or recording sensitivity. Samples 3-43 through 3-45 where the second recording layer 204 contains Sb and any of Zn, Si and C, but the total proportion thereof is less than 85 atomic % also show low erasability.

Test 4

In Test 4, the information recording medium 30 shown in FIG. 4 was made, and the relations between the composition of the first recording layer 404 and the recording power and the erasability of the first information layer 26 were investigated. Specifically, samples 4-1 through 4-24 of the information recording medium 30 including the first information layers 26 with the first recording layer 404 of different compositions were made, and the recording power and the erasability of the first information layer 26 were determined.

Samples were made as follows. First, the substrate 14 made of polycarbonate (120 nm in diameter, 1.1 mm in thickness) was prepared with guide groove (20 nm in depth, 0.32 μm in track pitch) formed thereon for guiding the laser beam 11. An Ag—Pd—Cu layer (80 nm in thickness) as the fourth reflective layer 708, a $(SiO_2)_{25}(In_2O_3)_{50}(ZrO_2)_{25}$ layer (15 nm in thickness) as the second dielectric material layer 706, an $(SiO_2)_{15}(In_2O_3)_{35}(ZrO_2)_{50}$ layer (15 nm in thickness) as the second interface layer (not shown), a $Ge_{45}In_1Bi_3Te_{51}$ layer (10 nm in thickness) as the fourth recording layer 704, a $(Cr_2O_3)_{50}(ZrO_2)_{50}$ layer (5 nm in thickness) as the first interface layer 703 and a $(ZnS)_{80}(SiO_2)_{20}$ layer (60 nm in thickness) as the first dielectric material layer 702 were formed successively on the polycarbonate substrate by sputtering.

Provided in the film formation apparatus used for sputtering of the layers described above were an Ag—Pd—Cu alloy sputtering target for forming the fourth reflective layer 708, an $(SiO_2)_{25}(In_2O_3)_{50}(ZrO_2)_{25}$ sputtering target for forming the second dielectric material layer 706, an $(SiO_2)_{15}(In_2O_3)_{35}(ZrO_2)_{50}$ sputtering target for forming the second interface layer, a Ge—In—Bi—Te alloy sputtering target for forming the fourth recording layer 704, a $(Cr_2O_3)_{50}(ZrO_2)_{50}$ sputtering target for forming the first interface layer 703 and a $(ZnS)_{80}(SiO_2)_{20}$ sputtering target for forming the first dielectric material layer 702. All the sputtering targets had disk shape 100 mm in diameter and 6 mm in thickness.

The fourth reflective layer 708 was formed by supplying electrical power of 200 W from a DC power supply in an Ar gas atmosphere having a pressure of 0.2 Pa. The second dielectric material layer 706 was formed by supplying electrical power of 200 W from an RF power supply in an Ar gas atmosphere having a pressure of 0.2 Pa. The second interface layer was formed by supplying electrical power of 200 W from an RF power supply in an Ar gas atmosphere having a pressure of 0.2 Pa. The fourth recording layer 704 was formed by supplying electrical power of 100 W from a DC power supply in an Ar gas atmosphere having a pressure of 0.2 Pa. The first interface layer 703 was formed by supplying electrical power of 200 W from an RF power supply in an Ar gas atmosphere having a pressure of 0.2 Pa. The first dielectric material layer 702 was formed by supplying electrical power of 400 W from an RF power supply in an Ar gas atmosphere having a pressure of 0.2 Pa.

The first dielectric material layer 702 was coated with an ultraviolet-curable resin. With the substrate having the guide groove (20 nm in depth; 0.32 μm in track pitch) formed thereon being put into contact on the resin, the resin layer was made uniform by rotating the substrate 14. The resin was cured and the substrate was removed to obtain the optical separation layer 20 having a thickness of 10 μm with guide groove formed on the side of the third information layer 28 for guiding the laser beam 11.

Then on the optical separation layer 20, a $TiO_2$ layer (30 nm in thickness) as the third transmittance adjustment layer 609, an Ag—Pd—Cu layer (5 nm in thickness) as the third reflective layer 608, an $(In_2O_3)_{50}(ZrO_2)_{50}$ layer (10 nm in thickness) as the fourth dielectric material layer 606, an $Sb_{90}C_{10}$ layer (3 nm in thickness) as the third recording layer 604, an $(SiO_2)_{25}(Cr_2O_3)_{50}(ZrO_2)_{25}$ layer (5 nm in thickness) as the third interface layer 603, and a $(ZnS)_{80}(SiO_2)_{20}$ layer (45 nm in thickness) as the third dielectric material layer 602 were formed successively by sputtering.

Provided in the film formation apparatus used for sputtering of the layers described above were a $TiO_2$ sputtering target for forming the third transmittance adjustment layer 609, an Ag—Pd—Cu alloy sputtering target for forming the third reflective layer 608, an $(In_2O_3)_{50}(ZrO_2)_{50}$ sputtering target for forming the fourth dielectric material layer 606, an Sb—C alloy sputtering target for forming the third recording layer 604, an $(SiO_2)_{25}(Cr_2O_3)_{50}(ZrO_2)_{25}$ sputtering target for forming the third interface layer 603, and a $(ZnS)_{80}(SiO_2)_{20}$ sputtering target for forming the third dielectric material layer 602. All the sputtering targets had disk shape 100 mm in diameter and 6 mm in thickness.

The third transmittance adjustment layer 609 was formed by supplying electrical power of 400 W from an RF power supply in an atmosphere of mixture of Ar and oxygen (oxygen occupied 3% by volume of the entire gas) having a pressure of 0.2 Pa. The third reflective layer 608 was formed by supplying electric power of 100 W from a DC power supply in an Ar gas atmosphere having a pressure of 0.2 Pa. The fourth dielectric material layer 606 was formed by supplying electrical power of 200 W from an RF power supply in an Ar gas atmosphere having a pressure of 0.2 Pa. The third recording layer 604 was formed by supplying electrical power of 50 W from a DC power supply in an Ar gas atmosphere having a pressure of 0.2 Pa. The third interface layer 603 was formed by supplying electrical power of 200 W from an RF power supply in an Ar gas atmosphere having a pressure of 0.2 Pa. The third dielectric material layer 602 was formed by supplying electrical power of 400 W from an RF power supply in an Ar gas atmosphere having a pressure of 0.2 Pa.

Then the third dielectric material layer 602 was coated with an ultraviolet-curable resin. With the substrate having the guide groove (20 nm in depth, 0.32 μm in track pitch) formed thereon being put into contact on the resin, the resin layer was made uniform by rotating the substrate 14. After curing the resin, the substrate was removed to obtain the optical separation layer 19 having a thickness of 15 μm, with the guide groove formed on the side of the second information layer 27 for guiding the laser beam 11.

Then on the optical separation layer 19, a TiO$_2$ layer (25 nm in thickness) as the second transmittance adjustment layer 509, an Ag—Pd—Cu layer (5 nm in thickness) as the second reflective layer 508, an $(In_2O_3)_{50}(ZrO_2)_{50}$ layer (10 nm in thickness) as the sixth dielectric material layer 506, an $Sb_{90}C_{10}$ layer (3 nm in thickness) as the second recording layer 504, an $(SiO_2)_{25}(Cr_2O_3)_{50}(ZrO_2)_{25}$ layer (5 nm in thickness) as the fifth interface layer 503, and a $(ZnS)_{80}(SiO_2)_{20}$ layer (40 nm in thickness) as the fifth dielectric material layer 502 were formed successively by sputtering.

Provided in the film formation apparatus used for sputtering of the layers described above were a TiO$_2$ sputtering target for forming the second transmittance adjustment layer 509, an Ag—Pd—Cu alloy sputtering target for forming the second reflective layer 508, an $(In_2O_3)_{50}(ZrO_2)_{50}$ sputtering target for forming the sixth dielectric material layer 506, an Sb—C alloy sputtering target for forming the second recording layer 504, an $(SiO_2)_{25}(Cr_2O_3)_{50}(ZrO_2)_{25}$ sputtering target for forming the fifth interface layer 503, and a $(ZnS)_{80}(SiO_2)_{20}$ sputtering target for forming the fifth dielectric material layer 502. All the sputtering targets had disk shape 100 mm in diameter and 6 mm in thickness.

The second transmittance adjustment layer 509 was formed by supplying electrical power of 400 W from an RF power supply in an atmosphere of mixture of Ar and oxygen (oxygen occupied 3% by volume of the entire gas) having a pressure of 0.2 Pa. The second reflective layer 508 was formed by supplying electrical power of 100 W from a DC power supply in an Ar gas atmosphere having a pressure of 0.2 Pa. The sixth dielectric material layer 506 was formed by supplying electrical power of 200 W from an RF power supply in an Ar gas atmosphere having a pressure of 0.2 Pa. The second recording layer 504 was formed by supplying electrical power of 50 W from a DC power supply in an Ar gas atmosphere having a pressure of 0.2 Pa. The fifth interface layer 503 was formed by supplying electrical power of 200 W from an RF power supply in an Ar gas atmosphere having a pressure of 0.2 Pa. The fifth dielectric material layer 502 was formed by supplying electrical power of 400 W from an RF power supply in an Ar gas atmosphere having a pressure of 0.2 Pa.

Then the fifth dielectric material layer 502 was coated with an ultraviolet-curable resin. With the substrate having the guide groove (20 nm in depth, 0.32 μm in track pitch) formed thereon being put into contact on the resin, the resin layer was made uniform by rotating the substrate 14. After curing the resin, the substrate was removed to obtain the optical separation layer 17 having a thickness of 10 μm, with the guide groove formed on the side of the first information layer 26 for guiding the laser beam 11.

Then on the optical separation layer 17, a TiO$_2$ layer (20 nm in thickness) as the first transmittance adjustment layer 409, an Ag—Pd—Cu layer (5 nm in thickness) as the first reflective layer 408, an $(In_2O_3)_{50}(ZrO_2)_{50}$ layer (10 nm in thickness) as the eighth dielectric material layer 406, a first recording layer 404 (3 nm in thickness), an $(SiO_2)_{25}(Cr_2O_3)_{50}(ZrO_2)_{25}$ layer (5 nm in thickness) as the seventh interface layer 403, and a $(ZnS)_{80}(SiO_2)_{20}$ layer (35 nm in thickness) as the seventh dielectric material layer 402 were formed successively by sputtering.

Provided in the film formation apparatus used for sputtering of the layers described above were a TiO$_2$ sputtering target for forming the first transmittance adjustment layer 409, an Ag—Pd—Cu alloy sputtering target for forming the first reflective layer 408, an $(In_2O_3)_{50}(ZrO_2)_{50}$ sputtering target for forming the eighth dielectric material layer 406, an alloy sputtering target (for example, an $Sb_{90}C_{10}$ layer was formed by using an alloy sputtering target that contains Sb and C) for forming the first recording layer 404, an $(SiO_2)_{25}(Cr_2O_3)_{50}(ZrO_2)_{25}$ sputtering target for forming the seventh interface layer 403, and a $(ZnS)_{80}(SiO_2)_{20}$ sputtering target for forming the seventh dielectric material layer 402. All the sputtering targets had disk shape 100 mm in diameter and 6 mm in thickness.

The first transmittance adjustment layer 409 was formed by supplying electrical power of 400 W from an RF power supply in an atmosphere of mixture of Ar and oxygen (oxygen occupied 3% by volume of the entire gas) having a pressure of 0.2 Pa. The first reflective layer 408 was formed by supplying electrical power of 100 W from a DC power supply in an Ar gas atmosphere having a pressure of 0.2 Pa. The eighth dielectric material layer 406 was formed by supplying electrical power of 200 W from an RF power supply in an Ar gas atmosphere having a pressure of 0.2 Pa. The first recording layer 404 was formed by supplying electrical power of 50 W from a DC power supply in an Ar gas atmosphere having a pressure of 0.2 Pa. The seventh interface layer 403 was formed by supplying electrical power of 200 W from an RF power supply in an Ar gas atmosphere having a pressure of 0.2 Pa. The seventh dielectric material layer 402 was formed by supplying electrical power of 400 W from an RF power supply in an Ar atmosphere having a pressure of 0.2 Pa.

Last, the seventh dielectric material layer 402 was coated with an ultraviolet-curable resin. The resin layer was made uniform by rotating the substrate 14, and the resin was cured by irradiating it with ultraviolet ray, so as to form the transparent layer 13 having a thickness of 65 μm. Then initialization process was carried out by crystallizing the fourth recording layer 704, the third recording layer 604, the second recording layer 504 and the first recording layer 404 by means of the laser beam. In this way, a plurality of samples having the first recording layers 404 of different compositions were made.

Recording power and erasability of the first information layer 26 of the information recording medium 30 were determined by using the recording/reproduction apparatus 45 shown in FIG. 9, for each of the samples made as described above. The determinations were made with the laser beam 11 having a wavelength of 405 nm, the objective lens 41 having a numerical aperture NA of 0.85, a linear velocity of 19.7 m/second during the determination, and a minimum mark length (2T) of 0.149 μm. Information was recorded in the groove.

Composition of the first recording layer 404; and the evaluation results of recording power and erasability of the first information layer 26 for each sample are shown in Table 4. In the Tables, value of recording power less than 32 mW is shown as A, value not lower than 32 mW and lower than 36 mW is shown as B, and value not lower than 36 mW is shown as C. The values of recording power of the first information layer 26 are four times as high as those of Test 1, because the first information layer 26 must transmit about 75% of the laser beam to record information on the fourth information layer

29, the third information layer 28 and the second information layer 27. As a result, laser power that can be used n recording on the first information layer 26 is about 25% of the output power of the laser. As to the erasability, value of erase ratio not less than 25 dB is shown as A, value not less than 20 dB and less than 25 dB is shown as B, and value less than 20 dB is shown as C.

TABLE 4

| Sample Nos. | Composition of first recording layer 404 | Recording power | Erasability |
|---|---|---|---|
| 4-1 | $Sb_{98}Zn_2$ (atomic %) | A | A |
| 4-2 | $Sb_{95}Zn_5$ (atomic %) | A | A |
| 4-3 | $Sb_{90}Zn_{10}$ (atomic %) | A | B |
| 4-4 | $Sb_{98}Si_2$ (atomic %) | A | A |
| 4-5 | $Sb_{95}Si_5$ (atomic %) | A | A |
| 4-6 | $Sb_{90}Si_{10}$ (atomic %) | A | B |
| 4-7 | $Sb_{98}C_2$ (atomic %) | A | A |
| 4-8 | $Sb_{95}C_5$ (atomic %) | A | A |
| 4-9 | $Sb_{90}C_{10}$ (atomic %) | A | A |
| 4-10 | $Sb_{80}C_{20}$ (atomic %) | A | B |
| 4-11 | $Sb_{98}(SiC)_2$ (mol %) | A | A |
| 4-12 | $Sb_{95}(SiC)_5$ (mol %) | A | A |
| 4-13 | $Sb_{90}(SiC)_{10}$ (mol %) | A | A |
| 4-14 | $Sb_{80}(SiC)_{20}$ (mol %) | A | B |
| 4-15 | $Sb_{90}Zn_5Si_5$ (atomic %) | A | B |
| 4-16 | $Sb_{90}Zn_5C_5$ (atomic %) | A | B |
| 4-17 | $Sb_{85}Si_5C_{10}$ (atomic %) | A | B |
| 4-18 | $Sb_{85}Zn_5Si_5C_5$ (atomic %) | A | B |
| 4-19 | $Sb_{95}C_4Ge_1$ (atomic %) | A | B |
| 4-20 | $Sb_{95}C_3Ge_2$ (atomic %) | A | B |
| 4-21 | $Sb_{90}C_5Ag_5$ (atomic %) | A | B |
| 4-22 | $Sb_{90}C_5Te_5$ (atomic %) | A | B |
| 4-23 | $Sb_{85}C_5Ge_5Te_5$ (atomic %) | A | B |
| 4-24 | $Sb_{90}C_5Ge_2Ag_1In_1Te_1$ (atomic %) | A | B |
| 4-25 | $Sb_{80}Zn_5Te_{10}Ge_5$ (atomic %) | A | B |
| 4-26 | $Sb_{80}Si_5Te_{10}Ge_5$ (atomic %) | A | B |
| 4-27 | $Sb_{75}C_{10}Te_{10}Ge_5$ (atomic %) | A | B |
| 4-28 | $Sb_{75}Ag_{10}Te_{10}Ge_5$ (atomic %) | A | C |
| 4-29 | $Sb_{75}In_{10}Te_{10}Ge_5$ (atomic %) | A | C |
| 4-30 | $Sb_{75}Sn_{10}Te_{10}Ge_5$ (atomic %) | B | C |
| 4-31 | $Sb_{75}Bi_{10}Te_{10}Ge_5$ (atomic %) | C | B |
| 4-32 | $Sb_{75}Zn_5Te_{15}Ge_5$ (atomic %) | A | C |
| 4-33 | $Sb_{75}Si_5Te_{15}Ge_5$ (atomic %) | A | C |
| 4-34 | $Sb_{70}C_{10}Te_{15}Ge_5$ (atomic %) | A | C |

These results show the following:

the samples wherein the first recording layer 404 contains at least one element selected from among Zn, Si and C, and Sb in total proportion of 85 atomic % or more, specifically, Samples 4-15 through 4-18 having the first recording layer 404 of composition represented by the formula (1);

Samples 4-1 through 4-3 having the first recording layer 404 of composition represented by the formula (2);

Samples 4-4 through 4-6 having the first recording layer 404 of composition represented by the formula (3);

Samples 4-7 through 4-10 having the first recording layer 404 of composition represented by the formula (4);

Samples 4-11 through 4-14 having the first recording layer 404 of composition represented by the formula (5); and Samples 4-19 through 4-27 having the first recording layer 404 of composition represented by the formula (6) all show satisfactory recording power and erasability.

Comparison of sample 4-27 and samples 4-28 through 4-31 show that samples of which the first recording layer 404 contains Sb but does not contain any of Zn, Si and C are inferior in the erasability. Samples 4-32 through 4-34 wherein the first recording layer 404 contains Sb and any of Zn, Si and C, but the total proportion thereof is less than 85 atomic % also show low erasability.

Test 5

In Test 5, samples of the information recording medium 30 were fabricated in a constitution of the information recording medium 30 shown in FIG. 4 without the first information layer 26, namely a modification of the information recording medium 22 shown in FIG. 2 with N=3, and the recording power and the erasability of the fourth information layer 29, the third information layer 28 and the second information layer 27 were determined. While the three information layers are identified with the ordinal numbers of fourth through second for reasons of convenience, they may be referred to as the third, the second and the first information layers.

Samples were made as follows. First, the substrate 14 made of polycarbonate (120 mm in diameter, 1.1 mm in thickness) was prepared with guide groove (20 nm in depth, 0.32 μm in track pitch) formed thereon for guiding the laser beam 11. An Ag—Pd—Cu layer (80 nm in thickness) as the fourth reflective layer 708, an $(SiO_2)_{25}(In_2O_3)_{50}(ZrO_2)_{25}$ layer (15 nm in thickness) as the second dielectric material layer 706, an $(SiO_2)_{15}(In_2O_3)_{35}(ZrO_2)_{50}$ layer (10 nm in thickness) as the second interface layer (not shown), an $Sb_{90}C_{10}$ layer (10 nm in thickness) as the fourth recording layer 704, a $(Cr_2O_3)_{50}(ZrO_2)_{50}$ layer (5 nm in thickness) as the first interface layer 703 and a $(ZnS)_{80}(SiO_2)_{20}$ layer (60 nm in thickness) as the first dielectric material layer 702 were formed successively on the polycarbonate substrate by sputtering.

Provided in the film formation apparatus used for sputtering of the layers described above were an Ag—Pd—Cu alloy sputtering target for forming the fourth reflective layer 708, an $(Si-O_2)_{25}(In_2O_3)_{50}(ZrO_2)_{25}$ sputtering target for forming the second dielectric material layer 706, an $(SiO_2)_{15}(In_2O_3)_{35}(ZrO_2)_{50}$ sputtering target for forming the second interface layer, an Sb—C alloy sputtering target for forming the fourth recording layer 704, a $(Cr_2O_3)_{50}(ZrO_2)_{50}$ sputtering target for forming the first interface layer 703 and a $(ZnS)_{80}(SiO_2)_{20}$ sputtering target for forming the first dielectric material layer 702. All the sputtering targets had disk shape 100 mm in diameter and 6 mm in thickness.

The fourth reflective layer 708 was formed by supplying electrical power of 200 W from a DC power supply in an Ar gas atmosphere having a pressure of 0.2 Pa. The second dielectric material layer 706 was formed by supplying electrical power of 200 W from an RF power supply in an. Ar gas atmosphere having a pressure of 0.2 Pa. The second interface layer was formed by supplying electrical power of 200 W from an RF power supply in an Ar gas atmosphere having a pressure of 0.2 Pa. The fourth recording layer 704 was formed by supplying electrical power of 100 W from a DC power supply in an Ar gas atmosphere having a pressure of 0.2 Pa. The first interface layer 703 was formed by supplying electrical power of 200 W from an RF power supply in an Ar gas atmosphere having a pressure of 0.2 Pa. The first dielectric material layer 702 was formed by supplying electrical power of 400 W from an RF power supply in an Ar gas atmosphere having a pressure of 0.2 Pa.

The first dielectric material layer 702 was coated with an ultraviolet-curable resin. With the substrate having the guide groove (20 nm in depth, 0.32 μm in track pitch) formed thereon being put into contact on the resin, the resin layer was made uniform by rotating the substrate 14. The resin was cured and the substrate was removed to obtain the optical separation layer 20 having a thickness of 15 μm with guide groove formed on the side of the third information layer 28 for guiding the laser beam 11.

Then on the optical separation layer 20, a $TiO_2$ layer (30 nm in thickness) as the third transmittance adjustment layer 609, an Ag—Pd—Cu layer (5 nm in thickness) as the third reflective layer 608, an $(In_2O_3)_{50}(ZrO_2)_{50}$ layer (10 nm in thickness) as the fourth dielectric material layer 606, an $Sb_{90}C_{10}$ layer (4 nm in thickness) as the third recording layer 604, an $(SiO_2)_{25}(Cr_2O_3)_{50}(ZrO_2)_{25}$ layer (5 nm in thickness) as the third interface layer 603, and a $(ZnS)_{80}(SiO_2)_{20}$ layer (45 nm in thickness) as the third dielectric material layer 602 were formed successively by sputtering.

Provided in the film formation apparatus used for sputtering of the layers described above were a $TiO_2$ sputtering target for forming the third transmittance adjustment layer 609, an Ag—Pd—Cu alloy sputtering target for forming the third reflective layer 608, an $(In_2O_3)_{50}(ZrO_2)_{50}$ sputtering target for forming the fourth dielectric material layer 606, an Sb—C alloy sputtering target for forming the third recording layer 604, an $(SiO_2)_{25}(Cr_2O_3)_{50}(ZrO_2)_{20}$ sputtering target for forming the third interface layer 603, and a $(ZnS)_{80}(SiO_2)_{20}$ sputtering target for forming the third dielectric material layer 602. All the sputtering targets had disk shape 100 mm in diameter and 6 mm in thickness.

The third transmittance adjustment layer 609 was formed by supplying electrical power of 400 W from an RF power supply in an atmosphere of mixture of Ar and oxygen (oxygen occupied 3% by volume of the entire gas) having a pressure of 0.2 Pa. The third reflective layer 608 was formed by supplying electrical power of 100 W from a DC power supply in an Ar gas atmosphere having a pressure of 0.2 Pa. The fourth dielectric material layer 606 was formed by supplying electrical power of 200 W from an RF power supply in an Ar gas atmosphere having a pressure of 0.2 Pa. The third recording layer 604 was formed by supplying electrical power of 50 W from a DC power supply in an Ar gas atmosphere having a pressure of 0.2 Pa. The third interface layer 603 was formed by supplying electrical power of 200 W from an RF power supply in an Ar gas atmosphere having a pressure of 0.2 Pa. The third dielectric material layer 602 was formed by supplying electrical power of 400 W from an RF power supply in an Ar atmosphere having a pressure of 0.2 Pa.

Then the third dielectric material layer 602 was coated with an ultraviolet-curable resin. With the substrate having the guide groove (20 nm in depth, 0.32 μm in track pitch) formed thereon being put into contact on the resin, the resin Layer was made uniform by rotating the substrate 14. After curing the resin, the substrate was removed to obtain the optical separation layer 19 having a thickness of 20 μm, with the guide groove formed on the side of the second information layer 27 for guiding the laser beam 11.

Then on the optical separation layer 19, a $TiO_2$ layer (25 nm in thickness) as the second transmittance adjustment layer 509, an Ag—Pd—Cu layer (5 nm in thickness) as the second reflective layer 508, an $(In_2O_3)_{50}(ZrO_2)_{50}$ layer (10 nm in thickness) as the sixth dielectric material layer 506, an $Sb_{90}C_{10}$ layer (4 nm in thickness) as the second recording layer 504, an $(SiO_2)_{25}(Cr_2O_3)_{50}(ZrO_2)_{25}$ layer (5 nm in thickness) as the fifth interface layer 503, and a $(ZnS)_8O(SiO_2)_{20}$ layer (40 nm in thickness) as the fifth dielectric material layer 502 were formed successively by sputtering.

Provided in the film formation apparatus used for sputtering of the layers described above were a $TiO_2$ sputtering target for forming the second transmittance adjustment layer 509, an Ag—Pd—Cu alloy sputtering target for forming the second reflective layer 508, an $(In_2O_3)_{50}(ZrO_2)_{50}$ sputtering target for forming the sixth dielectric material layer 506, an Sb—C alloy sputtering target for forming the second recording layer 504, an $(SiO_2)_{25}(Cr_2O_3)_{50}(ZrO_2)_{25}$ sputtering target for forming the fifth interface layer 503, and a $(ZnS)_{80}(SiO_2)_{20}$ sputtering target for forming the fifth dielectric material layer 502. All the sputtering targets had disk shape 100 mm in diameter and 6 mm in thickness.

The second transmittance adjustment layer 509 was formed by supplying electrical power of 400 W from an RF power supply in an atmosphere of mixture of Ar and oxygen (oxygen occupied 3% by volume of the entire gas) having a pressure of 0.2 Pa. The second reflective layer 508 was formed by supplying electrical power of 100 W from a DC power supply in an Ar gas atmosphere having a pressure of 0.2 Pa. The sixth dielectric material layer 506 was formed by supplying electrical power of 200 W from an RF power supply in an Ar gas atmosphere having a pressure of 0.2 Pa. The second recording layer 504 was formed by supplying electrical power of 50 W from a DC power supply in an Ar gas atmosphere having a pressure of 0.2 Pa. The fifth interface layer 503 was formed by supplying electrical power of 200 W from an RF power supply in an Ar gas atmosphere having a pressure of 0.2 Pa. The fifth dielectric material layer 502 was formed by supplying electrical power of 400 W from an RF power supply in an Ar gas atmosphere having a pressure of 0.2 Pa.

Last, the fifth dielectric material layer 502 was coated with an ultraviolet-curable resin, The resin layer was made uniform by rotating the substrate 14, and the resin was cured by irradiating it with ultraviolet ray, so as to form the transparent layer 13 having a thickness of 65 μm. Then initialization process was carried out by crystallizing the fourth recording layer 704, the third recording layer 604 and the second recording layer 504 by means of the laser beam. In this way the information recording medium 30 was fabricated.

Recording power and erasability of the fourth information layer 29, the third information layer 28 and the second information layer 27 of the information recording medium 30 were determined by using the recording/reproduction apparatus 45 shown in FIG. 9, for each of the samples made as described above. The determinations were made with the laser beam 11 having a wavelength of 405 nm, the objective lens 41 having a numerical aperture NA of 0.85, a linear velocity of 19.7 m/second during the determination, and a minimum mark length (2T) of 0.149 μm. Information was recorded in the groove.

The evaluation results of recording power and erasability of each information layer are shown in Table 5. A value of recording power lower than 24 mW is shown as A, value not lower than 24 mW and lower than 27 mW is shown as B, and value not lower than 27 mW is shown as C. The values of recording power of the fourth information layer 29, the third information layer 28 and the second information layer 27 are three times as high as those of Test 1, because information must be recorded on these three information layers. As a result, laser power that can be used in recording on each information layer is about 33% of the output power of the laser. As to the erasability, value of erase ratio not less than 25 dB is shown as A, value not less than 20 dB and less than 25 dB is shown as B, and value less than 20 dB is shown as C.

TABLE 5

| Information layer | Recording power | Erasability |
| --- | --- | --- |
| Fourth information layer 29 | Satisfactory | Satisfactory |
| Third information layer 28 | Satisfactory | Satisfactory |
| Second information layer 27 | Satisfactory | Satisfactory |

These results show that both the recording power and the erasability are satisfactory in the fourth information layer 29, the third information layer 28 and the second information layer 27. Similar experiments conducted with compositions other than those described above showed that satisfactory characteristics can be obtained in both the recording sensitivity and the erasability with such a composition that contains Sb and at least one element selected from among Zn, Si and C in total proportion of 85 atomic % or more, and contains Sb in a proportion of 80 atomic % or more.

Experiments conducted with various compositions also showed that it was preferable that the fourth recording layer 704, the third recording layer 604 and the second recording layer 504 have compositions represented by the formulas (1) through (6).

Test 6

In Test 6, the information recording medium 34 shown in FIG. 5 was made and subjected to experiment similar to that of Test 1. Samples were made as follows. First, a substrate 31 made of polycarbonate (120 mm in diameter, 0.6 mm in thickness) was prepared with guide groove (40 nm in depth, 0.68 μm in track pitch) formed thereon for guiding the laser beam 11. A $(ZnS)_{80}(SiO_2)_{20}$ layer (60 nm in thickness) as the first dielectric material layer 102, a $(Cr_2O_3)_{50}(ZrO_2)_{50}$ layer (5 nm in thickness) as the first interface layer 103, the recording layer 104 (10 nm in thickness), an $(In_2O_3)_{50}(ZrO_2)_{50}$ layer (25 nm in thickness) as the second dielectric material layer 106 and an Ag—Pd—Cu layer (80 nm in thickness) as the reflective layer 108 were formed successively on the polycarbonate substrate by sputtering. The film formation apparatus, sputtering targets, film formation conditions (kind of gas, pressure and power supplied) employed in this Test were similar to those employed in Test 1.

Then a dummy substrate 33 was coated with an ultraviolet-curable resin, and the reflective layer 108 of the substrate 31 was put into contact with the dummy substrate 33. The substrate 31 and the dummy substrate 33 were rotated thereby forming a uniform resin layer (20 μm in thickness). Then the resin was cured by irradiating it with ultraviolet ray to bond the substrate 31 and the dummy substrate 33 together by means of the resin layer 32. Last, the initialization process was carried out by crystallizing the recording layer 104 over the entire surface thereof by means of the laser beam.

Recording power and erasability of the information layer 16 of the information recording medium 34 were determined by methods similar to those in Test 1, for the samples made as described above. The determinations were made with the laser beam 11 having a wavelength of 405 nm, the objective lens 41 having a numerical aperture NA of 0.65, a linear velocity of 22.4 m/second during the determination, and a minimum nark length of 0.173 μm. Information was recorded in the groove and the land.

It was found that, similarly to the case of Test 1, all samples having the recording layer 104 that contains at least one element selected from among Zn, Si and C, and Sb in total proportion of 85 atomic % or more and has a composition represented by the formula (1), (2), (3), (4) or (6) show satisfactory recording power and erasability.

Test 7

In Test 7, the information recording medium 38 shown in FIG. 7 was made and subjected to experiment similar to that of Test 2. Samples were made as follows. First, a substrate 31 made of polycarbonate (120 mm in diameter, 0.6 mm in thickness) was prepared with guide groove (40 nm in depth, 0.68 μm in track pitch) formed thereon for guiding the laser beam 11. A $(ZnS)_{80}(SiO_2)_{20}$ layer (40 nm in thickness) as the third dielectric material layer 202, an $(SiO_2)_{25}(Cr_2O_3)_{50}(ZrO_2)_{25}$ layer (5 nm in thickness) as the third interface layer 203, a $Ge_{45}In_1Bi_3Te_{51}$ layer (6 nm in thickness) as the first recording layer 204, an $(SiO_2)_{25}(In_2O_3)_{50}(ZrO_2)_{25}$ layer (10 nm in thickness) as the fourth dielectric material layer 206, an Ag—Pd—Cu layer (10 nm in thickness) as the first reflective layer 208, and a $TiO_2$ layer (20 nm in thickness) as the transmittance adjustment layer 209 were formed successively on the polycarbonate substrate by sputtering. The film formation apparatus, sputtering targets and film formation conditions (kind of gas, pressure and power supplied) employed in this Test were similar to those employed when forming the first information layer 23 in Test 2.

A substrate 36 made of polycarbonate (120 mm in diameter, 0.58 mm in thickness) was prepared with guide groove (40 nm in depth, 0.68 μm in track pitch) formed thereon for guiding the laser beam 11. An Ag—Pd—Cu layer (80 nm in thickness) as the second reflective layer 308, an $(In_2O_3)_{50}(ZrO_2)_{50}$ layer (25 nm in thickness) as the second dielectric material layer 306, the second recording layer 304 (10 nm in thickness), a $(Cr_2O_3)_{50}(ZrO_2)_{50}$ layer (5 nm in thickness) as the first interface layer 303 and a $(ZnS)_{80}(SiO_2)_{20}$ layer (60 nm in thickness) as the first dielectric material layer 302 were formed successively on the polycarbonate substrate by sputtering. The film formation apparatus, sputtering targets, film formation conditions (kind of gas, pressure and power supplied) employed in this Test were similar to those employed when forming the second information layer 25 in Test 2.

Then the first dielectric material layer 302 of the substrate 36 was coated with an ultraviolet-curable resin, and the transmittance adjustment layer 209 of the substrate 31 was put into contact with the substrate 36. The substrate 31 and the substrate 36 were rotated thereby forming a uniform resin layer (20 μm in thickness). Then the resin was cured by irradiating it with ultraviolet ray to bond the substrate 31 and the substrate 36 together by means of the resin layer 35. Last, the initialization process was carried out by crystallizing the second recording layer 304 and the first recording layer 204 over the entire surface thereof by means of the laser beam.

Recording power and erasability of the second information layer 25 of the information recording medium 38 were determined by methods similar to those of Test 2, for the samples made as described above. The determinations were made with the laser beam 11 having a wavelength of 405 nm, the objective lens 41 having a numerical aperture NA of 0.65, a linear velocity of 22.4 m/second during the determination, and a minimum mark length of 0.173 μm. Information was recorded in the groove and the land.

The evaluations of recording power and erasability were made while varying the composition of the second recording layer 304 similarly to Test 2. AS a result, it was found that all samples having the second recording layer 304 that contains at least one element selected from among Zn, Si and C, and Sb in total proportion of 85 atomic % or more and has a composition represented by the formula (1), (2), (3), (4) or (6) show satisfactory recording power and erasabily.

Test 8

In Test 8, the information recording medium 38 shown in FIG. 7 was made and subjected to experiment similar to that of Test 3.

Samples were made as follows. First, a substrate 31 made of polycarbonate (120 mm diameter, 0.6 mm in thickness) was prepared with guide groove (40 nm in depth, 0.68 μm in track pitch) formed thereon for guiding the laser beam 11. A $(ZnS)_{50}(SiO_2)_{20}$ layer (40 nm in thickness) as the third dielectric material layer 202, an $(SiO_2)_{25}(Cr_2O_3)_{50}(ZrO_2)_{25}$ layer (5 nm in thickness) as the third interface layer 203, the first recording layer 204 (6 nm in thickness), an $(In_2O_3)_{50}(ZrO_2)_{50}$ layer (15 nm in thickness) as the fourth dielectric material layer 206, an Ag—Pd—Cu layer (10 nm in thickness) as the first reflective layer 208, and a TiO$_2$ layer (20 nm in thickness) as the transmittance adjustment layer 209 were formed successively on the polycarbonate substrate by sputtering. The film formation apparatus, sputtering targets and film formation conditions (kind of gas, pressure and power supplied) employed in this Test were similar to those employed when forming the first information layer 23 in Test 3.

A substrate 36 made of polycarbonate (120 mm in diameter, 0.58 mm in thickness) was prepared with guide groove (40 nm in depth, 0.68 µm in track pitch) formed thereon for guiding the laser beam 11. An Ag—Pd—Cu layer (80 nm in thickness) as the second reflective layer 308, an $(SiO_2)_{25}(In_2O_3)_{50}(ZrO_2)_{25}$ layer (15 nm in thickness) as the second dielectric material layer 306, an $(SiO_2)_{15}(In_2O_3)_{35}(ZrO_2)_{50}$ layer (10 nm in thickness) as the second interface layer (not shown), Ge$_{45}$In$_1$Bi$_3$Te$_{51}$ layer (10 nm in thickness) as the second recording layer 304, a $(Cr_2O_3)_{50}(ZrO_2)_{50}$ layer (5 nm in thickness) as the first interface layer 303 and a $(ZnS(SiO_2)_{20}$ layer (60 nm in thickness) as the first dielectric material layer 302 were formed successively on the polycarbonate substrate by sputtering. The film formation apparatus, sputtering targets, film formation conditions (kind of gas, pressure and power supplied) employed in this Test were similar to those employed when forming the second information layer 25 in Test 3.

Then the first dielectric material layer 302 of the substrate 36 was coated with an ultraviolet-curable resin, and the transmittance adjustment layer 209 of the substrate 31 was put into contact with the substrate 36. The substrate 31 and the substrate 36 were rotated thereby forming a uniform resin layer (20 µm in thickness). Then the resin was cured by irradiating it with ultraviolet ray to bond the substrate 31 and the substrate 36 together by means of the resin layer 35. Last, the initialization process was carried out by crystallizing the second recording layer 304 and the first recording layer 204 over the entire surface thereof by means of the laser beam.

Recording power and erasability of the first information layer 23 of the information recording medium 38 were determined by methods similar to those in Test 3, for the samples made as described above. The determinations were made with the laser beam 11 having a wavelength of 405 nm, the objective lens 41 having a numerical aperture NA of 0.65, a linear velocity of 22.4 m/second during the determination, and a minimum mark length of 0.173 µm. Information was recorded in the groove and the land.

The recording power and erasability were evaluated while varying the composition of the first recording layer 204 similarly to Test 3. As a result, it was found that samples having the first recording layer 204 that contains at least one element selected from among Zn, Si and C, and Sb in total proportion of 85 atomic % or more and has a composition represented by any of the formulas (1) through (6) show satisfactory recording power and erasability.

Test 9

In Test 9, the information recording medium 39 shown in FIG. 8 was made, and experiment similar to that of Test 4 was conducted.

Samples were made as follows. First, the substrate 31 made of polycarbonate (120 nm in diameter, 0.6 mm in thickness) was prepared with guide groove (40 nm in depth, 0.68 µm in track pitch) formed thereon for guiding the laser beam 11. A $(ZnS)_{80}(SiO_2)_{20}$ layer (35 nm in thickness) as the seventh dielectric material layer 402, an $(SiO_2)_{25}(Cr_2O_3)_{50}(ZrO_2)_{25}$ layer (5 nm in thickness) as the seventh interface layer 403, the first recording layer 404 (6 nm in thickness), an $(In_2O_3)_{50}(ZrO_2)_{50}$ layer (10 nm in thickness) as the eighth dielectric material layer 406, an Ag—Pd—Cu layer (5 nm in thickness) as the first reflective layer 408, and a TiO$_2$ layer (20 nm in thickness) as the first transmittance adjustment layer 409 were formed successively by sputtering on the polycarbonate substrate. The film formation apparatus, sputtering targets, film formation conditions (kind of gas, pressure and power supplied) employed in this Test were similar to those employed when forming the first information layer 26 in Test 4.

The first transmittance adjustment layer 409 was coated with an ultraviolet-curable resin. With the substrate having the guide groove (40 nm in depth, 0.68 µm in track pitch) formed thereon being put into contact on the resin, the resin layer was made uniform by rotating the substrate 31. The resin was cured and the substrate was removed to obtain the optical separation layer 17 having a thickness of 10 µm with guide groove formed on the side of the second information layer 27 for guiding the laser beam 11.

Then on the optical separation layer 17, a $(ZnS)_{80}(SiO_2)_{20}$ layer (40 nm in thickness) as the fifth dielectric material layer 502, an $(SiO_2)_{25}(Cr_2O_3)_{50}(ZrO_2)_{25}$ layer (5 nm in thickness) as the fifth interface layer 503, an Sb$_{90}$C$_{10}$ layer (3 nm in thickness) as the second recording layer 504, an $(In_2O_3)_{50}(ZrO_2)_{50}$ layer (10 nm in thickness) as the sixth dielectric material layer 506, an Ag—Pd—Cu layer (5 nm in thickness) as the second reflective layer 508, and a TiO$_2$ layer (25 nm in thickness) as the second transmittance adjustment layer 509 were formed successively by sputtering. The film formation apparatus, sputtering targets, film formation conditions (kind of gas, pressure and power supplied) employed in this Test were similar to those employed when forming the second information layer 27 in Test 4.

The substrate 36 made of polycarbonate (120 mm in diameter, 0.58 mm in thickness) was prepared with guide groove (40 nm in depth, 0.68 µm in track pitch) formed thereon for guiding the laser beam 11. An Ag—Pd—Cu layer (80 nm in thickness) as the fourth reflective layer 708, an $(SiO_2)_{25}(In_2O_3)_{50}(ZrO_2)_{25}$ layer (15 nm in thickness) as the second dielectric material layer 706, an $(SiO_2)_{15}(In_2O_3)_{35}(ZrO_2)_{50}$ layer (10 nm in thickness) as the second interface layer (not shown), a Ge$_{45}$In$_1$Bi$_3$Te$_{51}$ layer (10 nm in thickness) as the fourth recording layer 704, a $(Cr_2O_3)_{50}$ layer (5 nm in thickness) as the first interface layer 703 and a $(ZnS)_{80}(SiO_2)_{20}$ layer (60 nm in thickness) as the first dielectric material layer 702 were formed successively on the polycarbonate substrate by sputtering. The film formation apparatus, sputtering targets, film formation conditions (kind of gas, pressure and power supplied) employed this Test were similar to those employed when forming the fourth information layer 29 in Test 4.

The first dielectric material layer 702 was coated with an ultraviolet-curable resin. With the substrate having the guide groove (40 nm in depth, 0.68 µm in track pitch) formed thereon being put into contact on the resin, the resin layer was made uniform by rotating the substrate 36. The resin was cured and the substrate was removed to obtain the optical separation layer 20 having a thickness of 10 µm with guide groove formed on the side of the third information layer 28 for guiding the laser beam 11.

Then on the optical separation layer 20, a TiO$_2$ layer (30 nm in thickness) as the third transmittance adjustment layer 609, an Ag—Pd—Cu layer (5 nm in thickness) as the third reflective layer 608, an $(In_2O_3)_{50}(ZrO_2)_{50}$ layer (10 nm in thickness) as the fourth dielectric material layer 606, an Sb$_{90}$C$_{10}$ layer (3 nm in thickness) as the third recording layer 604, an $(SiO_2)_{25}(Cr_2O_3)_{50}(ZrO_2)_{25}$ layer (5 nm in thickness) as the third interface layer 603, and a $(ZnS)_{80}(SiO_2)_{20}$ layer (45 nm in thickness) as the third dielectric material layer 602 were formed successively by sputtering. The film formation apparatus, sputtering targets, film formation conditions (kind of gas, pressure and power supplied) were similar to those employed when forming the third information layer 28 in Test 4.

Then the third dielectric material layer 602 of the substrate 36 was coated with an ultraviolet-curable resin, and the second transmittance adjustment layer 509 of the substrate 31 was put into contact with the substrate 36. The substrate 31 and the substrate 36 were rotated thereby forming a uniform resin layer (15 μm in thickness). Then the resin was cured by irradiating with ultraviolet ray to bond the substrate 31 and the substrate 36 together by means of the resin layer 35. Last, the initialization process was carried out by crystallizing the fourth recording layer 704, the third recording layer 604, the second recording layer 504 and the first recording layer 404 over the entire surface thereof by means of the laser beam.

Recording power and erasability of the first information layer 26 of the information recording medium 39 were determined by methods similar to those of Test 4 for each of the samples made as described above. The determinations were made with the laser beam 11 having a wavelength of 405 nm, the objective lens 41 having a numerical aperture NA of 0.65, a linear velocity of 22.4 m/second during the determination, and a minimum mark length of 0.173 μm, Information was recorded in the groove and the land.

Recording power and erasability were evaluated while varying the composition of the first recording layer 404 similarly to Test 4. As a result, it was found that samples having the first recording layer 404 that contains at least one element selected from among Zn, Si and C, and Sb in total proportion of 85 atomic % or more and has a composition represented by any of the formulas (1) through (6) show satisfactory recording power and erasability.

Test 10

In Test 10, samples of the information recording medium 37 were fabricated in a constitution of the information recording medium 39 shown in FIG. 8 without the first information layer 26, namely a modification of the information recording medium 37 shown in FIG. 6 with N=3, and experiment was conducted similarly to Test 5.

Samples were made as follows. First, the substrate 31 made of polycarbonate (120 mm in diameter, 0.6 mm in thickness) was prepared with guide groove (40 nm in depth, 0.68 μm in track pitch) formed thereon for guiding the laser beam 11. A $(ZnS)_{80}(SiO_2)_{20}$ layer (40 nm in thickness) as the fifth dielectric material layer 502, an $(SiO_2)_{25}(Cr_2O_3)_{50}(ZrO_2)_{25}$ layer (5 nm in thickness) as the fifth interface layer 503, an $Sb_{90}C_{10}$ layer (4 nm in thickness) as the second recording layer 504, an $(In_2O_3)_{50}(ZrO_2)_{50}$ layer (10 nm in thickness) as the sixth dielectric material layer 506, an Ag—Pd—Cu layer (5 nm in thickness) as the second reflective layer 508, and a $TiO_2$ layer (25 nm in thickness) as the second transmittance adjustment layer 509 were formed successively on the polycarbonate substrate by sputtering. The film formation apparatus, sputtering targets, film formation conditions (kind of gas, pressure and power supplied) employed in this Test were similar to those employed when forming the second information layer 27 in Test 5.

The substrate 36 made of polycarbonate (120 mm in diameter, 0.58 mm in thickness) was prepared with guide groove (40 nm in depth, 0.68 μm in track pitch) formed thereon for guiding the laser beam 11. An Ag—Pd—Cu layer (80 nm in thickness) as the fourth reflective layer 708, an $(SiO_2)_{25}(In_2O_3)_{50}(ZrO_2)_{25}$ layer (15 nm in thickness) as the second dielectric material layer 706, an $(SiO_2)_{15}(In_2O_3)_{35}(ZrO_2)_{50}$ layer (10 nm in thickness) as the second interface layer (not shown), an $Sb_{90}C_{10}$ layer (10 nm in thickness) as the fourth recording layer 704, a $(Cr_2O_3)_{50}(ZrO_2)_{50}$ layer (5 nm in thickness) as the first interface layer 703 and a $(ZnS)_{80}(SiO_2)_{20}$ layer (60 nm in thickness) as the first dielectric material layer 702 were formed successively on the polycarbonate substrate by sputtering. The film formation apparatus, sputtering targets, film formation conditions (kind of gas, pressure and power supplied) employed in this Test were similar to those employed when forming the fourth information layer 29 in Test 5.

The first dielectric material layer 702 was coated with an ultraviolet-curable resin. With the substrate having the guide groove (40 nm in depth, 0.68 μm in track pitch) formed thereon being put into contact on the resin, the resin layer was made uniform by rotating the substrate 36. The resin was cured and the substrate was removed to obtain the optical separation layer 20 having a thickness of 20 μm with guide groove formed on the side of the third information layer 28 for guiding the laser beam 11.

Then on the separation layer 20, a $TiO_2$ layer (30 nm in thickness) as the third transmittance adjustment layer 609, an Ag—Pd—Cu layer (5 nm in thickness) as the third reflective layer 608, an $(In_2O_3)_{50}(ZrO_2)_{50}$ layer (10 nm in thickness) as the fourth dielectric material layer 606, an $Sb_{90}C_{10}$ layer (4 nm in thickness) as the third recording layer 604, an $(SiO_2)_{25}(Cr_2O_3)_{50}(ZrO_2)_{25}$ layer (5 nm in thickness) as the third interface layer 603, and a $(ZnS)_{80}(SiO_2)_{20}$ layer (45 nm in thickness) as the third dielectric material layer 602 were formed successively by sputtering. The film formation apparatus, sputtering targets, film formation conditions (kind of gas, pressure and power supplied) employed in this Test were similar to those employed when forming the third information layer 28 in Test 5.

Then the third dielectric material layer 602 of the substrate 36 was coated with an ultraviolet-curable resin, and the second transmittance adjustment layer 509 of the substrate 31 was put into contact with the substrate 36. The substrate 31 and the substrate 36 were rotated thereby forming a uniform resin layer (15 μm in thickness). Then the resin was cured by irradiating it with ultraviolet ray to bond the substrate 31 and the substrate 36 together by means of the resin layer 35. Then initialization process was carried out by crystallizing the fourth recording layer 704, the third recording layer 604 and the second recording layer 504 over the entire surface thereof by means of the laser beam.

Recording power and erasability of the fourth information layer 29, the third information layer 28 and the second information layer 27 of the information recording medium 39 were determined by methods similar to those in Test 5 for the samples made as described above. The determinations were made with the laser beam 11 having a wavelength of 405 nm, the objective lens 41 having a numerical aperture NA of 0.65, a linear velocity of 22.4 m/second during the determination, and a minimum mark length of 0.173 μm. Information was recorded in the groove and the land.

It was found that, similarly to the case of Test 5, samples having the fourth recording layer 704, the third recording layer 604 and the second recording layer 504 that contain at least one element selected from among Zn, Si and C, and Sb in total proportion of 85 atomic % or more, and also that have a composition represented by the formula (4) and containing Sb in the proportion of 80 atomic % or more show satisfactory recording power and erasability of the fourth information layer 29, the third information layer 28 and the second information layer 27.

Test 11

In Test 1 through. Test 10, the recording layer 104, the first recording layer 204, the second recording layer 304, the first recording layer 404, the second recording layer 504, the third recording layer 604 or the fourth recording layer 704 was formed so as to include, in addition to Sb, M1 and M2, other element which is at least one element selected from among B, Mg, Al, S, Ca, Sc, Ti, V, Cr, Mn, Fe, Co, Ni, Cu, Sr, Y, Zr, Nb, Mo, Ru, Rh, Pd, Hf, Ta, W, Ir, Pt, Au, La, Ce, Pr, Nd, Sm, Eu, Gd, Tb, Dy, Ho, Er, Tm, Yb and Lu. The proportion of the other element was in a range of from 1 to 5 atomic % of the whole.

Information recording media including such recording layers were evaluated similarly to Tests 1 through 10, all producing similar results to those of Tests 1 through 10. Better recording sensitivity was obtained particularly when a material containing Ti, Cr, Mn, Zr or Hf was used.

Test 12

In Test 12, the information recording medium 15 shown in FIG. 1 was fabricated wherein the recording layer 104 was formed in a form of recording section constituted by stacking two or more layers, and a relationship between a stack structure of the recording layer 104 and the recording power and the erasability of the information layer 16 were investigated. In this Test, samples 6-1 through 6-23 were fabricated with different compositions and/or structures of the recording section.

Layers other than the recording layer 104 were formed by methods similar to those of forming the layers in Test 1. The recording section of stacked structure constituting the recording layer 104 was formed by successively sputtering two or more kinds of alloy sputtering targets in accordance to the kinds of layers to be formed. The sputtering targets all are disk-shaped with 100 mm in diameter and 6 mm in thickness. All the layers constituting the recording layer 104 were formed by supplying electrical power of 50 W from DC power supply in an Ar gas atmosphere having a pressure of 0.2 Pa.

The structure of the recording section that constitutes the recording layer 104 of the information layer 16 of the information recording medium 15, and the evaluation results of the recording power and the erasability of the information layer 16 are shown in Table 6. The recording layer 104 was formed by staking the layers successively in such a constitution as the layer having the composition shown on the left would be located on the side of the first interface layer 103 and the layer having the composition shown on the right would be located on the side of the second dielectric material layer 106. Value of recording power less than 8 mW is shown as A, value not lower than 8 mW and lower than 9 mW is shown as B, and value not lower than 9 mW is shown as C. As to the erasability, value of erase ratio not less than 25 dB is shown as A, value not less than 20 dB and less than 25 dB is shown as B, and value less than 20 dB is shown as C.

TABLE 6

| Sample Nos. | Composition (atomic %) and thickness of each layer constituting recording layer 104 | Recording power | Erasability |
| --- | --- | --- | --- |
| 6-1 | Sb/Zn/Sb<br>4 nm 2 nm 4 nm | A | A |
| 6-2 | Sb/Si/Sb<br>4 nm 2 nm 4 nm | A | A |
| 6-3 | Sb/C/Sb<br>4 nm 2 nm 4 nm | A | A |
| 6-4 | Sb/Si$_{50}$C$_{50}$/Sb<br>4 nm 2 nm 4 nm | A | A |

TABLE 6-continued

| Sample Nos. | Composition (atomic %) and thickness of each layer constituting recording layer 104 | Recording power | Erasability |
| --- | --- | --- | --- |
| 6-5 | Sb$_{80}$C$_{20}$/Sb$_{80}$Si$_{20}$/Sb$_{80}$C$_{20}$<br>4 nm 2 nm 4 nm | A | A |
| 6-6 | Sb$_{80}$C$_{20}$/Ge/ Sb$_{80}$C$_{20}$<br>4.5 nm 1 nm 4.5 nm | A | A |
| 6-7 | Sb$_{80}$C$_{20}$/Sb$_{85}$Ge$_{15}$/Sb$_{80}$C$_{20}$<br>4 nm 2 nm 4 nm | A | A |
| 6-8 | Sb$_{80}$C$_{20}$/Si$_{90}$Ge$_{10}$/Sb$_{80}$C$_{20}$<br>4 nm 2 nm 4 nm | A | A |
| 6-9 | Sb$_{80}$C$_{20}$/Sb$_{95}$Ag$_{5}$/Sb$_{80}$C$_{20}$<br>4 nm 2 nm 4 nm | A | A |
| 6-10 | Sb$_{80}$C$_{20}$/Sb$_{90}$C$_{5}$Ge$_{5}$/Sb$_{80}$C$_{20}$<br>4 nm 2 nm 4 nm | A | A |
| 6-11 | Sb$_{80}$C$_{20}$/Sb/Sb$_{80}$C$_{20}$<br>4 nm 2 nm 4 nm | A | A |
| 6-12 | Sb$_{80}$C$_{20}$/Sb/Sb$_{80}$C$_{20}$/Sb/Sb$_{80}$C$_{20}$<br>2 nm 2 nm 2 nm 2 nm 2 nm | A | A |
| 6-13 | Sb/Sb$_{80}$C$_{20}$/Sb/Sb$_{80}$C$_{20}$/Sb<br>2 nm 2 nm 2 nm 2 nm 2 nm | A | A |
| 6-14 | Sb$_{90}$C$_{10}$/Sb$_{78}$Te$_{17}$Ge$_{5}$<br>1 nm 9 nm | A | A |
| 6-15 | Sb$_{70}$Te$_{21}$Ge$_{9}$/Sb$_{90}$C$_{10}$<br>8 nm 2 nm | A | A |
| 6-16 | Sb$_{90}$C$_{10}$/Sb$_{78}$Te$_{17}$Ge$_{5}$/Sb$_{90}$C$_{10}$<br>0.5 nm 9 nm 0.5 nm | A | A |
| 6-17 | Sb$_{70}$C$_{30}$/Sb$_{85}$Ge$_{15}$<br>2 nm 8 nm | A | A |
| 6-18 | Sb$_{70}$C$_{30}$/Sb$_{85}$Ga$_{15}$/Sb$_{70}$C$_{30}$<br>1 nm 8 nm 1 mm | A | A |
| 6-19 | Sb$_{50}$C$_{50}$/Sb$_{80}$In$_{20}$<br>3 nm 7 nm | A | A |
| 6-20 | Sb$_{50}$C$_{50}$/Sb$_{78}$Te$_{17}$Ag$_{2}$In$_{3}$/Sb$_{50}$C$_{50}$<br>1.5 nm 7 nm 1.5 m | A | A |
| 6-21 | Sb$_{50}$C$_{50}$/Sb$_{78}$Te$_{17}$Ge$_{5}$<br>1 nm 9 nm | A | A |
| 6-22 | Sb$_{90}$C$_{10}$/(GeTe)$_{10}$(Sb$_{0.85}$Ge$_{0.15}$)$_{90}$<br>1 nm 9 nm | A | A |
| 6-23 | Sb$_{90}$C$_{10}$/(Sb$_{0.85}$Ge$_{0.15}$)$_{90}$Te$_{10}$<br>1 nm 9 nm | A | A |

It was found that both the recording power and the erasability were satisfactory in samples 6-1 through 6-23 wherein the recording layer 104 was formed as the recording section constituted by stacking two or more layers selected from among a layer containing Sb, a layer containing M1 (M1 represents at least one element selected from among Zn, Si and C), a layer containing M2 (M2 represents at least one element selected from among Ga, Ge, Ag, In, Sn, Te and Bi), a layer containing Sb-M1, a layer containing Sb-M2, a layer containing M1-M2 and a layer containing Sb-M1-M2. Among these, samples 6-14 through 6-23 wherein the layer containing Sb-M1 contained C in a proportion not higher than 50 atomic % and the layer containing Sb-M2 contained at least one element selected from among Ge and Te in a proportion not higher than 30 atomic %, in particular, showed better erasability than the other samples.

Layers constituting the recording section were formed so as to have compositions containing, in addition to Sb, M1 and M2, other element, which is at least one element selected from among B, Mg, Al, S, Ca, Sc, Ti, V, Cr, Mn, Fe, Co, Ni, Cu, Sr, Y, Zr, Nb, Mo, Ru, Rh, Pd, Hf, Ta, N, Ir, Pt, Au, La, Ce, Pr, Nd, Sm, Eu, Gd, Tb, Dy, Ho, Er, Tm, Yb and Lu. The proportion of the other element was in a range of from 1 to 5 atomic % of the whole. Information recording media containing such recording layers were evaluated similarly. Similar results were obtained.

Test 13

In Test 13, the information recording medium 24 shown in FIG. 3 was fabricated wherein the first recording layer 204 was formed in the form of recording section constituted by stacking two or more layers, and the relationship between the stacking structure of the first recording layer 204 and the recording power and the erasability of the first information layer 23 were investigated. In this Test, samples 7-1 through 7-20 were fabricated with different compositions and/or structures of the recording section.

Layers other than the first recording layer 204 were formed by methods similar to those for forming the layers in Test 3. The recording section of stacked structure constituting the first recording layer 204 was formed by successively sputtering two or more kinds of alloy Sputtering targets in accordance to the kinds of layers to be formed. The sputtering targets all had disk shape measuring 100 mm in diameter and 6 mm in thickness. All the layers constituting the first recording layer 204 were formed by supplying electrical power of 50 W from DC power supply in an Ar gas atmosphere having a pressure of 0.2 Pa.

The structure of the recording section that constitutes the first recording layer 204 of the first information layer 23 of the information recording medium 24, and the evaluation results of the recording power and the erasability of the first information layer 23 are shown in Table 7. The first recording layer 204 was formed by stacking layers successively in such a constitution as the layer having the composition shown on the left would be located on the side of the third interface layer 203 and the layer having the composition shown on the right would be located on the side of the fourth dielectric material layer 206. Value of recording power less than 16 mW is shown as A, value not lower than 16 mW and lower than 18 mW is shown as B, and value not Lower than 18 mW is shown as C. As to the erasability, value of erase ratio not less than 25 dB is shown as A, value not less than 20 dB and less than 25 dB is shown as B, and value less than 20 dB is shown as C.

TABLE 7

| Sample Nos. | Composition (atomic %) and thickness of each layer constituting first recording layer 204 | Recording power | Erasability |
|---|---|---|---|
| 7-1 | Sb/Zn/Sb<br>2.5 nm 1 nm 2.5 nm | A | A |
| 7-2 | Sb/Si/Sb<br>2.5 nm 1 nm 2.5 nm | A | A |
| 7-3 | Sb/C/Sb<br>2.5 nm 1 nm 2.5 nm | A | A |
| 7-4 | Sb/$Si_{50}C_{50}$/Sb<br>2 nm 2 nm 2 nm | A | A |
| 7-5 | $Sb_{90}C_{10}$/$Sb_{90}Si_{10}$/$Sb_{90}C_{10}$<br>2 nm 2 nm 2 nm | A | A |
| 7-6 | $Sb_{90}C_{10}$/Ge/$Sb_{90}C_{10}$<br>2.8 nm 0.4 nm 2.8 nm | A | A |
| 7-7 | $Sb_{90}C_{10}$/$Sb_{95}Ge_5$/$Sb_{90}C_{10}$<br>2 nm 2 nm 2 nm | A | A |
| 7-8 | $Sb_{90}C_{10}$/$Si_{90}Ge_{10}$/$Sb_{90}C_{10}$<br>2.5 nm 1 nm 2.5 nm | A | A |
| 7-9 | $Sb_{90}C_{10}$/$Sb_{95}Ag_5$/$Sb_{90}C_{10}$<br>2 nm 2 nm 2 nm | A | A |
| 7-10 | $Sb_{90}C_{10}$/$Sb_{90}C_5Ge_5$/$Sb_{90}C_{10}$<br>2 nm 2 nm 2 nm | A | A |
| 7-11 | $Sb_{90}C_{10}$/Sb/$Sb_{90}C_{10}$<br>2 nm 2 nm 2 nm | A | A |
| 7-12 | $Sb_{90}C_{10}$/Sb/$Sb_{90}C_{10}$/Sb/$Sb_{90}C_{10}$<br>1 nm 1 nm 2 nm 1 nm 1 nm | A | A |
| 7-13 | Sb/$Sb_{90}C_{10}$/Sb/$Sb_{90}C_{10}$/Sb<br>1 nm 1 nm 2 nm 1 nm 1 nm | A | A |
| 7-14 | $Sb_{90}C_{10}$/$Sb_{50}Te_{50}$<br>5 nm 1 nm | A | A |
| 7-15 | $Ge_{45}Sb_4Te_{51}$/$Sb_{90}C_{10}$<br>2 nm 4 nm | A | A |
| 7-16 | $Sb_{90}C_{10}$/$Ge_{45}Bi_4Te_{51}$/$Sb_{90}C_{10}$<br>1 nm 4 nm 1 nm | A | A |
| 7-17 | $Sb_{70}C_{30}$/$Ge_{41}Sn_4Sb_4Te_{51}$<br>1 nm 5 nm | A | A |
| 7-18 | $Sb_{70}C_{30}$/$Ge_{45}Bi_3In_1Te_{51}$/$Sb_{70}C_{30}$<br>1 nm 4 nm 1 nm | A | A |
| 7-19 | $Sb_{50}C_{50}$/$Ge_{25}Sn_{25}Te_{50}$<br>1 nm 5 nm | A | A |
| 7-20 | $Sb_{50}C_{50}$/$Ge_{40}Sn_5Bi_3In_1Te_{51}$<br>1 nm 5 nm | A | A |

It was found that both the recording power and the erasability were satisfactory in samples 7-1 through 7-20 wherein the first recording layer 204 was formed as the recording section constituted by stacking two or more layers selected from among a Layer containing Sb, a layer containing M1 (M1 represents at least one element selected from among Zn, Si and C), a layer containing M2 (M2 represents at least one element selected from among Ga, Ge, Ag, In, Sn, Te and Bi), a layer containing Sb-M1, a layer containing Sb-M2, a layer containing M1-M2 and a layer containing Sb-M1-M2. Among these, samples 7-14 through 7-20 wherein the layer containing Sb-M1 contained C in a proportion not higher than 50 atomic % and the layer containing M2 contained Te in a proportion of 40 atomic % or more, in particular, showed higher signal intensity than the other samples.

Test 14

In Test 14, the information recording medium 30 shown in FIG. 4 was fabricated wherein the first recording layer 404 was formed in the form of recording section constituted by stacking two or more layers, and the relationship between the stacking structure of the first recording layer 404 and the recording power and the erasability of the first information layer 26 were investigated. In this Test, samples 8-1 through 8-13 were fabricated with different compositions and/or structures of the recording section.

Layers other than the first recording layer 404 were formed by methods similar to those for forming the layers in Test 4. The recording section of stacked structure constituting the first recording layer 404 was formed by successively sputtering two or more kinds of alloy sputtering targets in accordance to the kinds of layers to be formed. The sputtering targets all had disk shape measuring 100 mm in diameter and 6 mm in thickness. All the layers constituting the first recording layer 204 were formed by supplying electrical power of 50 W from DC power supply in an Ar gas atmosphere having a pressure of 0.2 Pa.

The structure of the recording section that constitutes the first recording layer 404 of the first information layer 26 of the information recording medium 30, and the evaluation results of the recording power and the erasability of the first information layer 26 are shown in Table 8. The first recording layer 404 was formed by stacking the layers successively in such a constitution as the layer having the composition shown on the left would be located on the side of the seventh interface layer 403 and the layer having the composition shown on the right would be located on the side of the eighth dielectric material layer 406. Value of recording power less than 32 mW is shown as A, value not lower than 32 mW and lower than 36 mW is shown as B, and value not Lower than 36 mW is shown as C. For the erasability, value of erase ratio not less than 25 dB is shown as A, value not less than 20 dB and less than 25 dB is shown as B, and value less than 20 dB is shown as C.

TABLE 8

| Sample Nos. | Composition (atomic %) and thickness of each layer constituting first recording layer 404 | Recording power | Erasability |
| --- | --- | --- | --- |
| 8-1 | Sb/Sb$_{50}$Zn$_{50}$/Sb<br>1.3 nm 0.4 nm 1.3 nm | A | B |
| 8-2 | Sb/Sb$_{50}$Si$_{50}$/Sb<br>1.3 nm 0.4 nm 1.3 nm | A | A |
| 8-3 | Sb/Sb$_{50}$C$_{50}$/Sb<br>1.3 nm 0.4 nm 1.3 nm | A | A |
| 8-4 | Sb/Si$_{50}$C$_{50}$/Sb<br>1.3 nm 0.4 nm 1.3 nm | A | B |
| 8-5 | Sb$_{95}$C$_5$/Sb$_{95}$Si$_5$/Sb$_{95}$C$_5$<br>1 nm 1 nm 1 nm | A | A |
| 8-6 | Sb$_{95}$C$_5$/Ge/Sb$_{95}$C$_5$<br>1.4 nm 0.2 nm 1.4 nm | A | A |
| 8-7 | Sb$_{95}$C$_5$/Sb$_{95}$Ge$_5$/Sb$_{95}$C$_5$<br>1 nm 1 nm 1 nm | A | A |
| 8-8 | Sb$_{95}$C$_5$/Si$_{90}$Ge$_{10}$/Sb$_{95}$C$_5$<br>1.3 nm 0.4 nm 1.3 nm | A | A |
| 8-9 | Sb$_{95}$C$_5$/Sb$_{95}$Ag$_5$/Sb$_{95}$C$_5$<br>1 nm 1 nm 1 nm | A | A |
| 8-10 | Sb$_{95}$C$_5$/Sb$_{90}$C$_5$Ge$_5$/Sb$_{95}$C$_5$<br>1 nm 1 nm 1 nm | A | B |
| 8-11 | Sb$_{95}$C$_5$/Sb/Sb$_{95}$C$_5$<br>1 nm 1 nm 1 nm | A | A |
| 8-12 | Sb$_{95}$C$_5$/Sb$_{90}$C$_5$Ge$_5$/Sb$_{95}$C$_5$<br>0.5 nm 2 nm 0.5 nm | A | B |
| 8-13 | Sb$_{95}$C$_5$/Sb/Sb$_{95}$C$_5$<br>0.5 nm 2 nm 0.5 nm | A | A |

It was found that, similarly to Test 4, both the recording power and the erasability were satisfactory in samples 8-1 through 8-13 wherein the first recording layer 404 was formed as the recording section constituted by stacking two or more layers selected from among a layer containing Sb, a layer containing M1 (M1 represents at least one element selected from among Zn, Si and C), a layer containing M2 (M2 represents at least one element selected from among Ga, Ge, Ag, In, Sn, Te and Bi), a layer containing Sb-M1, a layer containing Sb-M2, a layer containing M1-M2 and a layer containing Sb-M1-M2.

Test 15

In Test 1 through Test 14, the first interface layer 103, the second interface layer, the first interface layer 303, the second interface layer disposed between the first recording layer 104 and the second dielectric material layer 106, the third interface layer 203, the fourth interface layer disposed between the first recording layer 204 and the fourth dielectric material layer 206, the first interface layer 703, the second interface layer disposed between the fourth recording Layer 704 and the second dielectric material layer 706, the third interface layer 603, the fourth interface layer disposed between the third recording layer 604 and the fourth dielectric material layer 606, the fifth interface layer 503, the sixth interface layer disposed between the second recording layer 504 and the sixth dielectric material layer 506, the seventh interface layer 403 or the eighth interface layer disposed between the first recording layer 404 and the eighth dielectric material layer 406 was formed from a material containing oxide of at least one element selected from among Hf, Y and Ga, and similar results were obtained. Also when the interface layers were formed by using at least one compound selected from among other oxide, nitride, carbide, sulfide and fluoride, similar results were obtained.

Test 16

In Test 16, information recording medium 51 was fabricated in a constitution of the information recording medium 51 shown in FIG. 10 without the second recording layer 49, and phase change was checked when electrical current was supplied. A substrate 46 formed from Si with the surface subjected to a notarization treatment was prepared. A lower electrode 47 was formed on the substrate from Pt in a layer measuring 6 μm by 6 μm and 0.1 μm in thickness, and a first dielectric material layer 801 was formed by sputtering thereon from (SiO$_2$)$_{25}$(In$_2$O$_3$)$_{50}$(ZrO$_2$)$_{25}$ in a layer measuring 4.5 μm by 5 μm and 0.01 μm in thickness. In addition, a first recording layer 48 was formed from Sb$_{90}$C$_{10}$ in a layer measuring 5 μm by 5 μm and 0.05 μm in thickness, the second dielectric material layer 802 was formed from (SiO$_2$)$_{25}$(In$_2$O$_3$)$_{50}$(ZrO$_2$)$_{25}$ in a layer measuring 4.5 μm by 5 μm and 0.01 μm in thickness, and an upper electrode 50 was formed from Pt by sputtering in a layer measuring 5 μm by 5 μm and 0.1 μm in thickness.

The first dielectric material layer 801' and the second dielectric material layer 802 are formed from an insulating material. Thus the first dielectric material layer 801 and the second dielectric material layer 802 are formed with an area smaller than that of the first recording layer 48 in order to flow electrical current into the first recording layer 48, whereby portions are provided where the lower electrode 47 and the upper electrode 50 make contact with the first recording layer 48.

Then Au lead wires were bonded onto the lower electrode 47 and the upper electrode 50 so as to connect the electrical information recording/reproduction apparatus 57 to the electrical information recording medium 51 via the voltage applying sections 52. With the electrical information recording/reproduction apparatus 57, a pulse supply 55 is connected via the switch 54 between the lower electrode 47 and the upper electrode 50. A change in resistance due to phase change of the first recording layer 48 is detected by the resistance measuring instrument 53 that is connected via a switch 56 between the lower electrode 47 and the upper electrode 50.

Figure 13:
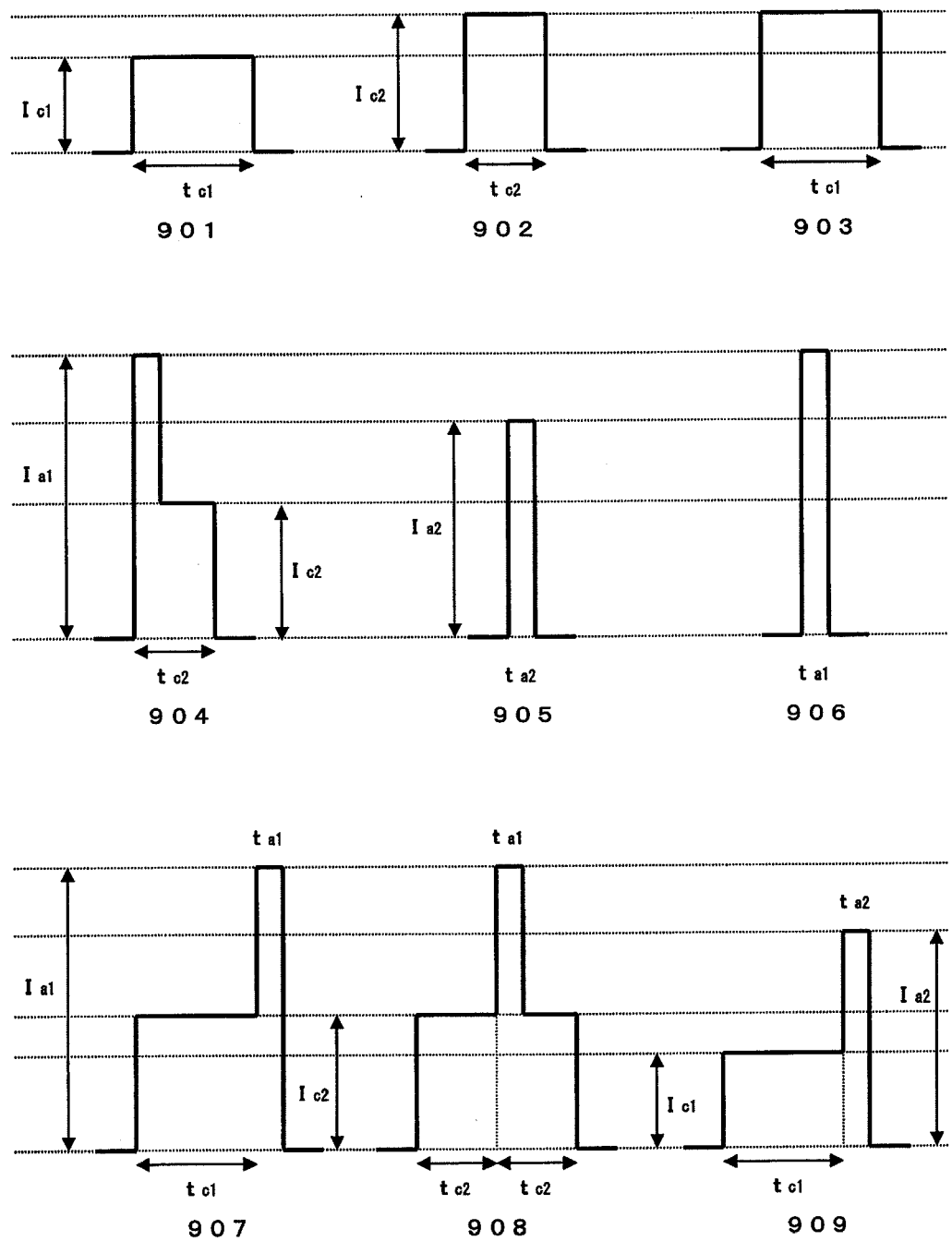
FIG. 13 shows an example of recording and erasing pulse waveforms applied to the electrical information recording medium of the present invention.

When the first recording layer 48 was in amorphous phase, current pulse of I$_{c1}$5=mA and t$_{c1}$=50 ns in a recording waveform 901 shown in FIG. 13 was supplied between the lower electrode 47 and the upper electrode 50. This results in phase change of the first recording layer 48 from amorphous phase to crystal phase. When the first recording layer 48 was in crystal phase, current pulse of I$_{a1}$=10 mA and t$_{a1}$=10 ns in an erasing waveform 906 shown in FIG. 13 was supplied between the lower electrode 47 and the upper electrode 50. This results in phase change of the first recording layer 48 from a crystal phase to an amorphous phase.

The number of overwrite cycles of the electrical phase change type information recording medium 51 was measured. The results showed that the number of overwrite cycles increased 10 times or more compared to a case wherein the first dielectric material layer 801 and the second dielectric material layer 802 were not provided. This is because the first dielectric material layer 801 and the second dielectric material layer 802 suppress the material transfer from the lower electrode 47 and the upper electrode 50 into the first recording layer 48.

Similar results were obtained when the first recording layer 48 was formed from a Sb-M1 material other than Sb$_{90}$C$_{10}$ (wherein M1 represents at least one element selected from among Zn, Si and C), a Sb-M1-M2 material (wherein M2 represents at least one element selected from among Ga, Ge, Ag, In, Sn, Te and Bi), and a material which contains, in addition to any of the materials described above, at least one element selected from among B, Mg, Al, S, Ca, Sc, Ti, V, Cr, Mn, Fe, Co, Ni, Cu, Sr, Y, Zr, Nb, Mo, Ru, Rh, Pd, Hf, Ta, W, Ir, Pt, Au, La, Ce, Pr, Nd, Sm, Eu, Gd, Tb, Dy, Ho, Er, Tm, Yb and Lu.

Similar results were obtained when the first recording layer 48 was formed as the recording section of stacked structure consisting of two or more layers selected from a layer containing Sb, a layer containing M1, a layer containing M2, a layer containing Sb-M1, a layer containing Sb-M2, a layer containing M1-M2, a layer containing Sb-M1-M2, and a layer containing, in addition to any of these materials, at least one element selected from among B, Mg, Al, S, Ca, Sc, Ti, V, Cr, Mn, Fe, Co, Ni, Cu, Sr, Y, Zr, Nb, Mo, Ru, Rh, Pd, Hf, Ta, W, Ir, Pt, Au, La, Ce, Pr, Nd, Sm, Eu, Gd, Tb, Dy, Ho, Er, Tm, Yb and Lu.

Test 17

In Test 17, relation between the compositions of the sputtering target used to form the recording layer and the compositions of the film formed by sputtering. Specifically, five kinds of sputtering targets of different compositions were prepared, and the compositions of the films (sample 17-1 through sample 17-5) formed by sputtering these targets were determined.

Samples were fabricated as follows. First, a Si substrate or a C substrate was prepared, and a film having a thickness of 1,000 nm was formed on the surface of the substrate by the sputtering method by using five kinds of targets. The film formation was conducted by setting the sputtering targets having the compositions shown in Table 9 in a film formation apparatus. The sputtering targets had disk shape measuring 100 mm in diameter and 6 mm in thickness. Film formation process was carried out by supplying electrical power of 100 W from DC power supply in an Ar gas atmosphere having a pressure of 0.2 Pa. The composition of the film of each sample thus obtained was analyzed by means of an X-ray microanalyzer, with the results shown in Table 9.

TABLE 9

| Sample Nos. | Composition of sputtering target | Composition of the film |
|---|---|---|
| 17-1 | $Sb_{85}Zn_{15}$ | $Sb_{85}Zn_{15}$ |
| 17-2 | $Sb_{84}Si_{16}$ | $Sb_{85}Si_{15}$ |
| 17-3 | $Sb_{72}C_{28}$ | $Sb_{75}C_{25}$ |
| 17-4 | $Sb_{89}(SiC)_{11}$ | $Sb_{90}(SiC)_{10}$ |
| 17-5 | $Sb_{84}C_{11}Ge_{5}$ | $Sb_{85}C_{10}Ge_{5}$ |

From the results shown in Table 9, relation between the composition of the Sb-M1 or Sb-M1-M2 sputtering target and the composition of the film formed by using the sputtering target was elucidated. That is, Sb is easier to sputter with higher sputtering rate. Composition of the sputtering target and the composition of the film formed thereby may vary depending on the shape of the sputtering target, the film formation apparatus and the distance between the target and the substrate. Composition of the sputtering target may be determined by finding the correction factors for various elements so as to obtain the desired compositions of the film, by giving consideration to the factors described above.

INDUSTRIAL APPLICABILITY

The information recording medium of the present invention has the capability to retain the recorded information over a long period of time (inviolability) and is useful as a high-density optical disk of rewritable type (such as Blu-ray Disk Rewritable (BD-RE), DVD-RAM, DVD-RW, +RW, etc.), write-once type (such as Blu-ray Disk Recordable (BD-R), DVD-R, etc.) and read-only type (such as Blu-ray Disk Read-only (BD-ROM), DVD-ROM, etc.). The information recording medium is also useful as an involatile electrical memory,

The invention claimed is:

1. An information recording medium (excluding one comprising a noble metal oxide layer of which main component is an oxide of noble metal) whereon information can be recorded by applying light or electrical energy, which comprises at least a recording layer which can undergo phase change (excluding the recording layer comprising Au, Ga, In, Zr or Mg), wherein:
   the recording layer comprises at least one element selected from among Si and C, and Sb in total proportion of 85 atomic % or more,
   the recording layer does not comprise Te when the recording layer comprises Si, and
   the recording layer comprises a material represented by a formula (1):

$Sb_{100-a1}M1(atomic \%)$ (1)

wherein M1 represents at least one element selected from among Si and C, and a1 is a proportion in terms of atomic % and satisfies a relationship of $0<a1\leq 50$.

2. An information recording medium (excluding one comprising a noble metal oxide layer of which main component is an oxide of noble metal) whereon information can be recorded by applying light or electrical energy, which comprises at least a recording layer which can undergo phase change (excluding the recording layer comprising Au, Ga, In, Zr or Mg), wherein:
   the recording layer comprises at least one element selected from among Si and C, and Sb in total proportion of 85 atomic % or more,
   the recording layer does not comprise Te when the recording layer comprises Si, and
   the recording layer comprises a material represented by a formula (3):

$Sb_{100-a3}Si_{a3}(atomic \%)$ (3)

wherein a3 represents a proportion in terms of atomic %, and satisfies a relationship of $0<a3\leq 30$.

3. An information recording medium (excluding one comprising a noble metal oxide layer of which main component is an oxide of noble metal) whereon information can be recorded by applying light or electrical energy, which comprises at least a recording layer which can undergo phase change (excluding the recording layer comprising Au, Ga, In, Zr or Mg), wherein:
   the recording layer comprises at least one element selected from among Si and C, and Sb in total proportion of 85 atomic % or more,
   the recording layer does not comprise Te when the recording layer comprises Si, and
   the recording layer comprises a material represented by a formula (4):

$Sb_{100-a4}C_{a4}(atomic \%)$ (4)

wherein a4 represents a proportion in terms of atomic %, and satisfies a relationship of $0<a4\leq 50$.

4. An information recording medium (excluding one comprising a noble metal oxide layer of which main component is an oxide of noble metal) whereon information can be recorded by applying light or electrical energy, which comprises at least a recording layer which can undergo phase change (excluding the recording layer comprising Au, Ga, In, Zr or Mg), wherein:
   the recording layer comprises at least one element selected from among Si and C, and Sb in total proportion of 85 atomic % or more, the recording layer does not comprise Te when the recording layer comprises Si, and the recording layer comprises a material represented by a formula (5):

$$Sb_{100-a5}(SiC)_{a5} (\text{mol \%}) \quad (5)$$

wherein a5 represents a proportion in terms of atomic %, and satisfies a relationship of $0 < a5 \leqq 30$.

5. The information recording medium according to claim 1, wherein the recording layer further comprises at least one element selected from among Ge, Ag, Sn, Te and Bi.

6. An information recording medium (excluding one comprising a noble metal oxide layer of which main component is an oxide of noble metal) whereon information can be recorded by applying light or electrical energy, which comprises at least a recording layer which can undergo phase change (excluding the recording layer comprising Au, Ga, In, Zr or Mg), wherein:

the recording layer comprises at least one element selected from among Si and C, and Sb in total proportion of 85 atomic % or more, the recording layer does not comprise Te when the recording layer comprises Si, the recording layer further comprises at least one element selected from among Ge, Ag, Sn, Te and Bi, and the recording layer comprises a material represented by a formula (6):

$$Sb_{100-a6-b6}M1_{a6}M2_{b6} (\text{atomic \%}) \quad (6)$$

wherein M1 represents at least one element selected from among Si and C, M2 represents at least one element selected from among Ge, Ag, Sn, Te and Bi, and a6 and b6 represent proportions in terms of atomic %, and satisfy relationships of $0 < a6 \leqq 50$ and $0 < b6 \leqq 15$.

7. The information recording medium according to claim 1, which has N1 information layers (wherein N1 is an integer of 2 or greater), wherein at least one information layer comprises the recording layer.

8. The information recording medium according to claim 2, wherein the recording layer further comprises at least one element selected from among Ge, Ag, Sn, Te and Bi.

9. The information recording medium according to claim 3, wherein the recording layer further comprises at least one element selected from among Ge, Ag, Sn, Te and Bi.

10. The information recording medium according to claim 4, wherein the recording layer further comprises at least one element selected from among Ge, Ag, Sn, Te and Bi.

11. The information recording medium according to claim 2, which has N1 information layers (wherein N1 is an integer of 2 or greater), wherein at least one information layer comprises the recording layer.

12. The information recording medium according to claim 3, which has N1 information layers (wherein N1 is an integer of 2 or greater), wherein at least one information layer comprises the recording layer.

13. The information recording medium according to claim 4, which has N1 information layers (wherein N1 is an integer of 2 or greater), wherein at least one information layer comprises the recording layer.

14. The information recording medium according to claim 6, which has N1 information layers (wherein N1 is an integer of 2 or greater), wherein at least one information layer comprises the recording layer.

* * * * *

UNITED STATES PATENT AND TRADEMARK OFFICE
CERTIFICATE OF CORRECTION

PATENT NO. : 8,133,566 B2
APPLICATION NO. : 12/376507
DATED : March 13, 2012
INVENTOR(S) : Takashi Nishihara et al.

It is certified that error appears in the above-identified patent and that said Letters Patent is hereby corrected as shown below:

On the Title Page:

In item (86) § 371 (c)(1), (2), (4) Date:

Please replace "February 5, 2009" with --May 21, 2009--.

Signed and Sealed this
Twenty-fourth Day of July, 2012

David J. Kappos
*Director of the United States Patent and Trademark Office*